US012812595B2

(12) United States Patent

Murray et al.

(10) Patent No.: US 12,812,595 B2
(45) Date of Patent: Nov. 24, 2026

(54) PAGING COLLISION MITIGATION AND SYSTEM INFORMATION ACQUISITION FOR MULTI-USIM USER EQUIPMENT

(71) Applicant: INTERDIGITAL PATENT HOLDINGS, INC., Wilmington, DE (US)

(72) Inventors: Joseph Murray, Schwenksville, PA (US); Pascal Adjakple, Great Neck, NY (US); Quang Ly, North Wales, PA (US); Michael Starsinic, Newtown, PA (US); Qing Li, Princeton Junction, NJ (US); Zhuo Chen, Claymont, DE (US); Kyle Pan, Saint James, NY (US)

(73) Assignee: INTERDIGITAL PATENT HOLDINGS, INC., Wilmington, DE (US)

( * ) Notice: Subject to any disclaimer, the term of this patent is extended or adjusted under 35 U.S.C. 154(b) by 600 days.

(21) Appl. No.: 17/781,824

(22) PCT Filed: Dec. 4, 2020

(86) PCT No.: PCT/US2020/063219

§ 371 (c)(1),
(2) Date: Jun. 2, 2022

(87) PCT Pub. No.: WO2021/113581

PCT Pub. Date: Jun. 10, 2021

(65) Prior Publication Data

US 2023/0007624 A1 Jan. 5, 2023

Related U.S. Application Data

(60) Provisional application No. 62/943,896, filed on Dec. 5, 2019, provisional application No. 63/061,414, filed on Aug. 5, 2020.

(51) Int. Cl.
*H04W 68/00* (2009.01)
*H04W 76/20* (2018.01)

(52) U.S. Cl.
CPC ......... *H04W 68/005* (2013.01); *H04W 76/20* (2018.02)

(58) Field of Classification Search
CPC ... H04W 68/005; H04W 76/20; H04W 68/00; H04W 88/06; H04W 68/02; H04W 76/30
See application file for complete search history.

(56) References Cited

U.S. PATENT DOCUMENTS 10,555,261 B2 * 2/2020 Zetterberg ............ H04L 5/0023
10,887,864 B2 * 1/2021 Agiwal ............... H04W 56/001
(Continued)

FOREIGN PATENT DOCUMENTS

AU 2009308709 A1 5/2010
CN 109314918 A 2/2019
(Continued)

OTHER PUBLICATIONS

3GPP TS 23.501, System Architecture for the 5G System, Stage 2 (Release 16), V16.4.0.
(Continued)

*Primary Examiner* — Brandon J Miller
(74) *Attorney, Agent, or Firm* — Flaster Greenberg P.C.

(57) ABSTRACT

Methods, apparatuses, and systems are provided for acquiring system information and managing paging in wireless communication systems for a user equipment (UE having multiple universal subscriber identity modules (USIMs). The UE is configured to detect, predict, or determine paging collisions arising from monitoring paging occasions and performing access stratum procedures associated with different USIMs. Based on such determinations, the UE and/or the network adapt paging configurations, including modify-
(Continued)

ing paging occasions, skipping or suspending paging, extending paging monitoring, or releasing and resuming radio resource control (RRC) connections. Network assistance information may be exchanged to coordinate paging behavior across multiple networks. The disclosed techniques can reduce paging collisions, signaling overhead, power consumption, and service disruption while maintaining connectivity and mobility performance for multi-USIM user equipment.

8 Claims, 42 Drawing Sheets

(56) References Cited

U.S. PATENT DOCUMENTS

| | | | | |
|---|---|---|---|---|
| 2012/0172011 | A1* | 7/2012 | Gupta | H04W 68/02 455/414.1 |
| 2014/0220981 | A1* | 8/2014 | Jheng | H04W 76/15 455/437 |
| 2014/0256283 | A1* | 9/2014 | Lin | H04W 4/025 455/404.2 |
| 2018/0027522 | A1 | 1/2018 | Lee et al. | |
| 2018/0160422 | A1* | 6/2018 | Pathak | H04W 76/10 |
| 2018/0176834 | A1* | 6/2018 | Wei | H04W 36/0066 |
| 2018/0234838 | A1* | 8/2018 | Mildh | H04W 8/22 |
| 2019/0007913 | A1* | 1/2019 | Tsai | H04W 76/15 |
| 2019/0254104 | A1* | 8/2019 | Gurumoorthy | H04W 76/27 |
| 2019/0364541 | A1* | 11/2019 | Ryu | H04W 80/10 |
| 2020/0107236 | A1* | 4/2020 | Tseng | H04W 72/044 |
| 2020/0304984 | A1* | 9/2020 | Dhanapal | H04W 56/001 |
| 2020/0336891 | A1* | 10/2020 | Guo | H04W 8/20 |
| 2022/0256369 | A1* | 8/2022 | Tugnawat | H04W 76/20 |
| 2022/0272761 | A1* | 8/2022 | Park | H04W 76/27 |

FOREIGN PATENT DOCUMENTS

| | | | | |
|---|---|---|---|---|
| EP | 3337286 | A1 * | 6/2018 | H04W 72/542 |
| IN | 201917034956 | A | 10/2019 | |
| TW | 201906441 | A | 2/2019 | |
| WO | WO 2015195260 | A1 | 12/2015 | |
| WO | WO 2018187707 | A1 | 10/2018 | |

OTHER PUBLICATIONS

3GPP TS 23.501, System Architecture for the 5G System; Stage 2 (Release 15), V15.6.0.
3GPP TS 38.212, NR; Multiplexing and channel coding (Release 15), V15.6.0.
3GPP TS 38.212, NR; Multiplexing and channel coding (Release 16), 16.1.0.
3GPP TS 38.213, Physical layer procedures for control (Release 15), V15.7.0.
3GPP TS 38.213, Physical layer procedures for control (Release 16), V16.1.0.
3GPP TS 38.214, NR; Physical layer procedures for data (Release 15), V15.7.0.
3GPP TS 38.214, NR; Physical layer procedures for data (Release 16), V16.1.0.
3GPP TS 38.300, NR; NR and NG-RAN Overall Description; Stage 2 (Release 15), V15.7.0.
3GPP TS 38.300, NR; NR and NG-RAN Overall Description; Stage 2 (Release 16), VI6.1.0.
3GPP TS 38.304, User Equipment (UE) procedures in Idle mode and RRC Inactive state (Release 15), V15.4.0.
3GPP TS 38.304, User Equipment (UE) procedures in Idle mode and RRC Inactive state (Release 16), VI6.0.0.
3GPP TS 38.331, Radio Resource Control (RRC) protocol specification (Release 15), V15.7.0.
3GPP TS 38.331, Radio Resource Control (RRC) protocol specification (Release 16). VI6.0.0.
Apple: "R17 Multi-SIM" 3GPP Draft; RP-192175 Consideration on MSIM Scope, 3rd Generation Partnership Project (3GPP), Mobile Competence Centre ; 3GPP TSG RAN Meeting #85, RP-192175, Sep. 9, 2019, Sep. 16, 2019-Sep. 20, 2019.
Huawei Hisilicon: "Discussion on Suspension/Release and Resumption of an Ongoing Connection", 3GPP Draft; S2-1909263 Discussion on Suspension and Release and Resumption of an Ongoing Connection, 3rd Generation Partnership Project (3GPP), Mobile Competence Centre; vol. SA WG2, No. Split Oct. 4, 2019, Oct. 14, 2019-Oct. 18, 2019.
Intel Corporation: "Intel views on release—17", 3GPP Draft; RP-191406-Intel-View on REL-17, 3rd Generation Partnership Project (3GPP), Mobile Competence Centre; No. Newport Beach, USA;Jun. 3, 2019-Jun. 6, 2019 Jun. 2, 2019, XP051748335.
Intel Corporation: "Motivation for RAN Level Multi-SIM Support", 3GPP Draft; RP-191347 RAN Multi-SIM Intel 3rd Generation Partnership Project (3GPP), Mobile Competence Centre; Jun. 2, 2019, Jun. 3, 2019-Jun. 6, 2019.
SA WG2: "Revised SID: Study on system enablers for multi-SIM devices", 3GPP Draft; SP-190248 WAS0179S2-1900688 Updated_SID_F S_MUSIM_RM, 3rd Generation Partnership PROJECT—(3GPP), Mobile Competence Centre; vol. TSG SA, No. Shenzhen, Mar. 21, 2019, Mar. 20, 2019-Mar. 22, 2019.
Samsung: "Discussion on assistance information values", 3GPP Draft; S2-1909687-MUSIM-ASSITANCEINFORMATION VI, 3rd Generation Partnership Project (3GPP), Mobile Competence Centre ; 3GPP TSG SA Meeting #135, S2-1909687, Oct. 4, 2019, Oct. 14, 2019-Oct. 18, 2019.

* cited by examiner

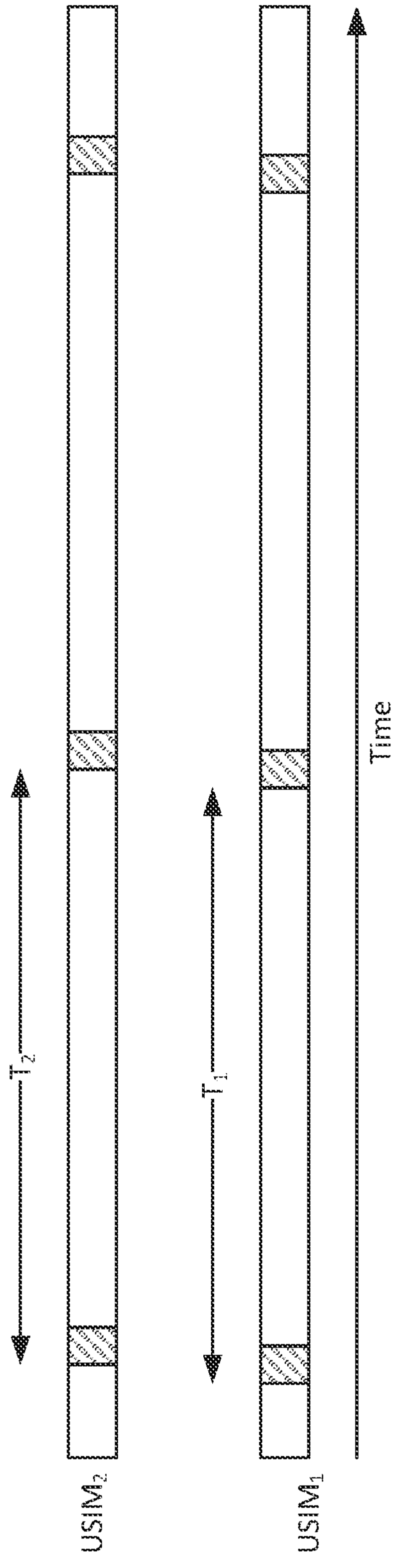
Fig. 4A Potential Paging Collisions when $T_2 = T_1$
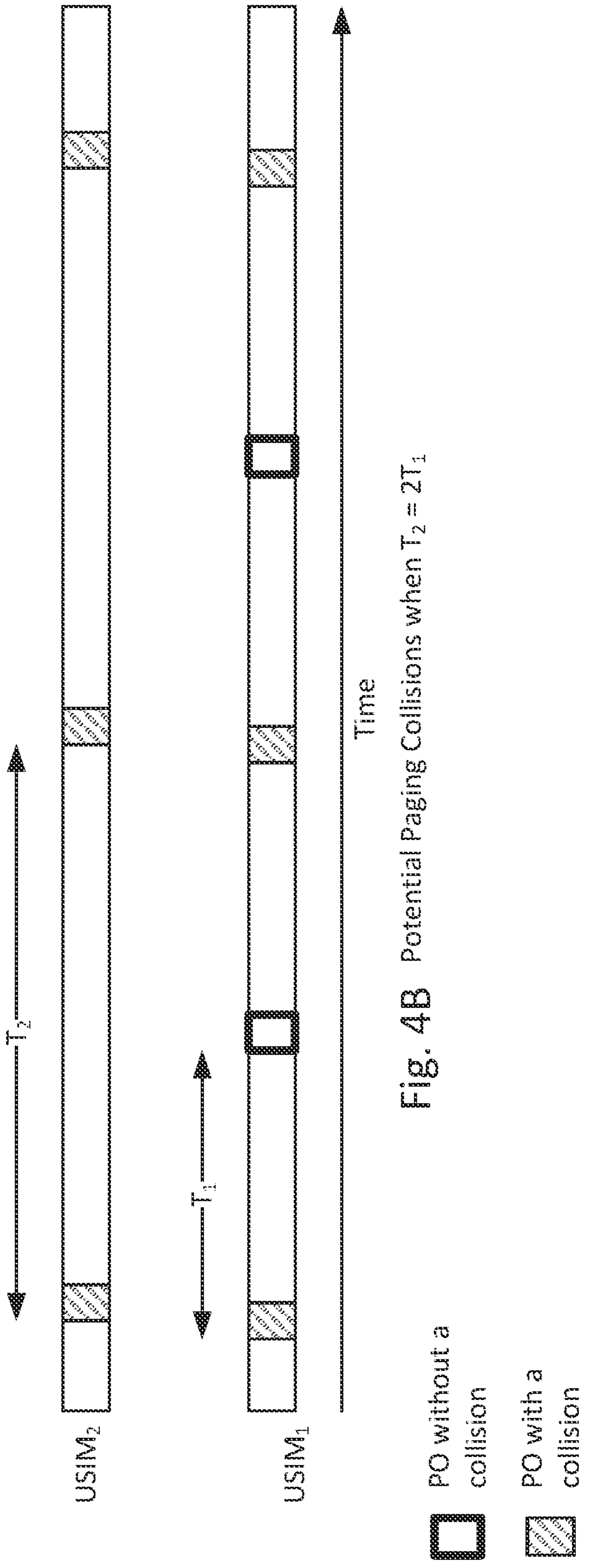
Fig. 4B Potential Paging Collisions when $T_2 = 2T_1$

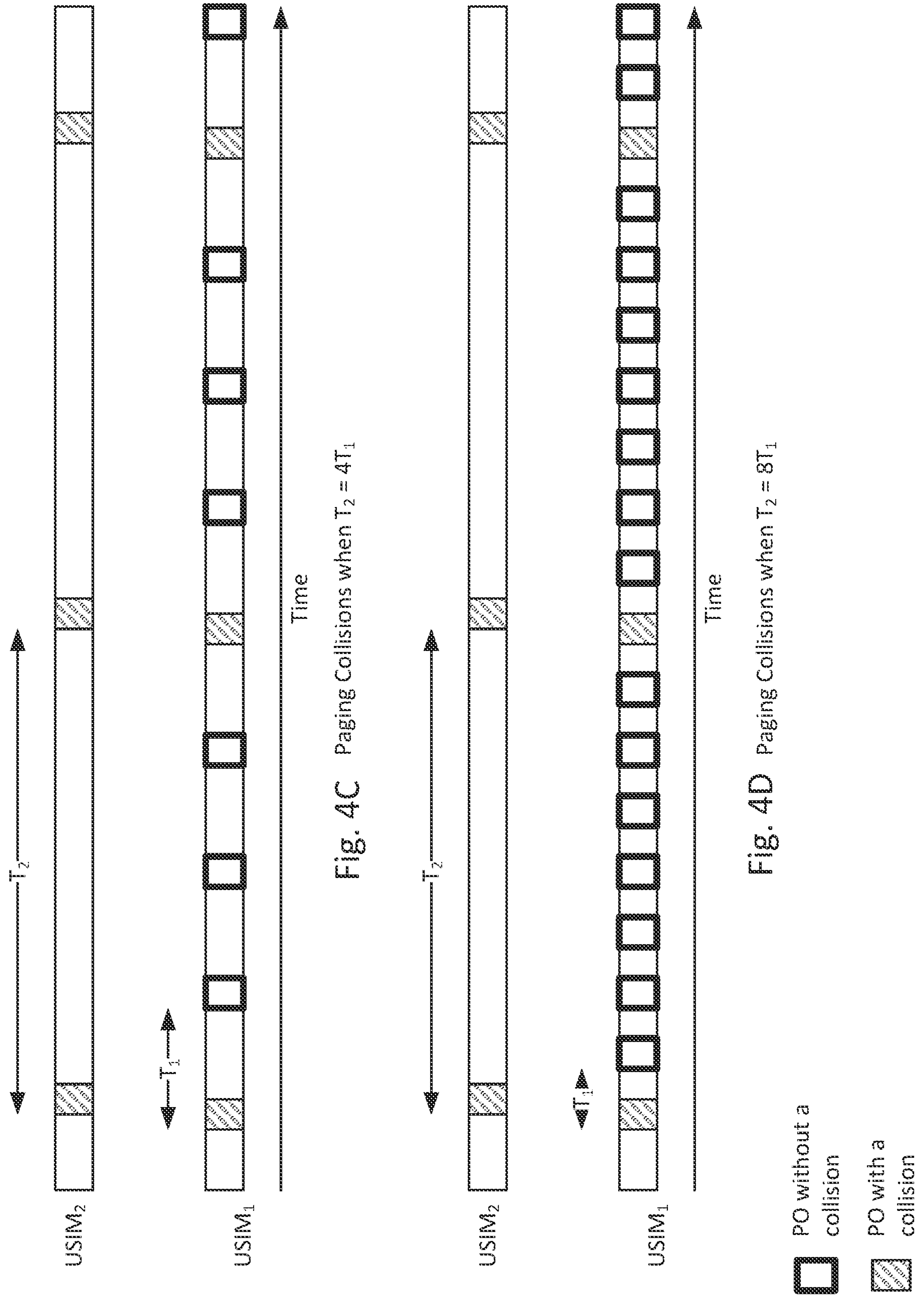
Fig. 4C Paging Collisions when $T_2 = 4T_1$
Fig. 4D Paging Collisions when $T_2 = 8T_1$

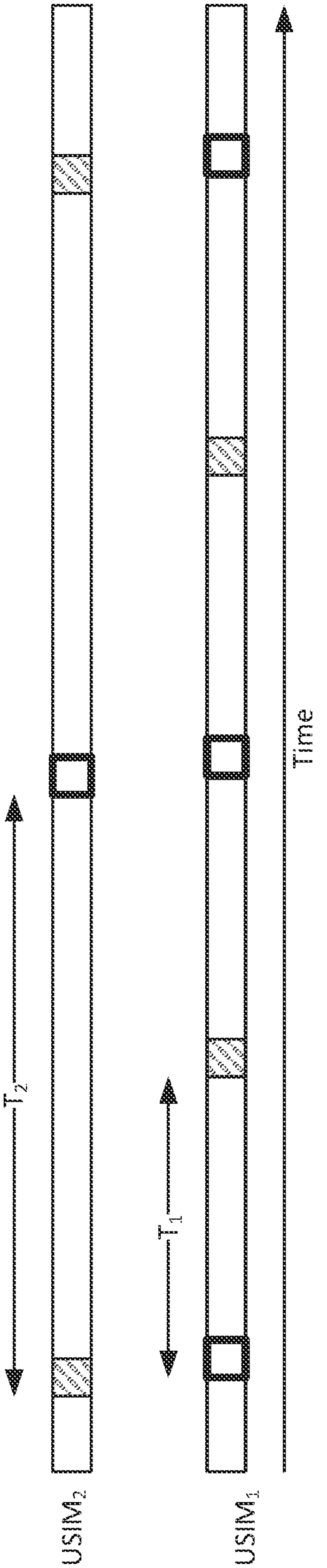
Fig. 9A - PO Skipping Behavior when PO for USIM$_2$ Occurs First
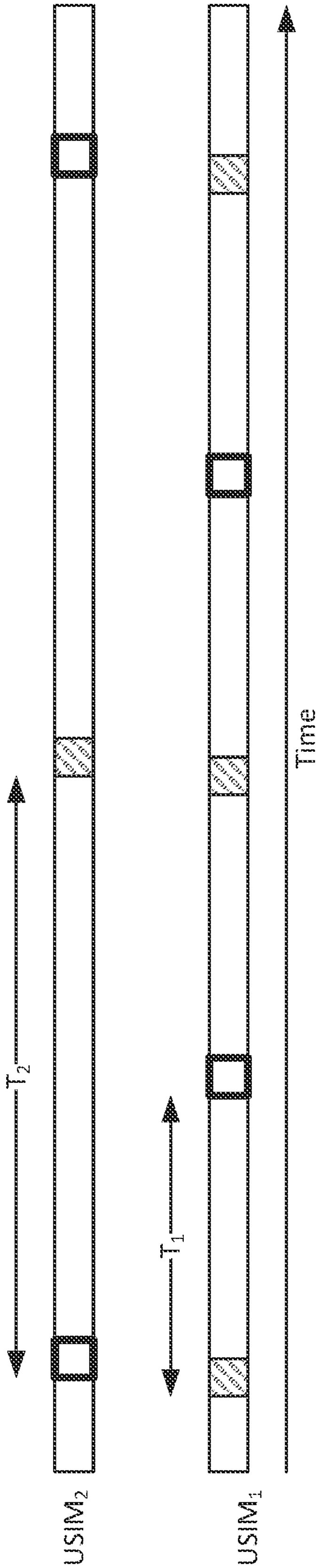
Fig. 9B - PO Skipping Behavior when PO for USIM$_1$ Occurs First

PAGING COLLISION MITIGATION AND SYSTEM INFORMATION ACQUISITION FOR MULTI-USIM USER EQUIPMENT

CROSS-REFERENCE TO RELATED APPLICATIONS

This application is the National Stage Application of International Patent Application No. PCT/US2020/063219, filed Dec. 4, 2020 which claims the benefit of U.S. Provisional Patent Application No. 62/943,896, filed on Dec. 5, 2019, titled "System Information Acquisition and Paging for User Equipment with Multiple Universal Subscriber Identity Modules," and U.S. Provisional Patent Application No. 63/061,414, filed on Aug. 5, 2020, titled "SI Acquisition And Paging For Multi-USIM UEs," the content of which are hereby incorporated by reference herein.

BACKGROUND

This disclosure pertains to networks, including wireless networks, such as, but not limited to, those described in standards such as:

- 3GPP TS 38.213, Physical layer procedures for control (Release 15), V15.7.0;
- 3GPP TS 38.331, Radio Resource Control (RRC) protocol specification (Release 15), V15.7.0;
- 3GPP TS 23.501, System Architecture for the 5G System; Stage 2 (Release 15), V15.6.0;
- 3GPP TS 38.212, NR; Multiplexing and channel coding (Release 15), V15.6.0;
- 3GPP TS 38.214, NR; Physical layer procedures for data (Release 15), V15.7.0;
- 3GPP TS 38.304, User Equipment (UE) procedures in Idle mode and RRC Inactive state (Release 15), V15.4.0;
- 3GPP TS 38.213, Physical layer procedures for control (Release 16), V16.1.0;
- 3GPP TS 38.331, Radio Resource Control (RRC) protocol specification (Release 16), V16.0.0;
- 3GPP TS 23.501, System Architecture for the 5G System; Stage 2 (Release 16), V16.4.0
- 3GPP TS 38.212, NR; Multiplexing and channel coding (Release 16), V16.1.0;
- 3GPP TS 38.214, NR; Physical layer procedures for data (Release 16), V16.1.0;
- 3GPP TS 38.304, User Equipment (UE) procedures in Idle mode and RRC Inactive state (Release 16), V16.0.0;
- 3GPP TS 38.300, NR; NR and NG-RAN Overall Description; Stage 2 (Release 15), V15.7.0; and
- 3GPP TS 38.300, NR; NR and NG-RAN Overall Description; Stage 2 (Release 16), V16.1.0.

SUMMARY

UE behaviors and configurations of a UE having multiple USIMs may be adapted such that the monitoring occasions and transmission opportunities associated with the AS procedures performed by one USIM do not overlap in time with the monitoring occasions and transmission opportunities associated with the AS procedures performed by another USIM. The terms "AS procedure" and "AS procedures" refer herein to a superset of all UE procedures (including NAS procedures) that cause the UE to interact with the network, in the sense that any such procedure requires the use an AS procedure. A UE may use a variety of methods, such as:

- Methods to determine when collisions will occur that are based on the UE configuration for the multiple USIMs and the SFTD between PCells of a Multi-USIM UE:
- Methods to perform PO skipping to avoid paging collisions for a multi-USIM UE;
- A rule-based PO skipping method that allows a UE to alternate for which USIM a PO is monitored;
- An event-based PO method that allows a UE to suspend/resume paging for a network based on the occurrence of a specific events;
- An SFN-based PO skipping method that partitions the SFN space into regions where POs are monitored or skipped;
- A method to extend a PO with additional PDCCH monitoring occasions for paging that reduces the likelihood that a UE is unable to receive the DL during its configured PO due to collisions;
- A method for the UE to request modification to its paging configuration to avoid collisions;
- A method for a UE to request the release or suspension of an RRC connection for one USIM to prevent collisions with the monitoring occasions and transmission opportunities associated with the AS procedures performed for another USIM;
- A method for a UE to autonomously release or suspend an RRC connection for one USIM to prevent collisions with the monitoring occasions and transmission opportunities associated with the AS procedures performed for another USIM, where the UE may "negotiate" a release/suspend configuration to apply after autonomously releasing/suspending the RRC connection
- A method for a UE to request modification of the C-DRX configuration for one USIM to prevent collisions with the monitoring occasions and transmission opportunities associated with the AS procedures performed by another USIM; and
- A method to provide an indication to the network to inform it of changes in its DC capabilities that result when the UE is using the shared transceiver to maintain a connection with another network.

A method for a UE to provide multi-USIM assistance information to the network using an enhanced UE Assistance Information procedure

- A method for a UE to request the network stops paging the UE, where the request is sent to the network in response to a page; and
- A method for a network to perform paging filtering, where the filtering may be based on a list of paging causes provided to the network by the UE.

A UE may use several methods to perform collision resolution and recovery, such as:

- A method to resolve collisions that is based on preconfigured rules and/or user preferences;
- A method to perform RACH-based SI Acquisition to recover from a collision with an SI window;
- A method to perform Short Message Acquisition to recover from a collision with a PO;
- A method to perform On-Demand Paging to recover from a collision with a PO.

Network operations may be adapted for a UE having multiple USIMs to allow the release or suspension of an RRC connection with a first network so the UE can establish an RRC connection with a second network. A variety of techniques may be used. For example, a device may be configured to communicate with a first network and then receive a trigger to establish an RRC connection with a second network. The UE may then transmit an RRC message to the first network to release or suspend the RRC connection with the first network. The UE may then receive an RRCRelease message to release or suspend the RRC connection with the first network and do so, then establish an RRC connection with a second network.

The request to release or suspend sent from the UE may correspond to transmission of a UE assistance information message related to release preference information, wherein, for example, a preferred RRC state is set to "idle" or "inactive". The UE assistance information message may also include an indication of a paging preference.

The UE may also send Release Assistance Information (RAI) to the first network, and also receive a "negotiated" configuration from the first network, whereby releasing or suspending the RRC connection with the first network further comprises applying the negotiated configuration. The RAI may be sent separately or with other UE assistance information such as paging preference information and/or preferred RRC state, for example.

The negotiated configuration may include a suspension configuration including an inactivity time value, and applying the configuration may include starting a timer accordingly. At the expiry of the timer, the UE may release a suspended RRC connection with the first network.

Similarly, the UE may receive a trigger to release or suspend the RRC connection with the second network, stop the inactivity timer, and resume the RRC connection with the first network.

The behavior and configuration of a multi-USIM UE may be adapted such that the monitoring occasions and transmission opportunities associated with the AS procedures performed by one USIM do not overlap in time with the monitoring occasions and transmission opportunities associated with the AS procedures performed by another USIM. For example, a device may be configured to detect an event triggering PO skipping activation with a network and transmit an RRC message to activate PO skipping with the network. The device may then receive an RRC Release message including a suspension configuration from the network, and suspend the RRC connection with the network and activate PO skipping with the network. The device may then detect an event triggering PO skipping deactivation with the network and deactivating PO skipping with the network.

The device may be adapted such that the event triggering PO skipping activation corresponds to a number of events, such as: determination that collisions will occur based on the UE configuration for the multiple USIMs; detection of one or more paging collisions; commencement of an AS procedure for another USIM; a transition to RRC_CONNECTED state for another USIM; a transition to RRC_INACTIVE state for another USIM; a transition to RRC_IDLE state for another USIM; or a configuration of DC for another USIM.

The request from the device to activate PO skipping may include a resume cause set to "po-SkippingActivation," for example.

The event triggering PO skipping deactivation may be completion of an AS procedure for another USIM, a transition from RRC_CONNECTED to RRC_IDLE/RRC_INACTIVE for another USIM, or a release of DC for another USIM, for example.

A suspension instruction may trigger the starting of a timer corresponding to the time interval during which PO skipping is activated, wherein the starting value of the timer is signaled via the suspension configuration. The event triggering PO skipping deactivation may be expiration of the timer.

Paging monitoring may be performed using an extended PO. For example, a device may be configured to receive a paging configuration in an RRC message that includes an indication of a plurality of PDCCH monitoring occasions for paging, and selecting a PDCCH monitoring occasion for paging that does not experience a collision. The device may then monitor for paging during the selected PDCCH monitoring occasion for paging, and receive a page during the monitored PDCCH monitoring occasion for paging.

The device may be further adapted to send multi-USIM assistance information to the network, and to receive a paging configuration via RRC messaging that includes a paging configuration. For example, the device may receive an RRC message configures an extended PO with, for example, an additionalMonitoringOccasionOfPO parameter with a value greater 1.

Devices may be configured to send requests to the network to stop paging of a UE. For example, a first apparatus may be configured to communicate with a second apparatus in a first network, and to receive a page from a third apparatus in a second network. The first apparatus may determine to continue communication with the second apparatus in the first network, and transmit an RRC message to the third apparatus in the second network with an indication to suspend paging for the first apparatus. The first apparatus may then receive an RRC message from the third apparatus in the second network acknowledging the indication to suspend paging, and continue communication with the second apparatus in the first network.

The first apparatus may further determine to continue communication with the second device in the first network based on a "paging cause" received in a page.

These operations may occur while the first apparatus is in RRC_INACTIVE mode, where the third apparatus of sends a NAS message to a fourth apparatus in the second network that includes an indication to suspend paging for the first apparatus. By way of example, the first apparatus may be a UE, the second apparatus and the third apparatus may be gNBs, and the fourth apparatus may be an AMF.

The first apparatus may be further adapted to resume paging with second network and transmit an RRC message to the third apparatus that includes an indication to resume paging for the first apparatus. The first apparatus may then receive an RRC message from the third apparatus in the second network acknowledging the indication to resume paging, and monitor for paging from a third apparatus in the second network.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

A more detailed understanding may be had from the following description, given by way of example in conjunction with the accompanying drawings.

FIGS. 4A-D are timing diagrams illustrating example paging collisions for various DRX cycle configurations.

FIGS. 9A-B are timing diagrams Illustrating PO Skipping for every other PO when T2=2T1.

DETAILED DESCRIPTION

Figure 1:
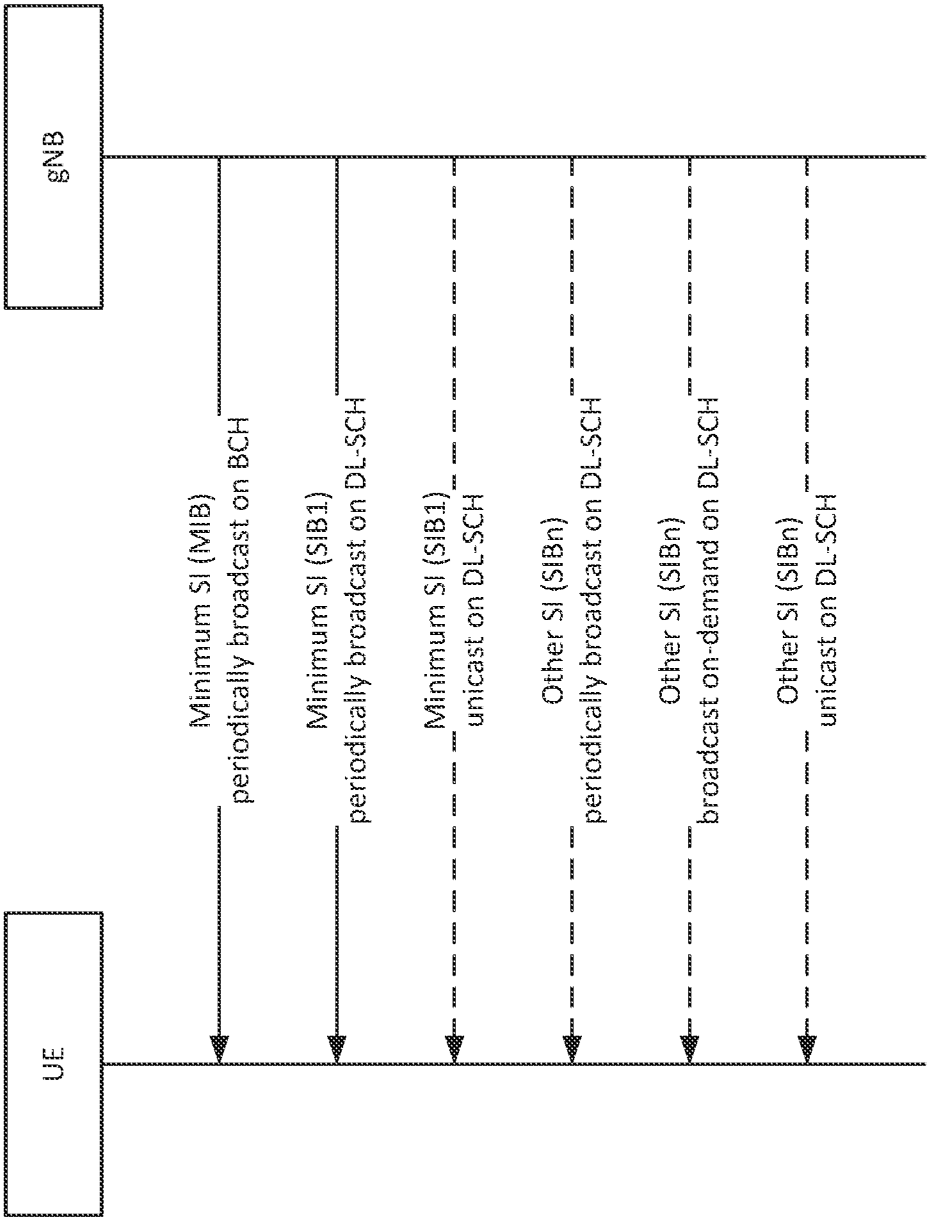
FIG. 1 is a call flow diagram illustrating an example system information provisioning.

Table 9 of the Appendix describes many of the abbreviations used herein.

Multi-USIM Overview

A Multi-USIM UE is a UE with two or more SIMs. Dual-SIM: UE with two SIMs. The term Multi-USIM and Dual-SIM are used interchangeably in this document.

Multi-USIM devices have been more and more popular in different countries. The user may have both a personal and a business subscription in one device or has two personal subscriptions in one device for different services (e.g. use one individual subscription and one "family circle" plan). However, support for multi-USIM within a device is currently handled in an implementation-specific manner without any support from 3GPP specifications, resulting in a variety of implementations and UE behaviors (e.g. Passive Dual SIM, Dual SIM Single Standby, Dual SIM Dual Standby, Dual SIM Dual Active, etc.). Such situation may cause increased complexity for UE vendors, unexpected UE behavior for network vendors or operators, and degraded user experience.

Current UE implementations typically support dual SIM configurations where the UE time multiplexes operations between each installed USIMs, which is referred to as TDMing or time division multiplexing. Dual SIM Dual Standby (DSDS) UEs, as they are called, operate in this manner and allocate time for each USIM to communicate with their respective Mobile Network Operators, or MNOs. The USIMs may belong to the same or different MNOs. These multi-USIM UEs share common radio and baseband components with some common software to enable the UE to switch operations between the two USIMs. One main issue with having shared Rx and Tx components is the UE is not able to monitor for DL traffic or send UL traffic for both USIMs at the same time.

Some dual SIM UEs have dual Rx components (one for each USIM) and a shared, single Tx component where the dual SIM UE TDM UL transmissions. By having dual RX components, these UEs are able to continuously monitor DL traffic but the UEs still must TDM UL traffic due to the shared Tx component. These UEs are not as common as the single Rx, single Tx UEs due to the added cost of an additional Rx component.

There is yet another class of multi-USIM UEs in which dedicated transceivers are available for each installed USIMs. These UEs are called Dual SIM Dual Active (DSDA) UEs but they are not too common due to the increased cost of having dual Rx and dual Tx components in the UEs. The DSDA UEs operate as two UEs but contain some common software to provide operational configurability to the user.

NR Paging (Release 15)

Discontinuous Reception for Paging

The UE may use Discontinuous Reception (DRX) in RRC_IDLE and RRC_INACTIVE state in order to reduce power consumption. The UE monitors one paging occasion (PO) per DRX cycle. A PO is a set of PDCCH monitoring occasions and can consist of multiple time slots (e.g. subframe or OFDM symbol) where paging DCI can be sent. See 3GPP TS 38.213, Physical layer procedures for control (Release 15), V15.7.0. One Paging Frame (PF) is one Radio Frame and may contain one or multiple PO(s) or starting point of a PO.

In multi-beam operations, the UE assumes that the same paging message and the same Short Message are repeated in all transmitted beams and thus the selection of the beam(s) for the reception of the paging message and Short Message is up to UE implementation. The paging message is same for both RAN initiated paging and CN initiated paging.

The UE initiates RRC Connection Resume procedure upon receiving RAN initiated paging. If the UE receives a CN initiated paging in RRC_INACTIVE state, the UE moves to RRC_IDLE and informs NAS.

The PF and PO for paging are determined by the following formulae:

SFN for the PF is determined by:

$$(SFN+PF\_\text{offset}) \bmod T=(T \text{ div } N)*(UE\_ID \bmod N)$$

Index (i_s), indicating the index of the PO is determined by:

$$i\_s=\text{floor}(UE\_ID/N) \bmod Ns$$

The PDCCH monitoring occasions for paging are determined according to pagingSearchSpace as specified in 3GPP TS 38.213 Release 15, and firstPDCCH-MonitoringOccasionOfPO if configured as specified in 3GPP TS 38.331 Release 15, Radio Resource Control (RRC) protocol specification (Release 15), V15.7.0. When SearchSpaceId=0 is configured for pagingSearchSpace, the PDCCH monitoring occasions for paging are same as for RMSI as defined in clause 13 in TS 38.213.

When SearchSpaceId=0 is configured for pagingSearchSpace, Ns is either 1 or 2. For Ns=1, there is only one PO which starts from the first PDCCH monitoring occasion for paging in the PF. For Ns=2, PO is either in the first half frame (i_s=0) or the second half frame (i_s=1) of the PF.

When SearchSpaceId other than 0 is configured for pagingSearchSpace, the UE monitors the $(i\_s+1)^{th}$ PO. A PO is a set of 'S' consecutive PDCCH monitoring occasions where 'S' is the number of actual transmitted SSBs determined according to ssb-PositionsInBurst in SIB1. The $K^{th}$ PDCCH monitoring occasion for paging in the PO corresponds to the $K^{th}$ transmitted SSB. The PDCCH monitoring occasions for paging which do not overlap with UL symbols (determined according to tdd-UL-DL-ConfigurationCommon) are sequentially numbered from zero starting from the first PDCCH monitoring occasion for paging in the PF. When firstPDCCH-MonitoringOccasionOfPO is present, the starting PDCCH monitoring occasion number of $(i\_s+1)^{th}$ PO is the $(i\_s+1)^{th}$ value of the firstPDCCH-MonitoringOccasionOfPO parameter; otherwise, it is equal to i_s*S.

NOTE 1: A PO associated with a PF may start in the PF or after the PF.

NOTE 2: The PDCCH monitoring occasions for a PO can span multiple radio frames. When SearchSpaceId other than 0 is configured for paging-SearchSpace the PDCCH monitoring occasions for a PO can span multiple periods of the paging search space.

The following parameters are used for the calculation of PF and i_s above:

T: DRX cycle of the UE (T is determined by the shortest of the UE specific DRX value(s), if configured by RRC and/or upper layers, and a default DRX value broadcast in system information. If UE specific DRX is not configured by RRC or by upper layers, the default value is applied).

N: number of total paging frames in T

Ns: number of paging occasions for a PF

PF_offset: offset used for PF determination

UE_ID: 5G-S-TMSI mod 1024

Parameters Ns, nAndPagingFrameOffset, and the length of default DRX Cycle are signaled in SIB1. The values of N and PF_offset are derived from the parameter nAndPagingFrareOffset as defined in TS 38.331 Release 15. The parameter first-PDCCH-MonitoringOccasionOfPO is signaled in SIB1 for paging in initial DL BWP. For paging in a DL BWP other than the initial DL BWP, the parameter first-PDCCH-MonitoringOccasionOfPO is signaled in the corresponding BWP configuration.

If the UE has no 5G-S-TMSI, for instance when the UE has not yet registered onto the network, the UE shall use as default identity UE_ID=0 in the PF and i_s formulas above.

5G-S-TMSI is a 48 bit long bit string as defined in 3GPP TS 23.501, System Architecture for the 5G System; Stage 2 (Release 15), V15.6.0. 5G-S-TMSI shall in the formulae above be interpreted as a binary number where the left most bit represents the most significant bit.

Paging DCI

The following information is transmitted by means of the DCI format 1_0 with CRC scrambled by P-RNTI. See Table 1 of the Appendix, Paging DCI (Release 15) and Table 2 of the Appendix, Short Message Indicator, (Release 15). See also 3GPP TS 38.212, NR; Multiplexing and channel coding (Release 15), V15.6.0.

PCCH-Config

The IE DownlinkConfigCommonSIB provides common downlink parameters of a cell. This IE includes the PCCH-Config field, which is used to provide the DRX configuration for the cell. See 3GPP TS 38.331 Release 15, and Code Example 1A—PCCH-Config Field (Release 15) and Code Example 1B—PCCH-Config Field descriptions (Release 15) of the Appendix herein.

NR Paging (Release 16)

Discontinuous Reception for Paging

The UE may use Discontinuous Reception (DRX) in RRC_IDLE and RRC_INACTIVE state in order to reduce power consumption. The UE monitors one paging occasion (PO) per DRX cycle. A PO is a set of PDCCH monitoring occasions and can consist of multiple time slots (e.g. subframe or OFDM symbol) where paging DCI can be sent (see TS 38.213 Release 16). One Paging Frame (PF) is one Radio Frame and may contain one or multiple PO(s) or starting point of a PO.

In multi-beam operations, the UE assumes that the same paging message and the same Short Message are repeated in all transmitted beams and thus the selection of the beam(s) for the reception of the paging message and Short Message is up to UE implementation. The paging message is same for both RAN initiated paging and CN initiated paging.

The UE initiates RRC Connection Resume procedure upon receiving RAN initiated paging. If the UE receives a CN initiated paging in RRC_INACTIVE state, the UE moves to RRC_IDLE and informs NAS.

The PF and PO for paging are determined by the following formulae:

SFN for the PF is determined by:

$$(SFN+PF\_\text{offset}) \bmod T=(T \text{ div } N)*(UE\_ID \bmod N)$$

Index (i_s), indicating the index of the PO is determined by:

$$i\_s=\text{floor}(UE\_ID/N) \bmod Ns$$

The PDCCH monitoring occasions for paging are determined according to pagingSearchSpace as specified in TS 38.213 Release 16 and firstPDCCH-MonitoringOccasionOfPO and nrofPDCCH-MonitoringOccasionPerSSB-InPO if configured as specified in TS 38.331 Release 16. When SearchSpaceId=0 is configured for pagingSearchSpace, the PDCCH monitoring occasions for paging are same as for RMSI as defined in clause 13 in TS 38.213 Release 16.

When SearchSpaceId=0 is configured for pagingSearchSpace, Ns is either 1 or 2. For Ns=1, there is only one PO which starts from the first PDCCH monitoring occasion for paging in the PF. For Ns=2, PO is either in the first half frame (i_s=0) or the second half frame (i_s=1) of the PF.

When SearchSpaceId other than 0 is configured for pagingSearchSpace, the UE monitors the $(i\_s+1)^{th}$ PO. A PO is a set of 'S*X' consecutive PDCCH monitoring occasions where 'S' is the number of actual transmitted SSBs determined according to ssb-PositionsInBurst in SIB1 and X is the nrofPDCCH-MonitoringOccasionPerSSB-InPO if configured or is equal to 1 otherwise. The $[x*S+K]^{th}$ PDCCH monitoring occasion for paging in the PO corresponds to the $K^{th}$ transmitted SSB, where x=0, 1, . . . , X−1, K=1, 2, . . . , S. The PDCCH monitoring occasions for paging which do not overlap with UL symbols (determined according to tdd-UL-DL-ConfigurationCommon) are sequentially numbered from zero starting from the first PDCCH monitoring occasion for paging in the PF. When firstPDCCH-MonitoringOccasionOfPO is present, the starting PDCCH monitoring occasion number of $(i\_s+1)^{th}$ PO is the $(i\_s+1)^{th}$ value of the firstPDCCH-MonitoringOccasionOfPO parameter; otherwise, it is equal to i_s*S*X. If X>1, when the UE detects a PDCCH transmission addressed to P-RNTI within its PO, the UE is not required to monitor the subsequent PDCCH monitoring occasions for this PO. A PO associated with a PF may start in the PF or after the PF. The PDCCH monitoring occasions for a PO can span multiple radio frames.

When SearchSpaceId other than 0 is configured for paging-SearchSpace the PDCCH monitoring occasions for a PO can span multiple periods of the paging search space. The parameters T, N, Ns, PF_offset, and UE_ID are used for the calculation of PF and i_s above.

T pertains to the DRX cycle of the UE. T is determined by the shortest of the UE specific DRX values, if configured by RRC and/or upper layers, and a default DRX value broadcast in system information. In RRC_IDLE state, if UE specific DRX is not configured by upper layers, the default value is applied.

N is the number of total paging frames in T.

Ns is the number of paging occasions for a PF.

PF_offset is an offset used for PF determination.

UE_ID is 5G-S-TMSI mod 1024.

Parameters Ns, nAndPagingFrameOffset, nrofPDCCH-MonitoringOccasionPerSSB-InPO, and the length of default DRX Cycle are signaled in SIB1. The values of N and PF_offset are derived from the parameter nAndPagingFrameOffset as defined in TS 38.331 Release 16. The parameter first-PDCCH-MonitoringOccasionOfPO is signaled in SIB1 for paging in initial DL BWP. For paging in a DL BWP other than the initial DL BWP, the parameter first-PDCCH-MonitoringOccasionOfPO is signaled in the corresponding BWP configuration.

If the UE has no 5G-S-TMSI, for instance when the UE has not yet registered onto the network, the UE shall use as default identity UE_ID=0 in the PF and i_s formulas above.

5G-S-TMSI is a 48 bit long bit string as defined in TS 23.501 Release 16. 5G-S-TMSI shall in the formulae above be interpreted as a binary number where the left most bit represents the most significant bit.

Paging DCI

Table 3 of the Appendix, Paging DCI (Release 16), describes information that may be transmitted by means of the DCI format 1_0 with CRC scrambled by P-RNTI. See also Table 4 of the Appendix, Short Message Indicator (Release 16), and see 3GPP TS 38.212, Release 16:

PCCH-Config

The IE DownlinkConfigCommonSIB provides common downlink parameters of a cell. This IE includes the PCCH-Config field, which is used to provide the DRX configuration for the cell. See 3GPP TS 38.331 Release 16. See Code Example 2A—PCCH-Config Field (Release 16) and Code Example 2B—PCCH Config Field Descriptions (Release 16) of the Appendix.

Short Message

Short Messages can be transmitted on PDCCH using P-RNTI with or without associated Paging message using Short Message field in DCI format 1_0. Table 5 of the Appendix describes Short Messages in 3GPP TS 38.331 Release 16, where bit 1 is the most significant bit.

System Information Handling

System Information (SI) consists of a MIB and a number of SIBs, which are divided into Minimum SI and Other SI:

- Minimum SI comprises basic information required for initial access and information for acquiring any other SI. Minimum SI consists of:
  - MIB contains cell barred status information and essential physical layer information of the cell required to receive further system information, e.g. CORESET #0 configuration. MIB is periodically broadcast on BCH.
  - SIB1 defines the scheduling of other system information blocks and contains information required for initial access. SIB1 is also referred to as Remaining Minimum SI (RMSI) and is periodically broadcast on DL-SCH or sent in a dedicated manner on DL-SCH to UEs in RRC_CONNECTED.
- Other SI encompasses all SIBs not broadcast in the Minimum SI. Those SIBs can either be periodically broadcast on DL-SCH, broadcast on-demand on DL-SCH (e.g., upon request from UEs in RRC_IDLE or RRC_INACTIVE), or sent in a dedicated manner on DL-SCH to UEs in RRC_CONNECTED. Other SI consists of:
  - SIB2 contains cell re-selection information, mainly related to the serving cell;
  - SIB3 contains information about the serving frequency and intra-frequency neighboring cells relevant for cell re-selection (including cell re-selection parameters common for a frequency as well as cell specific re-selection parameters);

SIB4 contains information about other NR frequencies and inter-frequency neighboring cells relevant for cell re-selection (including cell re-selection parameters common for a frequency as well as cell specific re-selection parameters);

SIB5 contains information about E-UTRA frequencies and E-UTRA neighboring cells relevant for cell re-selection (including cell re-selection parameters common for a frequency as well as cell specific re-selection parameters);

SIB6 contains an ETWS primary notification;

SIB7 contains an ETWS secondary notification;

SIB8 contains a CMAS warning notification;

SIB9 contains information related to GPS time and Coordinated Universal Time (UTC).

FIG. 1 illustrates an example of system information provisioning. For a cell/frequency that is considered for camping by the UE, the UE is not required to acquire the contents of the minimum ST of that cell/frequency from another cell/frequency layer. This does not preclude the case that the UE applies stored ST from previously visited cell(s).

If the UE cannot determine the full contents of the minimum SI of a cell by receiving from that cell, the UE shall consider that cell as barred.

In case of BA, the UE only acquires SI on the active BWP.

Scheduling

The MTB is mapped on the BCCH and carried on BCH while all other ST messages are mapped on the BCCH, where they are dynamically carried on DL-SCH. The scheduling of SI messages part of Other SI is indicated by SIB1.

For UEs in RRC_IDLE and RRC_INACTIVE, a request for Other SI triggers a random access procedure where MSG3 includes the SI request message unless the requested SI is associated to a subset of the PRACH resources, in which case MSG1 is used for indication of the requested Other SI. When MSG1 is used, the minimum granularity of the request is one SI message (e.g., a set of SIBs), one RACH preamble and/or PRACH resource can be used to request multiple SI messages and the gNB acknowledges the request in MSG2. When MSG 3 is used, the gNB acknowledges the request in MSG4.

The Other SI may be broadcast at a configurable periodicity and for a certain duration. The Other SI may also be broadcast when it is requested by UE in RRC_IDLE/RRC_INACTIVE.

For a UE to be allowed to camp on a cell it must have acquired the contents of the Minimum SI from that cell. There may be cells in the system that do not broadcast the Minimum SI and where the UE therefore cannot camp.

SI Modification

Change of system information (other than for ETWS/CMAS) only occurs at specific radio frames, e.g., the concept of a modification period is used. System information may be transmitted a number of times with the same content within a modification period, as defined by its scheduling. The modification period is configured by system information.

When the network changes (some of the) system information, it first notifies the UEs about this change, e.g., this may be done throughout a modification period. In the next modification period, the network transmits the updated system information. Upon receiving a change notification, the UE acquires the new system information from the start of the next modification period. The UE applies the previously acquired system information until the UE acquires the new system information. See 3GPP TS 38.300, NR; NR and NG-RAN Overall Description; Stage 2 (Release 15), V15.7.0.

Public Warning System

NR connected to 5GC provides support for public warning systems (PWS) through means of system information broadcast capability. NR is responsible for scheduling and broadcasting of the warning messages as well as for paging the UE to provide indication that the warning message is being broadcast:

Earthquake and Tsunami Warning System: ETWS is a public warning system developed to meet the regulatory requirements for warning notifications related to earthquake and/or tsunami events. ETWS warning notifications can either be a primary notification (short notification) or secondary notification (providing detailed information).

Commercial Mobile Alert System: CMAS is a public warning system developed for the delivery of multiple, concurrent warning notifications.

Different SIBs are defined for ETWS primary notification, ETWS secondary notification and CMAS notification. Paging is used to inform UEs about ETWS indication and CMAS indication. UE monitors ETWS/CMAS indication in its own paging occasion for RRC_IDLE and RRC_INACTIVE. UE monitors ETWS/CMAS indication in any paging occasion for RRC Connected. Paging indicating ETWS/CMAS notification triggers acquisition of system information (without delaying until the next modification period). See TS 38.300 Release 15.

UE Assistance Information

When configured to do so, the UE can signal the network through UEAssistanceInformation. For example, the UE may signal that it prefers an adjustment in the connected mode DRX cycle length, for the purpose of delay budget reporting, or that it is experiencing internal overheating. The UE may signal that it prefers certain DRX parameter values, and/or a reduced maximum number of secondary component carriers, and/or a reduced maximum aggregated bandwidth and/or a reduced maximum number of MIMO layers and/or minimum scheduling offsets K0 and K2 for power saving purpose. The UE may signal that it expects not to send or receive any more data in the near future, and in this case, it can provide its preference to transition out of RRC_CONNECTED where this indication may express its preferred RRC state, or alternately, it may cancel an earlier indicated preference to transition out of RRC_CONNECTED. The UE may signal a list of frequencies affected by IDC problems. See TS 38.300 Release 16.

The UE can express a preference for temporarily reducing the number of maximum secondary component carriers, the maximum aggregated bandwidth and the number of maximum MIMO layers. The gNB determines whether to accommodate the request.

For sidelink, the UE can report SL traffic pattern(s) to NG-RAN, for periodic traffic.

Example Challenges

For cost efficiency reasons, a multi-USIM UE typically uses common radio and baseband components that are shared among the multiple USIMs. Time-Division-Multiplexing (TDM) of the shared components can be used to maintain connections with multiple NWs. However, when AS procedures for multiple USIMs need to be performed simultaneously, "collisions" may occur, which can result in the AS procedures being delayed, being performed sub-optimally or even failing. Herein, we consider the impacts such "collisions" will have on AS procedures performed by a UE in RRC_IDLE/RRC_INACTIVE mode and propose solutions to resolve them.

For example, to maintain a connection with the NW, a UE in RRC_IDLE/RRC_INACTIVE is required to perform the SI Acquisition and Paging procedures. When performing these procedures, the UE monitors the downlink at specific times to receive the SI or Paging DCI. In multi-beam operation, a set of PDCCH monitoring occasions is used for SI acquisition and paging reception. A collision may occur for one or more of the PDCCH monitoring occasions in the set of PDCCH monitoring occasions; e.g., a partial or full collision. When a collision occurs, the UE will be unable to receive the downlink during one or more of the PDCCH monitoring occasions in this set, which may result in the UE being unable to acquire the SI or receive the Paging DCI.

In the case of SI acquisition, collisions can increase the latency associated with obtaining the SI. A UE that is unable to perform the SI Acquisition procedure quickly and reliably may be unable to establish/resume an RRC connection when it is triggered due to having invalid SI. Delaying the RRC Connection/Resume procedure until valid SI is acquired may be unacceptable depending on the event that triggered the procedure. Another impact that can result is selection of a suboptimal cell when performing the Cell (Re-)Selection procedure. If a UE is unable to acquire the MIB or SIB1 for a candidate cell when performing the Cell Reselection Evaluation process, the UE may erroneously consider the cell as "barred" for up to 300 seconds. This can result in selection of weaker cell, which may require the UE to continue to perform the Cell Reselection Evaluation process; or selection of a cell where the UE can only obtain limited service; e.g., originate emergency calls and receive ETWS and CMAS notifications.

In the case of paging, collisions can cause the UE to miss Mobile Terminated (MT) calls. This can result in the NW erroneously assuming a failure has occurred, which can lead to the NW taking corrective actions unnecessarily and a distortion of the call statistics maintained by the NW. For example, the NW may attempt to page the UE in a wider area, thereby increasing the signaling load. And if subsequent paging attempts also fail, the state machines maintained by the NW may transition to a different state, thereby resulting in state machine mismatches between the UE and NW. In addition, since PWS notifications and SI change indications are signaled in the Short Message, which is transmitted via the Paging DCI, a UE that is unable to monitor for paging may miss important ETWS or CMAS messages in the case of missing a PWS notification; or may be unaware of an SI change in the case of missing an SI change indication.

Collisions may be isolated or systemic in nature. For example, for the scenario where two USIMs are in RRC_IDLE/RRC_INACTIVE mode, collisions with the PDCCH monitoring occasions for SI acquisition can be considered isolated, since the events triggering an SI acquisition procedure are aperiodic and will not persist for an extended period of time; e.g. upon cell (re-)selection, upon receiving a PWS notification or SI change indication, etc. Scenarios where such collisions may occur include when attempting to simultaneously perform SI Acquisition procedures for multiple USIMs, when attempting to perform an SI Acquisition procedure for one USIM and Idle Mode measurements for another USIM, or when attempting to simultaneously perform an ST Acquisition for one USIM and a Paging procedure for another USIM.

On the other hand, systemic collisions may persist indefinitely. If we again consider the scenario where two USIMs are in RRC_IDLE/RRC_INACTIVE mode, such collisions may occur when the paging configurations for each USIM are such that the PDCCH monitoring occasions for paging collide. Since a PO is by definition periodic, the collisions will occur repeatedly, which can lead to failure of the Paging procedure for one or both USIMs. Systemic collisions may also occur for the scenario where one USIM is in RRC_IDLE/RRC_INACTIVE mode and the other USIM is in RRC_CONNECTED mode. If the traffic pattern for the USIM in RRC_CONNECTED mode results in a high utilization of the shared components, collisions will likely occur when any AS procedure is initiated for the other USIM, regardless of the periodicity or duration of the AS procedure. This can lead to a disruption in the call established for the USIM in RRC_CONNECTED mode and/or failure of the AS procedures for the USIM in RRC_IDLE/RRC_INACTIVE mode.

Support for multi-USIM UEs is currently handled in an implementation-specific manner without support from the 3GPP specifications. This leads to a variety of UE behaviors when handling collisions that can be unreliable and power inefficient. With the increased complexity of 5G-capable UEs and the growing demand for multi-USIM UEs in the market, leaving multi-USIM support to implementation is no longer practical. Therefore, to ensure multi-USIM UEs can operate reliably and efficiently in 5G networks, there is a need to standardize the UE behavior associated with TDM sharing of common baseband and radio components; and to define new NW behavior/actions in support of the new UE behavior. For UEs in RRC_IDLE/RRC_INACTIVE mode, this will require enhancements to the SI and Paging procedures that will allow a UE to avoid collisions when possible; and to resolve them in a predictable and reliable manner if and when they do occur.

Collision Avoidance Solutions

A UE may determine that collisions are likely to occur based on the UE configuration for the multiple USIMs; e.g. Paging configuration, SMTC configuration, SI-SchedulingInfo configuration, C-DRX configuration, etc.

Collisions may then be avoided by reconfiguring the UE such that the monitoring occasions and transmission opportunities associated with the AS procedures performed by one USIM do not overlap in time with the monitoring occasions and transmission opportunities associated with the AS procedures performed by another USIM. For scenarios where one of the USIMs is in RRC_CONNECTED mode, this reconfiguration may include suspending or releasing the RRC connection.

The solutions described herein are for the general case where the USIMs attach to different networks. However, the solutions may also be applied for scenarios where the multiple USIMs attach to the same network, e.g. RAN sharing, intra-MNO and NW slicing uses cases. In such scenarios, additional optimization of the solutions may be applied; e.g. selection of the same NW slicing and/or same serving cell or RAN slicing for multiple USIMs, selection of the same PO for multiple USIMs, configuration of POs close in time to enable waking up only once to monitor POs for the multiple USIMs, etc.

Methods to Determine when Collisions Will Occur

A UE may determine when collisions will occur based on the configuration for the multiple USIMs; e.g. Paging configuration, SMTC configuration, SI-SchedulingInfo configuration, C-DRX configuration, etc. In the general case, time synchronization cannot be assumed between networks, therefore a UE must take into consideration any non-zero timing offset that may exist between the networks when determining when collisions will occur. We define this non-zero timing offset as the observed SFN and Frame Timing Difference (SFTD) between the PCells of a multi-USIM UE, which is comprised of the following two components:

SFN offset=$(SFN_{PCell\_USIMx}-SFN_{PCell\_USIMy})$ mod 1024, where $SFN_{PCell\_USIMx}$ is the SFN of a PCell radio frame for the NW to which $USIM_x$ is connected and $SFN_{PCell\_USIMy}$ is the SFN of the PCell radio frame for the NW to which $USIM_y$ is connected, of which the UE receives the start closest in time to the time when it receives the start of the PCell radio frame for $USIM_x$.

Frame boundary offset=$\lfloor(T_{FrameBoundaryPCell\_USIMx}-T_{FrameBoundaryPCell\_USIMy})/5\rfloor$, where $T_{FrameBoundaryPCell\_USIMx}$ is the time when the UE receives the start of a radio frame from the PCell for the NW to which $USIM_x$ is connected, $T_{FrameBoundaryPCell\_USIMy}$ is the time when the UE receives the start of the radio frame, from the PCell for the NW to which $USIM_y$ is connected, that is closest in time to the radio frame received from the PCell. The unit of $(T_{FrameBoundaryPCell}-T_{FrameBoundaryPSCell})$ is Ts.

Figure 2:
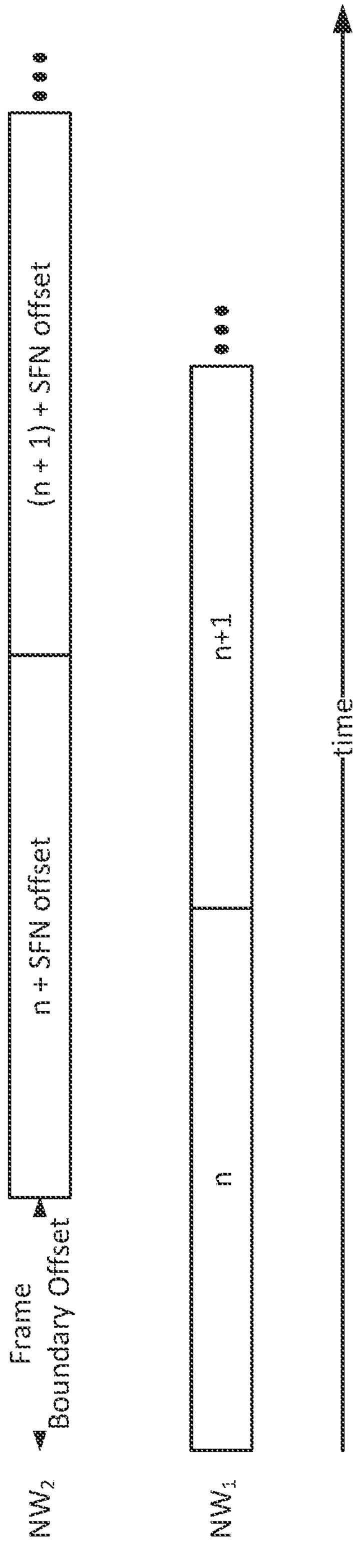
FIG. 2 is timing diagram illustrating example SFTD between PCells of a Multi-USIM UE.

FIG. 2 is timing diagram illustrating example SFTD between PCells of a Multi-USIM UE.

Figure 3A:
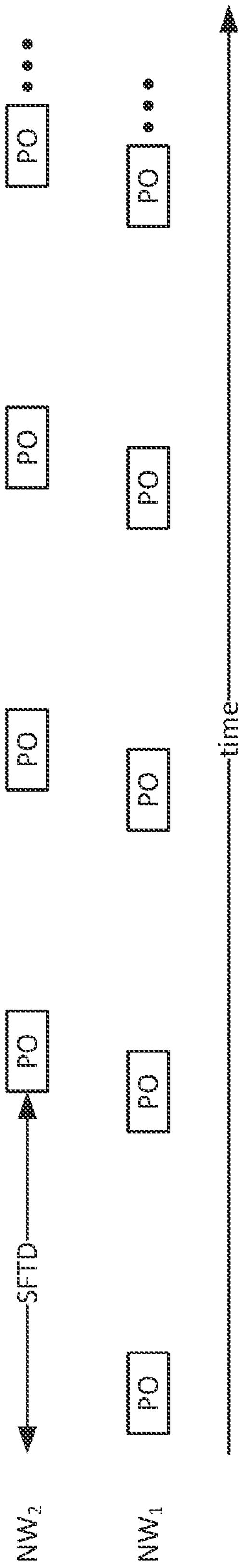
FIGS. 3A-B are timing diagrams illustrating multi-USIM configurations with and without paging collisions.
Figure 3B:
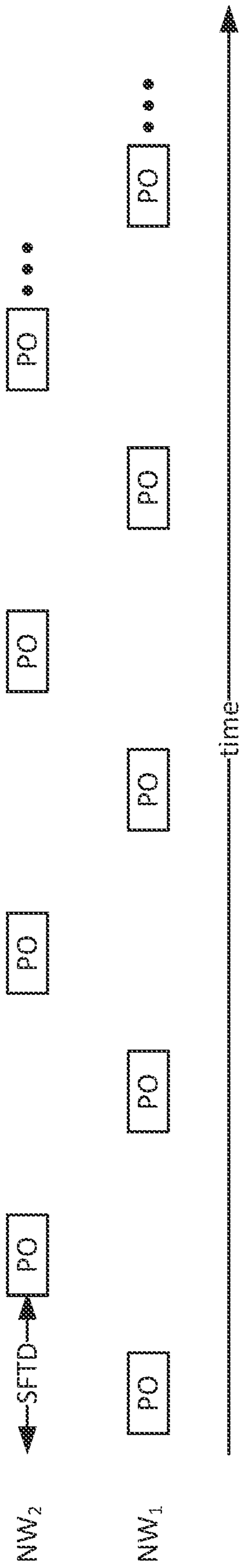

When determining if paging collisions will occur, the UE first calculates the PF and PO for each network according to the paging configurations. The SFTD between the PCells of the multi-USIM UE is then used to offset the POs of one USIM with respect to the other to determine if any collisions will occur as shown in FIGS. 3A and 3B.

For scenarios where two USIMs are configured with the same DRX cycles; e.g., $T_1=T_2$, paging collisions may occur every DRX cycle as shown in FIG. 4A. For scenarios where two USIMs are configured with different DRX cycles, e.g., $T_1\neq T_2$, paging collisions may occur every DRX cycle from the perspective of the USIM with the longer DRX cycle and every 2, 4 or 8 DRX cycles from the perspective of the USIM with the shorter DRX cycle as shown in FIGS. 4A-C. How often the collisions occur depends on the ratio of the DRX cycles for the two USIMs, where the DRX cycle T may be configured as 32, 64, 128, or 256 radio frames. See 3GPP TS 38.331 Release 15. We define the parameter M to represent how often paging collisions between $USIM_1$ and $USIM_2$ may occur from the perspective of $USIM_1$ as follows:

$$M=\mathrm{MAX}(\mathrm{DIV}(T_2/T_1),1)$$

Figure 5:
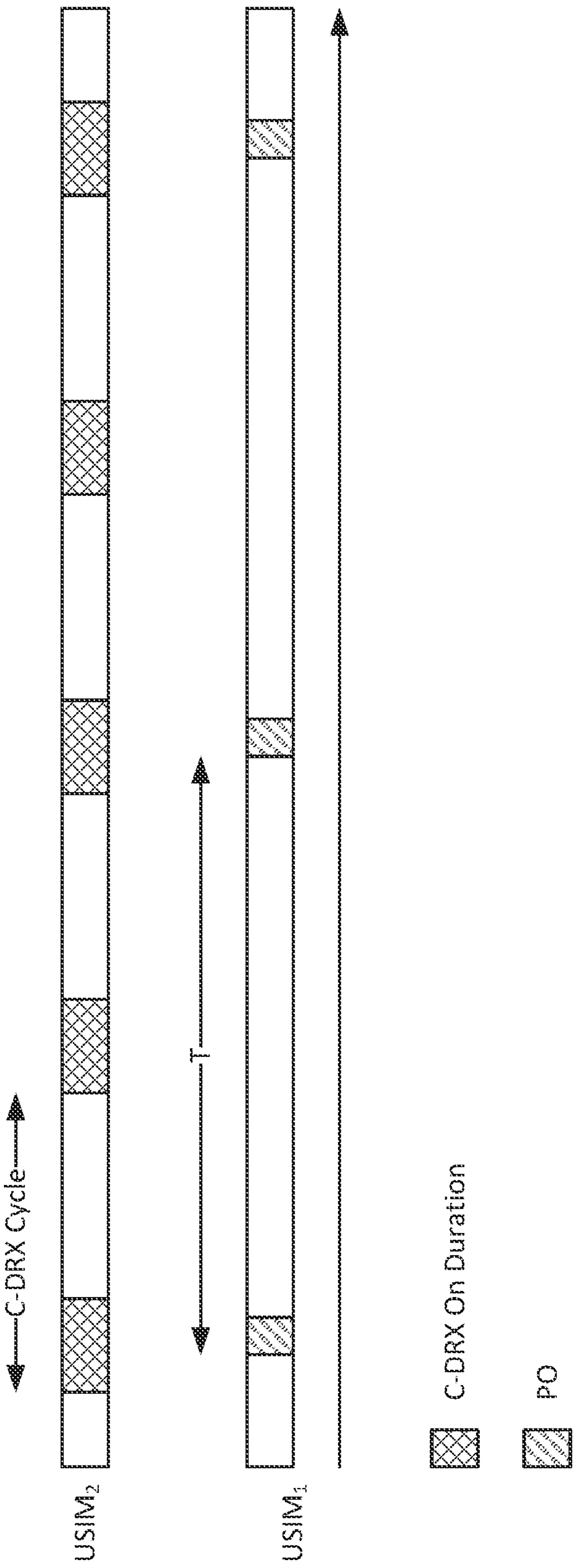
FIG. 5 is a timing diagram illustrating paging collisions with C-DRX on duration.

Similar methods may also be applied to determine collisions with SI windows used for acquiring the SI as specified in the SI-SchedulingInfo configuration for a USIM in RRC_IDLE/RRC_INACTIVE, RRM measurement occasions as specified in the SMTC configuration for a USIM in RRC_IDLE/RRC_INACTIVE or the active time as specified in the C-DRX configuration for a USIM in RRC_CONNECTED mode. FIG. 5 is an illustration of a scenario showing paging collisions with the C-DRX On Duration for a UE in RRC_IDLE/RRC_INACTIVE mode for $USIM_1$ and in RRC_CONNETCED for $USIM_2$.

When SearchSpaceId=0 is configured for pagingSearchSpace, similar methods may also be applied to determine collisions by comparing the PDCCH monitoring occasions corresponding to paging and RMSI for $USIM_1$ and the PDCCH monitoring occasions corresponding to paging and RMSI for USIM2, as example. When SearchSpaceId other than 0 is configured for pagingSearchSpace, similar methods may also be applied to determine collisions by comparing the set of S1 consecutive PDCCH monitoring occasions corresponding to S1 transmitted SSBs for USIM1 and the set of S2 consecutive PDCCH monitoring occasions corresponding to S2 transmitted SSBs for USIM2, as an example, wherein S1 is determined according to ssb-PositionsInBurst in SIB1 for USIM1 and S2 is determined according to ssb-PositionsInBurst in SIB1 for $USIM_2$ respectively.

PO Skipping

PO skipping may be used to avoid collisions for a USIM in RRC_IDLE/RRC_INACTIVE mode. When PO skipping is configured, the UE does not monitor for paging during the skipped PO. The network behavior may also be modified when PO skipping is configured; e.g. the network does not page the UE during a skipped PO, the network repeats the paging message in multiple POs, etc.

Rule-Based PO Skipping

Rule-based PO skipping may be defined to allow PO skipping for one or more USIMs to avoid paging collisions. For scenarios where the USIMs are configured with the same DRX cycle; e.g., $T_1=T_2$, a collision may occur every DRX cycle as shown in FIG. 4A. To avoid paging collisions, the UE may alternate for which USIM a PO is monitored. However, if the network pages a UE during a PO that the UE is not monitoring, the page will be missed. To ensure the page is not missed, the network may repeat the paging in multiple consecutive POs thereby allowing the UE to choose the PO in which to receive the page—for example, during the PO used for the initial paging transmission; e.g., the Initial PO, or the PO(s) used for the repeated paging transmission(s); e.g., the Repeated PO(s).

The UE may inform the network that it is a multi-USIM UE upon registration, thereby enabling the network to only perform paging repetition for a multi-USIM UE. The Paging Repetition Cycle may be defined as nT, where n is the number of USIMs configured for a multi-USIM UE and T is the DRX cycle. The parameter n may also be signaled to the network upon registration.

The UE may use NAS signaling to inform the network it is a multi-USIM UE, and the CN may then inform the RAN of the UE's multi-USIM capabilities. Alternatively, the UE may inform the RAN it is a multi-USIM UE using AS signaling, and the RAN may inform the CN of the UE's multi-USIM capabilities. AS signaling used to inform the RAN it is a multi-USIM UE may be implemented using an existing procedure; e.g. RRC Connection Establishment, RRC Connection Resume, UE Assistance Information, UE Capability Transfer. Alternatively, a new RRC procedure may be defined.

Figure 6:
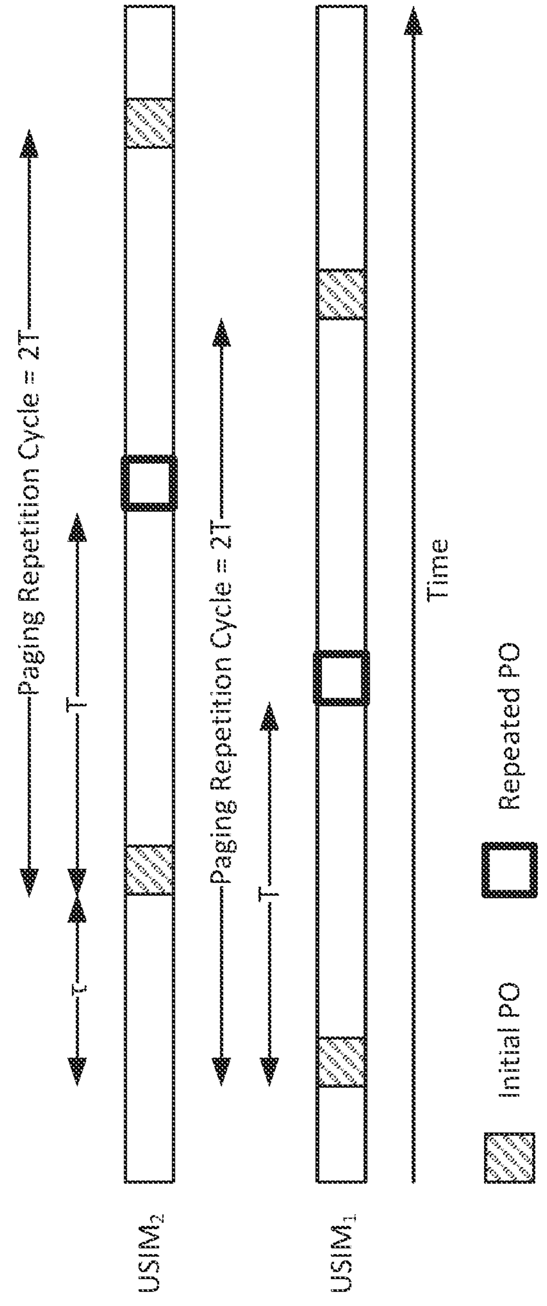
FIG. 6 is a timing diagram of a paging repetition example.

FIG. 6 is an illustration of the scenario where $USIM_1$ and $USIM_2$ are configured with the same DRX cycle T. The Paging Repetition Cycle is defined as 2T for each network, and the initial PO for each DRX cycle for $USIM_1$ and $USIM_2$ is offset by a value r, where $0\leq\tau<2T$. Depending on the value of $\tau$, a collision (full or partial) may occur between the POs of the two USIMs.

In one aspect of the embodiment, paging repetition is performed for all multi-USIM UEs regardless of the value of $\tau$; e.g., whether or not paging collisions actually occur. Alternatively, Paging Repetition may only be performed when the value of t is such that paging collisions will actually occur. When using this alternative, UE signaling to facilitate enabling/disabling of paging repetition is required. For example, the UE may determine that the value of T is such that paging collisions will occur and may send an indication to the network to inform it of this. Alternatively, the UE may signal the value of r or information about the paging configuration for the other networks so the network can determine if a paging collision will occur, and will enable/disable paging repetition accordingly.

When UE signaling is required to enable/disable PO skipping, a multi-USIM UE may include a PO Skipping indicator within an Initial Registration if the UE wants the CN to manage the PO skipping with the RAN node. Alternatively, the UE may perform the PO skipping more dynamically by including the PO Skipping indicator in either a Mobility Registration Update or a Periodic Registration Update procedure. This may be requested after a multi-USIM UE registers for each USIM and sometime after, determines there is potential for paging collisions between or among the USIMs. As another alternative, the PO Skipping indicator may be included in the Registration Complete message sent after a UE receives a Registration Accept response.

And in another alternative, the UE may provide the PO Skipping indicator, the parameter n, and any other relevant info to the RAN node via AS signaling. For example, using the RRCSetupRequest message when performing an RRC Connection Establishment procedure; using the RRCResumeRequest/RRCResumeRequest1 message when performing an RRC Connection Resume procedure; or using the UEAssistanceInformation message when performing a UE Assistance Information procedure.

Figure 7:
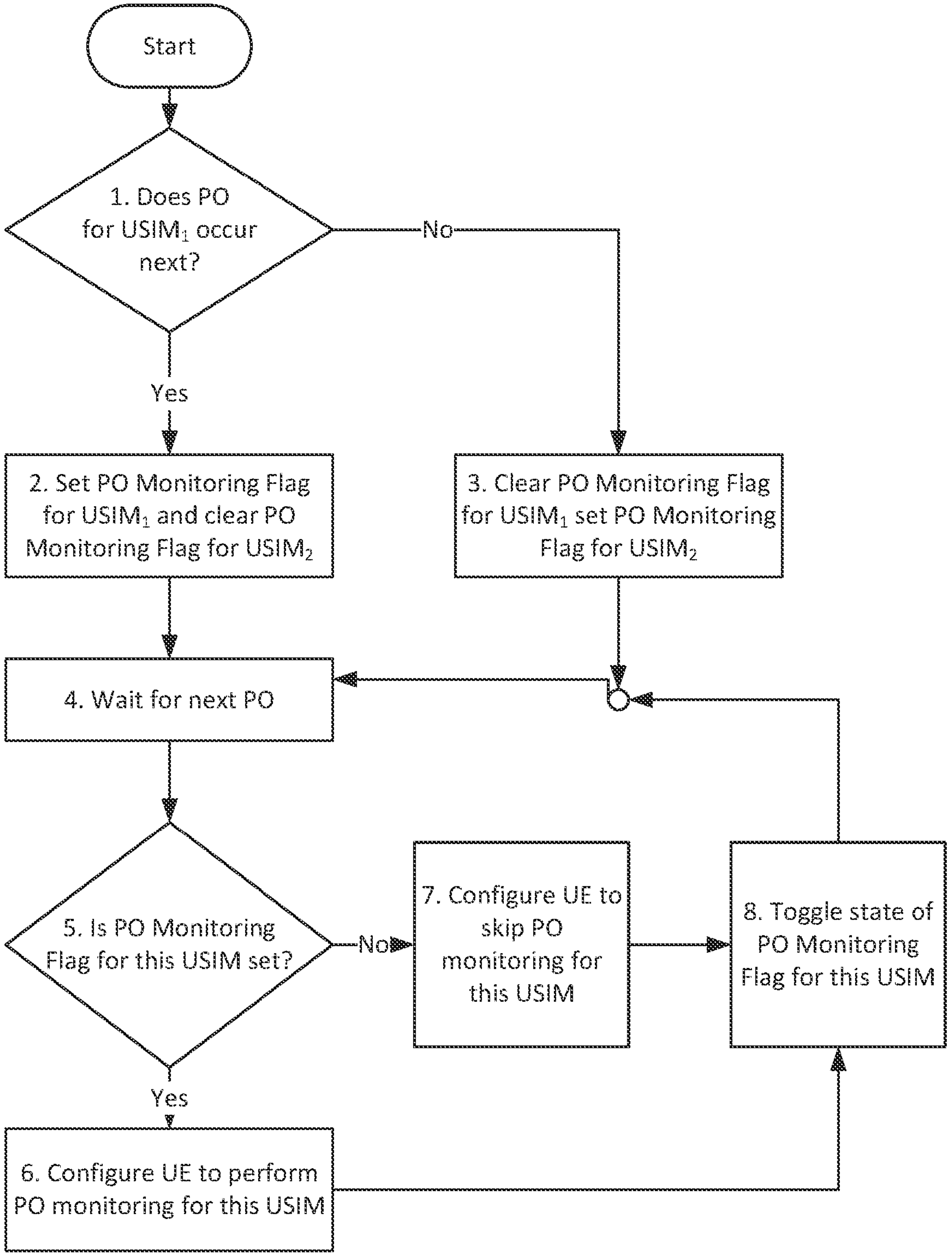
FIG. 7 is a flow diagram of an example algorithm to perform PO skipping for every other PO.

FIG. 7 is a flow chart for an example algorithm where the UE performs PO skipping every other PO. The algorithm may be used for scenarios where a UE has 2 USIMs configured with the same DRX cycle.

In step 1 of FIG. 7, the UE determines which PO will occur next. Alternatively, the UE can select to start with USIM1 or USIM2 regardless of which PO will occur next and proceed with step 2 or step 3 accordingly. This alternative may be used as a simplification to avoid having to determine when the POs will occur relative to each other in time.

In step 2, if the PO for USIM1 occurs next, the UE sets the PO Monitoring Flag for USIM1 and clears the PO Monitoring Flag for USIM2.

In step 3, if the PO for USIM2 occurs next, the UE clears the PO Monitoring Flag for USIM1 and sets the PO Monitoring Flag for USIM2. For multi-USIM UEs with more than two USIMS, steps 1 and 3 may be repeated to check the presence of PO of the additional USIMs.

In step 4, the UE waits until the next PO occurs.

In step 5, the UE determines if the PO Monitoring Flag is set for the USIM whose PO occurred (or is about to occur), In step 6, if the PO Monitoring Flag is set for this USIM, the UE configures lower layers to perform PO monitoring for this USIM.

In step 7, if the PO Monitoring Flag is not set for this USIM, the configures lower layers to skip PO monitoring for this USIM.

In step 8, the UE toggles the state of the PO monitoring Flag for this USIM and returns to step 4.

Figure 8:
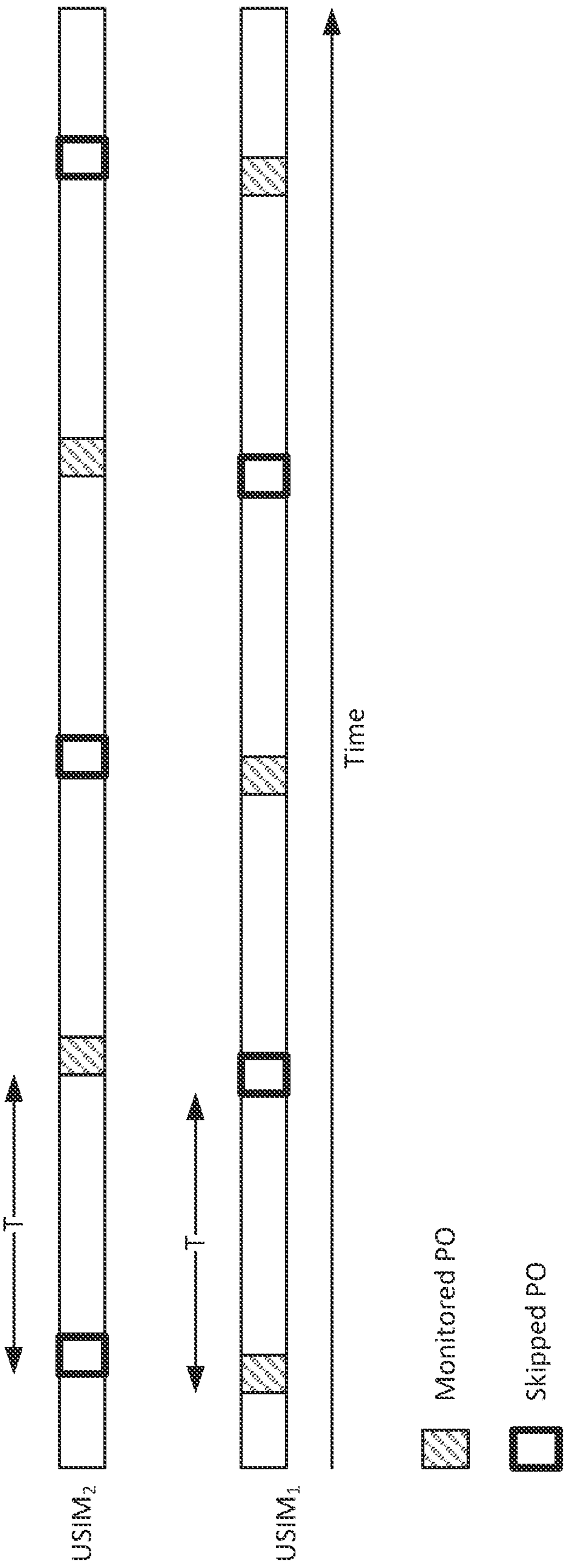
FIG. 8 is a timing diagram illustrating of PO skipping for every other PO.

FIG. 8 is an illustration of the POs that are monitored/skipped in accordance with the algorithm to perform PO skipping every other PO for scenarios where the USIMs are configured with same DRX cycles, e.g., $T_1=T_2$. In this example, the PO for $USIM_1$ is assumed to occur first.

To ensure the DRX cycles for each USIM are the same, the network behavior may be defined such that the same UE specific DRX cycle is configured for all multi-USIM UEs; and the UE behavior for a multi-USIM UE may be defined such that the UE always uses the UE specific DRX cycle, rather than using the shortest of the UE specific DRX cycle and the default value broadcast in the SI. In one aspect of the invention, the network may use NAS signaling to configure the same UE specific DRX cycle for all multi-USIM UEs when the UE registers with the network. For example, the core network may select an appropriate DRX cycle for multi-USIM UEs by returning it in the Accepted DRX parameters element of the Registration Accept message. Alternatively, for scenarios where the DRX cycles may be different, the UE may request modification of its DRX cycle using NAS or RRC signaling, to ensure the DRX cycle for each USIM is the same. For UEs in RRC_INACTIVE, the CN may provide information about the desired UE specific DRX cycle to the RAN node to ensure the DRX cycle is the same as the DRX cycle for the other USIM(s).

For scenarios where two USIMs are configured with different DRX cycles, e.g., $T_1 \neq T_2$, paging collisions may occur every M DRX cycles as shown FIGS. 4B-4D. Applying the algorithm to perform PO skipping for every other PO can result in POs that are monitored/skipped as shown in FIGS. 9A and 9B for scenarios where $T_2=2T_1$. If the PO for the USIM with the longer DRX cycle occurs first as shown in FIG. 9A, the POs are skipped such that paging can be received from both networks reliably assuming a Paging Repetition Cycle of 2 is configured. But if the PO for the USIM with the shorter DRX cycle occurs first as shown in FIG. 9B, collisions will occur, and the paging will not be received reliably from either network.

Figure 10:
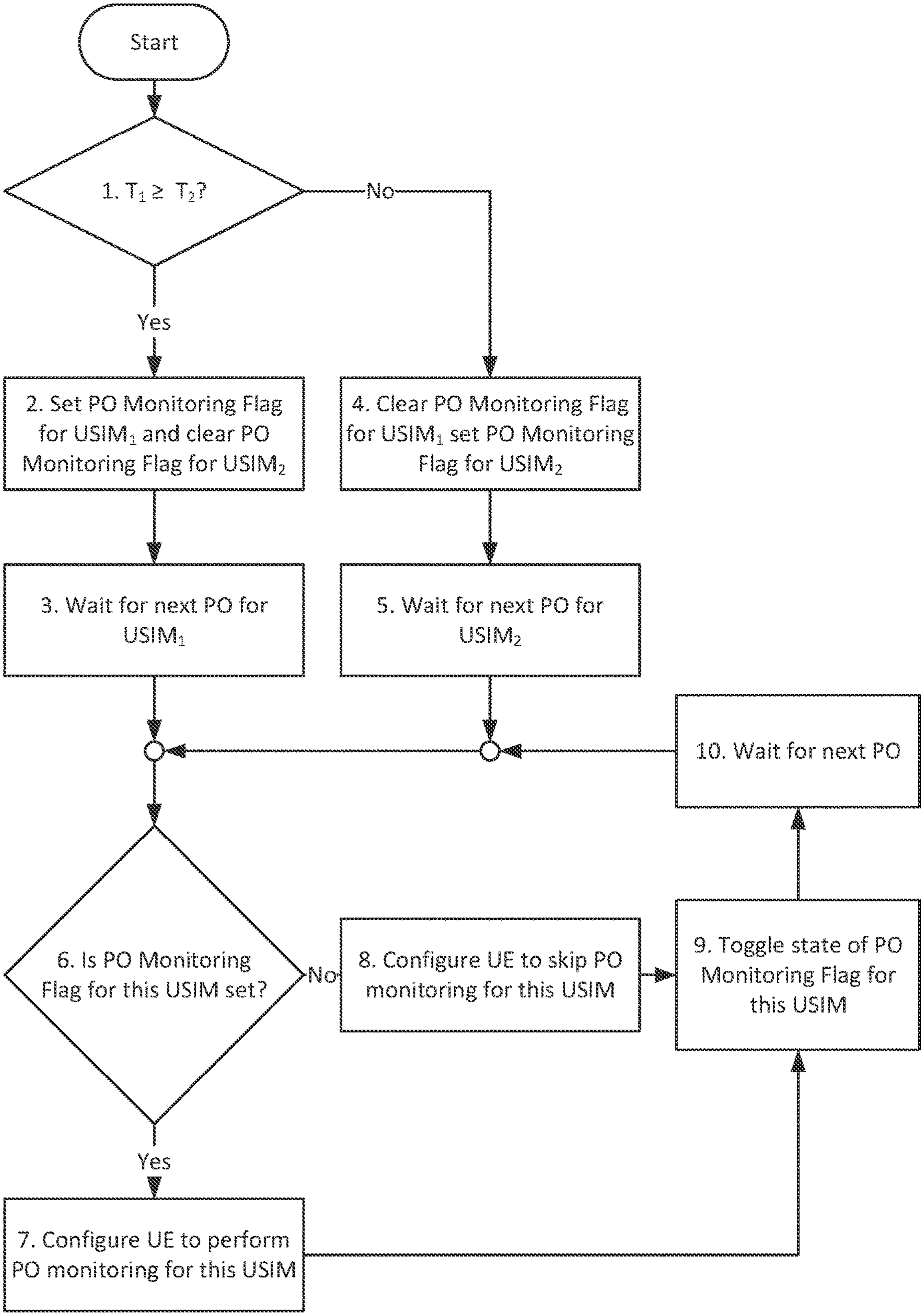
FIG. 10 is a flow chart of an example algorithm to perform PO skipping for every other PO that supports USIMs with different DRX cycles.

To alleviate this problem, the algorithm can be modified such that values of the PO Monitoring Flags for each USIM are initialized when the first PO for the USIM with the longer DRX cycle occurs. FIG. 10 is the flow chart for an example algorithm where the UE performs PO skipping every other PO that also supports scenarios where $T_1 \neq T_2$.

Figure 11:
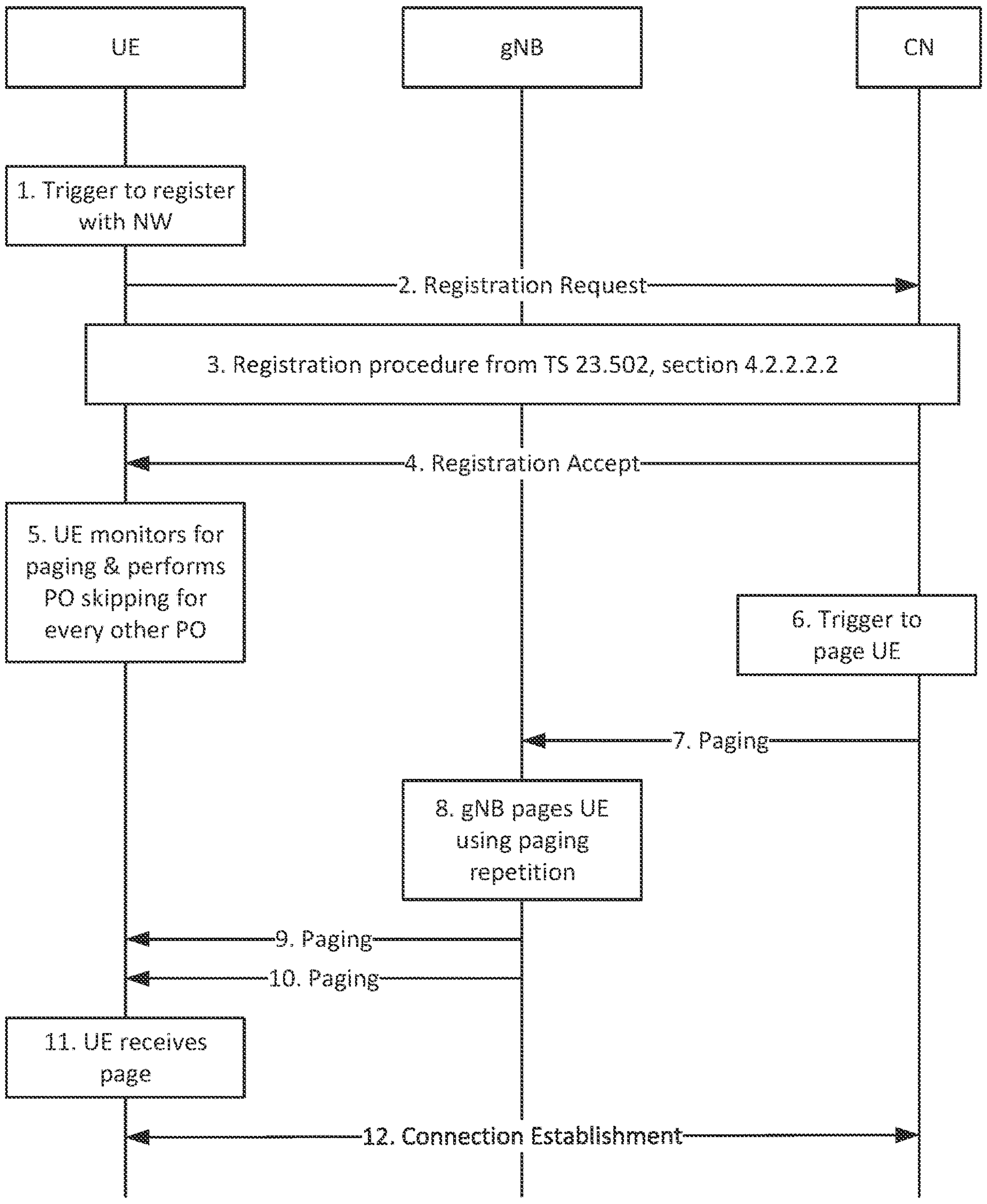
FIG. 11 is a call flow diagram illustrating an example configuration of PO skipping during a registration procedure.

FIG. 11 is a signaling diagram for configuration of PO skipping during the registration procedure. In step 1 of FIG. 11, the UE receives a trigger to register with the NW.

In step 2, the UE transmits a Registration Request message to the CN that indicates it is a multi-USIM UE. The UE may also indicate how many USIMs it has configured. The UE may also indicate a preferred DRX cycle to be used. And in another alternative, the UE signals a parameter that relates the DRX cycle relationship between the USIMs; e.g. the ratio of the DRX cycles. Reception of an indication that the UE is a multi-USIM UE may be used to implicit indicate that the UE would like to enable PO repetition. Alternatively, the UE may include an explicit PO Repetition indication to request PO repetition is enabled.

In step 3, the CN executes the registration procedure from TS 23.502 and registers the UE as a multi-USIM UE. The CN may also configure a DRX cycle that it uses for all multi-USIM UEs as previously mentioned and return the value in the Accepted DRX parameters element of the Registration Accept message. If the UE had included the PO Repetition indication, the CN saves it in the UE context maintained for the UE to be use whenever the UE needs to be paged in the future.

In step 4, the CN transmits a Registration Accept message to the UE to indicate the registration request was accepted. The message may include the following: a CN configured DRX cycle and an acknowledgement that PO Repetition is enabled, and the parameter N was received. This information may also be added to N2 signaling to inform the RAN node to enable PO Repetition and use the configured DRM cycle.

In step 5, the UE monitors for paging and performs PO skipping for every other PO.

In step 6, the CN receives a trigger to page the UE.

In step 7, the CN transmits a paging message to the gNB and may also provide the gNB with info about the UE's preferred DRX cycle. In addition, the CN may inform the gNB to enable PO Skipping if it was configured by the UE previously and also provide the parameter N that is associated with the UE.

In step 8, the gNB pages the UE using paging repetition

In step 9, the gNB pages the UE using the Initial PO.

In step 10, the gNB pages the UE using the Repeated PO.

In step 11, the UE receives the page in either the Initial or Repeated PO.

In step 12, the UE establishes a connection with the network.

Figure 12:
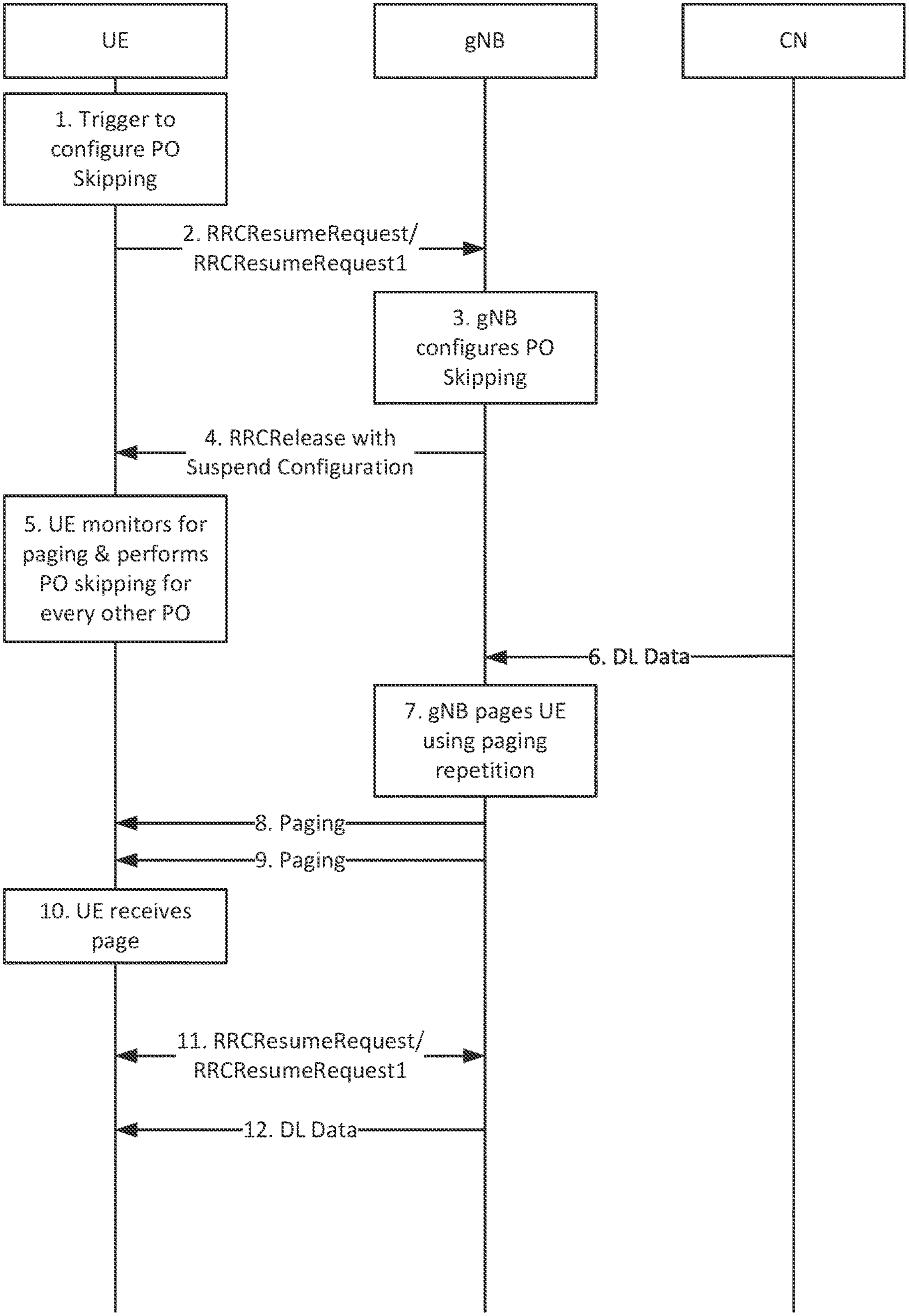
FIG. 12 is a call flow diagram illustrating an example configuration of PO skipping during an RRC connection resume procedure.

FIG. 12 is a signaling diagram for configuration of PO skipping during the RRC Connection Resume procedure.

In step 1 of FIG. 12, the UE detects an event which triggers it to configure PO skipping. Events triggering PO skipping may include the determination that collisions will occur based on the UE configuration for the multiple USIMs, detection of one or more paging collisions, commencement of an AS procedure for another USIM, transition to RRC_CONNECTED state for another USIM, configuration of DC for another USIM, etc., or any combination thereof.

In step 2, the UE transmits an RRCResumeRequest/RRCResumeRequest1 message to configure PO skipping.

In step 3, the gNB configures PO Skipping.

In step 4, the gNB transmits an RRCRelease message that includes suspendConfig.

In step 5, upon receipt of the RRCRelease message, the UE transitions to RRC_INACTIVE and performs PO skipping every other PO. For scenarios where the UE is configured with n USIMs, the UE skips (n−1) POs; i.e. only 1 of every n POs is monitored.

In step 6, DL data for the UE is forwarded to the gNB.

In step 7, the gNB pages the UE using paging repetition, the Paging Repetition Cycle may be defined as nT, where n is the number of USIMs configured for a multi-USIM UE and T is the DRX cycle.

In step 8, the gNB pages the UE using the Initial PO.

In step 9, the gNB pages the UE using the Repeated PO.

In step 10, the UE receives the page in either the Initial or Repeated PO.

In step 11, the UE resumes the RRC connection with the network.

In step 12, the UE receives the DL data from the network.

Figure 13:
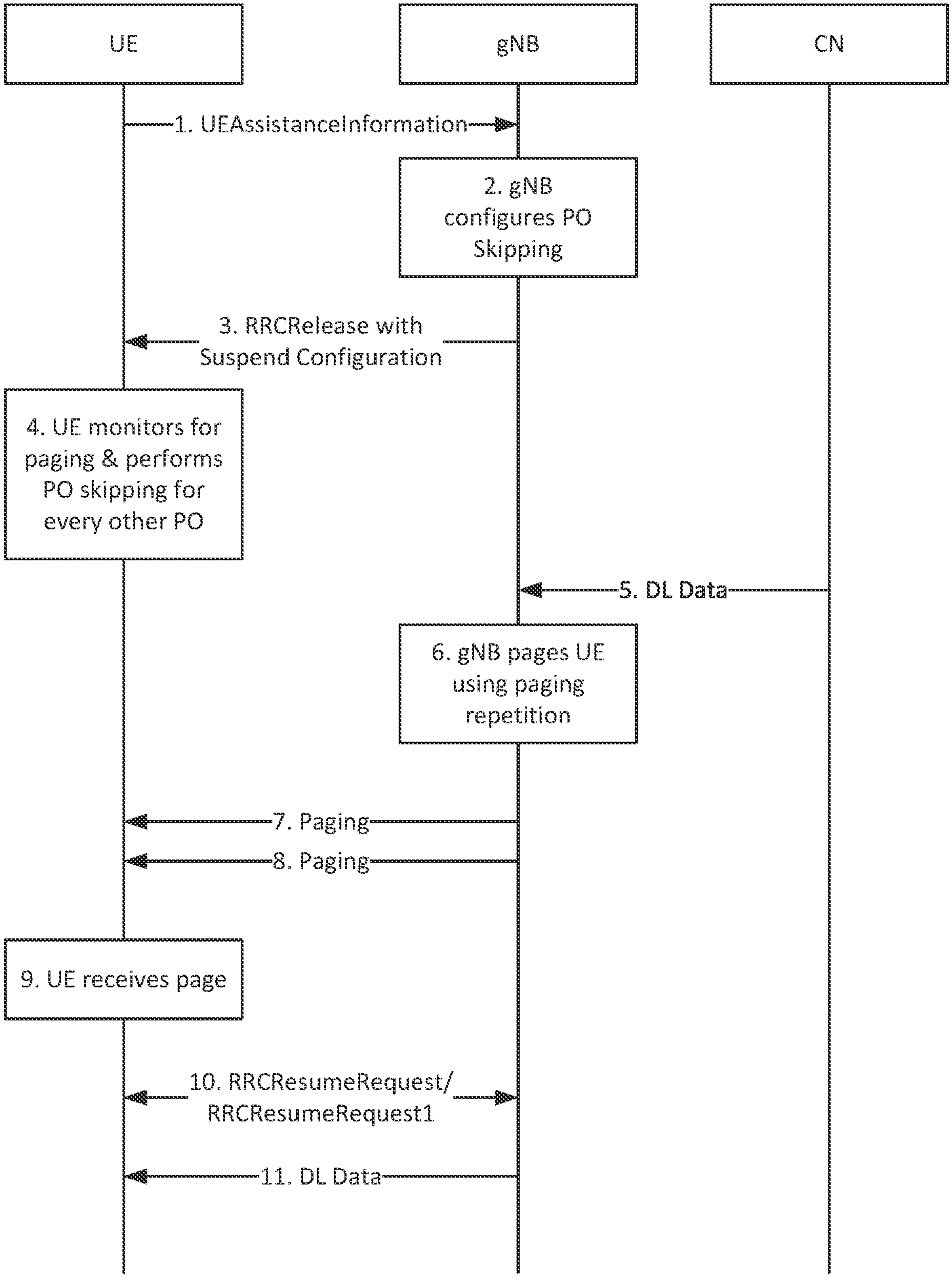
FIG. 13 is a call flow diagram where a UE assistance information procedure is used to inform the network of the desired PO skipping configuration.

FIG. 13 is a signaling diagram where the UE Assistance Information procedure is used to inform the network of the desired PO skipping configuration. In step 1 of FIG. 13, the UE transmits an UEAssistanceInformation message that includes the desired PO skipping configuration.

In step 2, the gNB configures PO Skipping.

In step 3, the gNB transmits an RRCRelease message that includes suspendConfig.

In step 4, upon receipt of the RRCRelease message, the UE transitions to RRC_INACTIVE and performs PO skipping every other PO.

In step 5, DL data for the UE is forwarded to the gNB.

In step 6, the gNB pages the UE using paging repetition

In step 7, the gNB pages the UE using the Initial PO.

In step 8, the gNB pages the UE using the Repeated PO.

In step 9, the UE receives the page in either the Initial or Repeated PO.

In step 10, the UE resumes the RRC connection with the network.

In step 11, the UE receives the DL data from the network.

The use of paging repetition increases the paging signaling and also increases the paging latency. For scenarios where the DRX cycles are different, paging repetition is not required for the USIM with the larger DRX cycle. An optimization can be made for such scenarios, such that paging repetition is only enabled for the network with the smaller DRX cycle. UL control signaling from the UE may be used to provide indication to the network to request paging repetition for the network with the lower DRX cycle.

In another alternative, the use of paging repetition may be triggered by the network after experiencing paging failures for the UE. The detection event may be based on a count of the number of paging failures; e.g. the number of consecutive paging failures exceeding a threshold, the number of paging failures in a defined time interval exceeding a threshold; etc.

For beam based paging mechanism, when SearchSpaceId=0 is configured for pagingSearchSpace, similar skipping and repetition methods may also be applied to the PDCCH monitoring occasions corresponding to paging and RMSI, for $USIM_1$ and/or $USIM_2$ respectively as an example.

For beam based paging mechanism, when SearchSpaceId other than 0 is configured for pagingSearchSpace, similar skipping and repetition methods may also be applied to the set of S consecutive PDCCH monitoring occasions corresponding to S transmitted SSBs, e.g., S1 for $USIM_1$ and S2 for $USIM_2$.

Event-Based PO Skipping

Figures 14A, 14B:
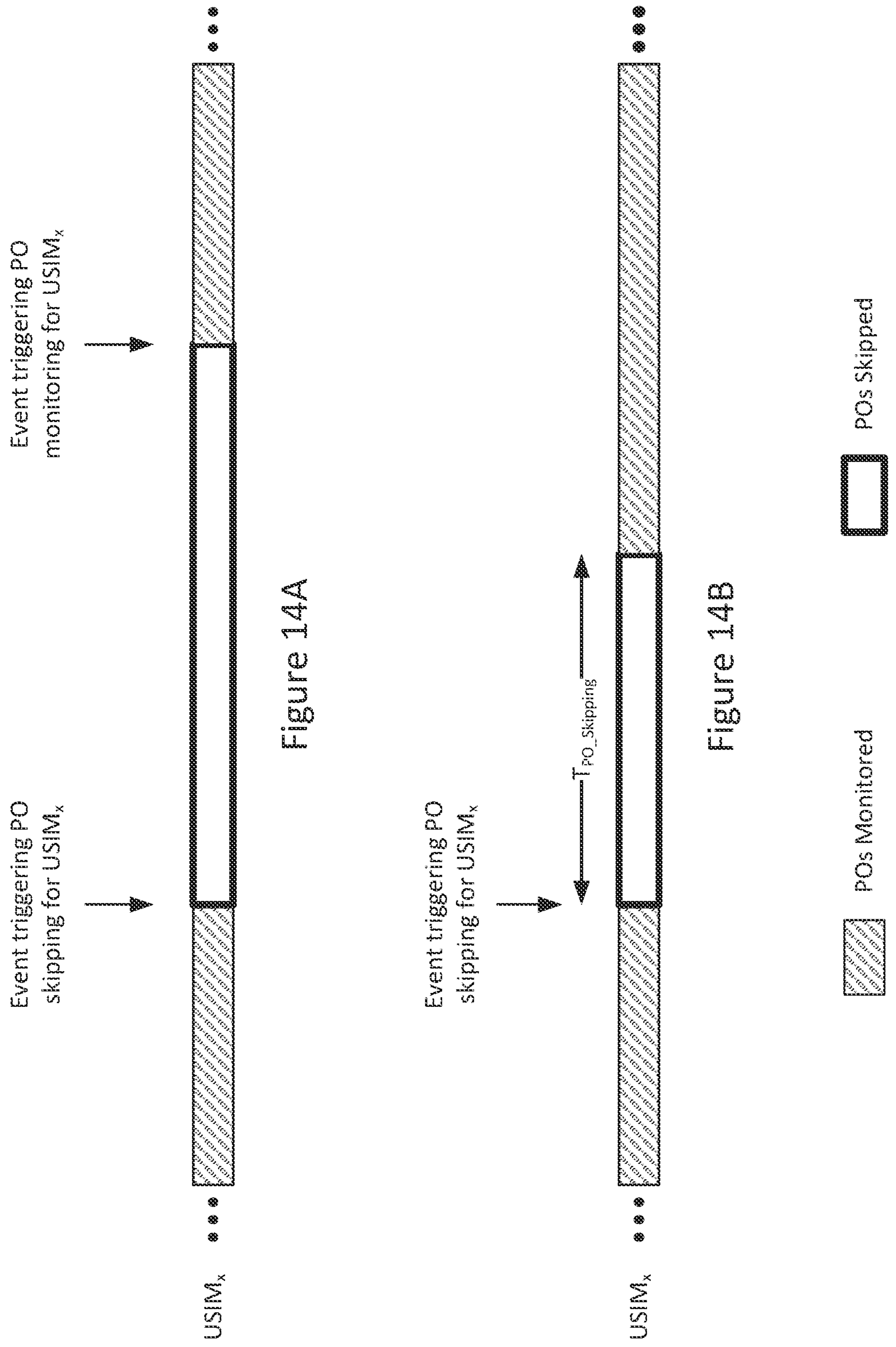
FIGS. 14A-B are timing diagrams illustrating scenarios where PO skipping occurs for both a variable duration and a fixed duration, respectively.

Event-based PO skipping may be used to suspend paging for a network based on the occurrence of a specific event. Events triggering PO skipping may include the determination that collisions will occur based on the UE configuration for the multiple USIMs, detection of one or more paging collisions, commencement of an AS procedure for another USIM, transition to RRC_CONNECTED state for another USIM, configuration of DC for another USIM, etc. PO skipping for a given network may occur for a variable duration that continues until the triggering event no longer persists; e.g. the UE is reconfigured such that collisions will no longer occur for the multiple USIMs, the AS procedure(s) for another USIM has completed, transition from RRC_CONNECTED to RRC_IDLE/RRC_INACTIVE for another USIM, release of DC for another USIM, etc. Alternatively, PO skipping for a given network may continue for a fixed duration (e.g. $T_{PO\_Skipping}$) that is known to the UE and the network. The PO skipping duration may be preconfigured or signaled prior to the UE commencing with PO skipping. In one aspect of the solution, the PO skipping duration is determined by the UE and signaled to the network. In another aspect of the solution, the UE optionally signals a preferred PO skipping duration to the network, but the final decision on the PO skipping duration is determined by the network. FIGS. 14A-B illustrate scenarios where PO skipping occurs for both a variable duration and a fixed duration, respectively.

After placing an emergency call, the UE may be required to monitor for paging to ensure it can receive an emergency call back. After placing an emergency call one network, event-based PO skipping may be used to inform the other networks that the UE will not be monitoring for paging and therefore will not be able to establish a MT call.

In one embodiment of the solution, RRC signaling is used to perform event-based PO skipping for CN and/or RAN initiated paging. When an event triggering activation of PO skipping occurs, the UE sends a PO Skipping Indication to the network. Once triggered, PO skipping may remain active for a variable or fixed duration. For scenarios where PO skipping is active for a variable duration, when an event triggering deactivation of PO skipping occurs, the UE sends another PO Skipping Indication to the network to indicate PO skipping should be deactivated. And for scenarios where a fixed duration is used, the PO Skipping Indication may also indicate the duration that PO skipping will be active. The network may treat the PO Skipping Indication as a command that is adhered to. Alternatively, the network may treat the PO Skipping Indication as a request that it may accept or reject. FIGS. 15A-B, and 16A-B are illustrations of signaling diagrams where RRC signaling is used for event-based PO skipping for variable and fixed durations respectively.

The network may send a response to the UE to acknowledge reception of the PO Skipping Indication. For scenarios where the network treats the PO Skipping Indication as a request, the response may indicate whether or not the request was granted. And for scenarios where PO skipping is activated for a fixed duration, the response may be used to signal the skipping duration or override the duration requested by the UE in the PO Skipping Indication.

The PO Skipping Indication may be signaled to the network in the same message that is used to establish or resume an RRC connection; e.g. RRCSetupRequest, RRCResumeRequest or RRCResumeRequest1. For example, a new EstablishmentCause/ResumeCause; e.g. po-SkippingActivation, could be used to signal the PO Skipping Indication to the network for a UE in RRC_IDLE/RRC_INACTIVE mode. A new EstablishmentCause/ResumeCause; e.g. po-SkippingDeactivation, could also be defined to deactivate PO skipping for scenarios where PO skipping is activated for a variable duration.

Alternatively, the PO Skipping Indication may be signaled to the network in a separate message that is transmitted after the RRC connection has been established or resumed. In one aspect of the invention, a new POSkipping message may be used to signal the PO Skipping Indication to the network. And in another aspect of the invention, the UEAssistanceInformation message may be used to signal the PO Skipping Indication to the network. In yet a third aspect of the invention, the PO Skipping indication may be provided to the network using one of the Registration request procedures (e.g. Initial, Mobility Registration Update, Periodic Registration Update, etc.).

PO skipping may be transparent to the CN, in which case the RAN node; e.g. the gNB, may buffer any paging request or DL data received from the CN for a UE in RRC_IDLE or RRC_INACTIVE mode respectively, until the PO skipping is no longer active. Alternatively, the gNB may provide an indication to the CN when PO skipping is active to prevent it from performing CN paging for a UE in RRC_IDLE mode or from sending DL data to the gNB intended for a UE in RRC_INACTIVE.

Figure 15A:
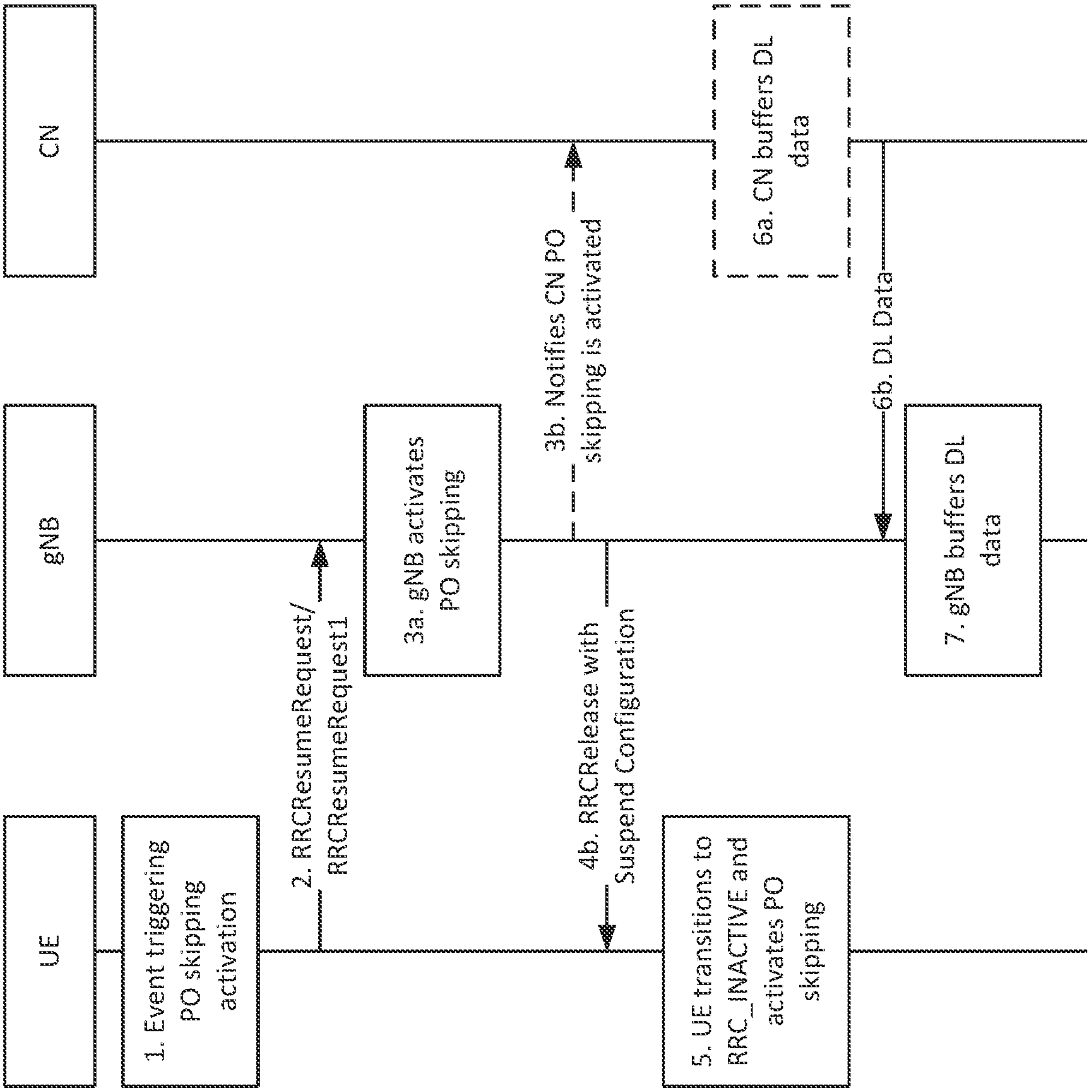
FIGS. 15A-B illustrates an example call flow of event-based PO skipping with a variable duration using RRC signaling.
Figure 15B:
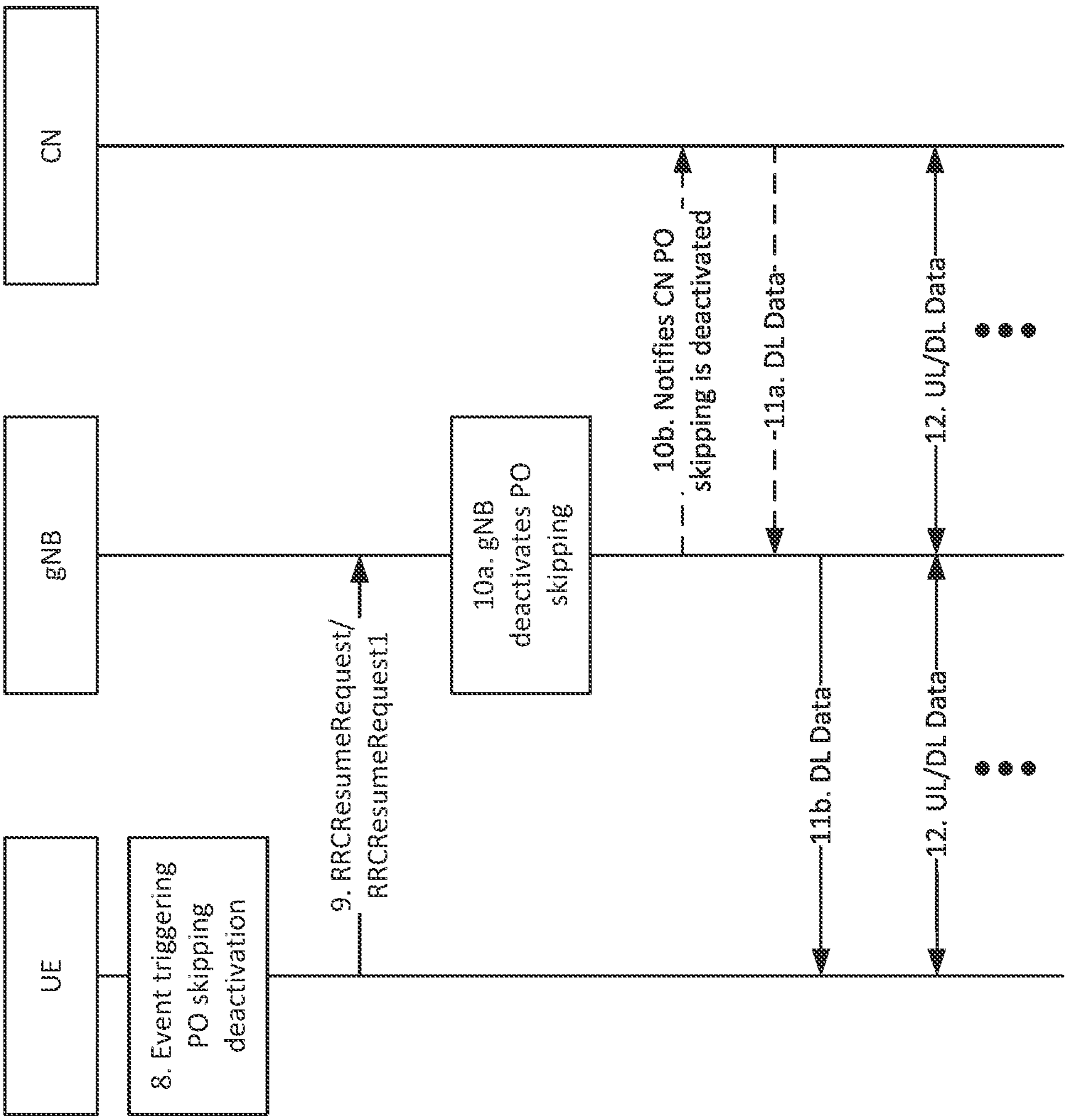

FIGS. 15A and 15B illustrates an example of event-based PO skipping with a variable duration using RRC signaling. In step 1 of FIG. 15A, the UE detects an event triggering PO skipping activation.

In step 2, the UE transmits an RRCResumeRequest/RRCResumeRequest1 message with the ResumeCause set to “po-SkippingActivation” to activate PO skipping.

In step 3, the gNB activates PO skipping in step 3a and optionally notifies the CN that PO skipping is activated in step 3b. The notification may provide a time value to indicate how long the CN buffers the DL data for and at the expiration, to send the buffered DL data to the UE.

In step 4, the gNB transmits an RRCRelease message that includes suspendConfig. The suspendConfig may be “negotiated” prior to transmission of the RRCResumeRequest/RRCResumeRequest1 in step 2, in which case it does not need to be included in the RRCRelease message.

In step 5, upon receipt of the RRCRelease message, the UE transitions to RRC_INACTIVE and activates PO skipping In step 6, DL data is available for the UE and if the gNB had informed the CN that PO skipping was activated in step 3b, the CN buffers the DL data in step 6a. At the expiration of a timer associated with the PO skipping, the CN transmits DL data to the gNB that is intended for the UE in step 6b. The timer may be associated with the value provided in step 3 or it may be provided via network configuration or policies.

In step 7, the gNB buffers the DL data intended for the UE if it received the DL data from the CN.

The call flow of FIG. 15A continues in FIG. 15B. In step 8 of FIG. 15B, the UE detects an event triggering PO skipping deactivation.

In step 9, the UE transmits an RRCResumeRequest/RRCResumeRequest1 message with the ResumeCause set to “po-SkippingDeactivation” to deactivate PO skipping.

In step 10, the network deactivates PO skipping in step 10a and may also notify the CN that PO skipping has been deactivated in step 10b.

In step 11, if the CN had buffered any DL data while PO skipping was activated, the data is sent to the gNB as shown in step 11a. The gNB sends the UE the DL data in step 11b that was buffered while PO skipping was activated. This data may have been buffered by the CN or the gNB.

In step 12, the UE commences with UL/DL transmission and reception with the gNB and UL/DL data is transmitted to/from the CN.

Figure 16A:
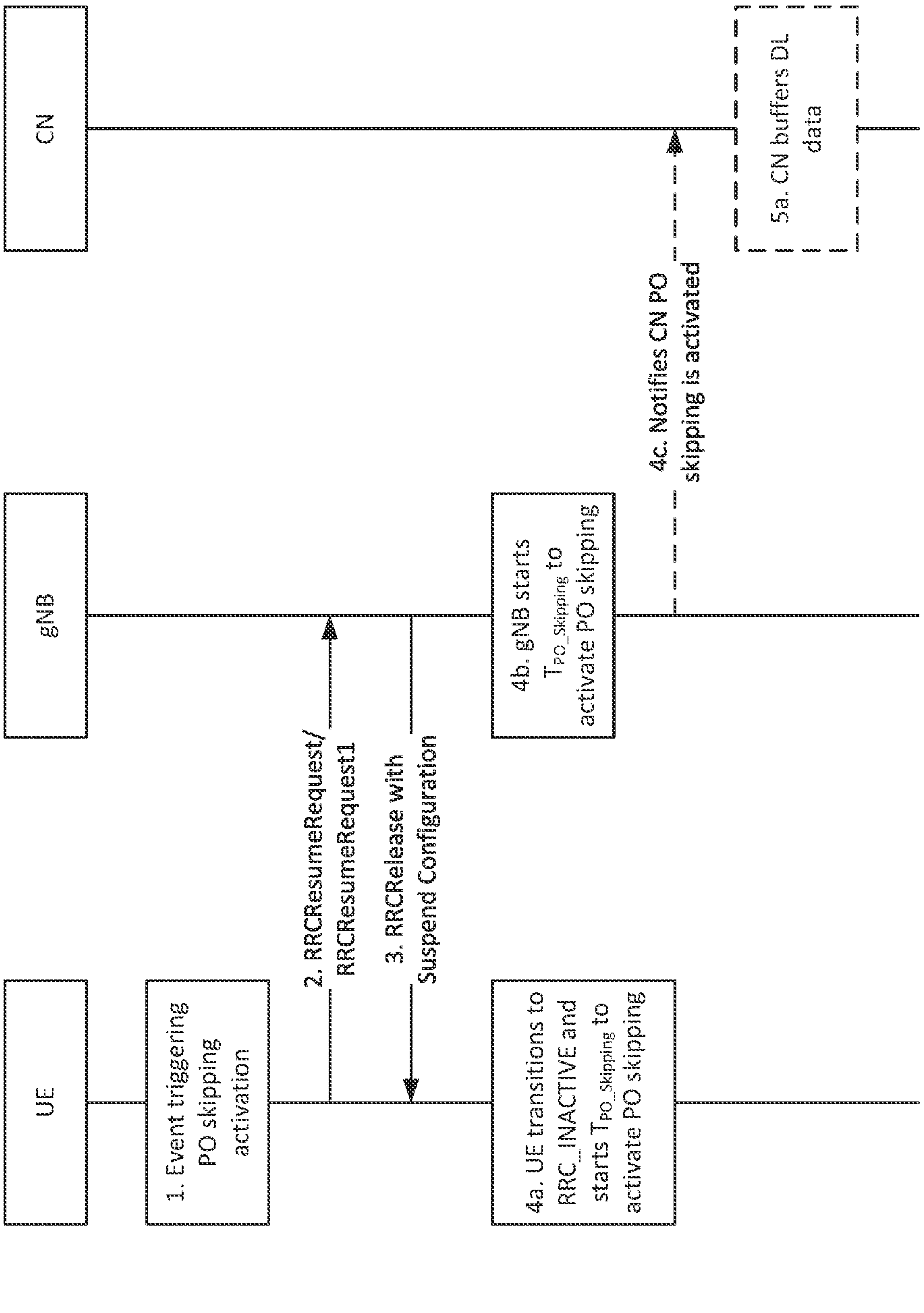
FIGS. 16A-B illustrate an example call flow of event-based PO skipping with a fixed duration using RRC signaling.
Figure 16B:
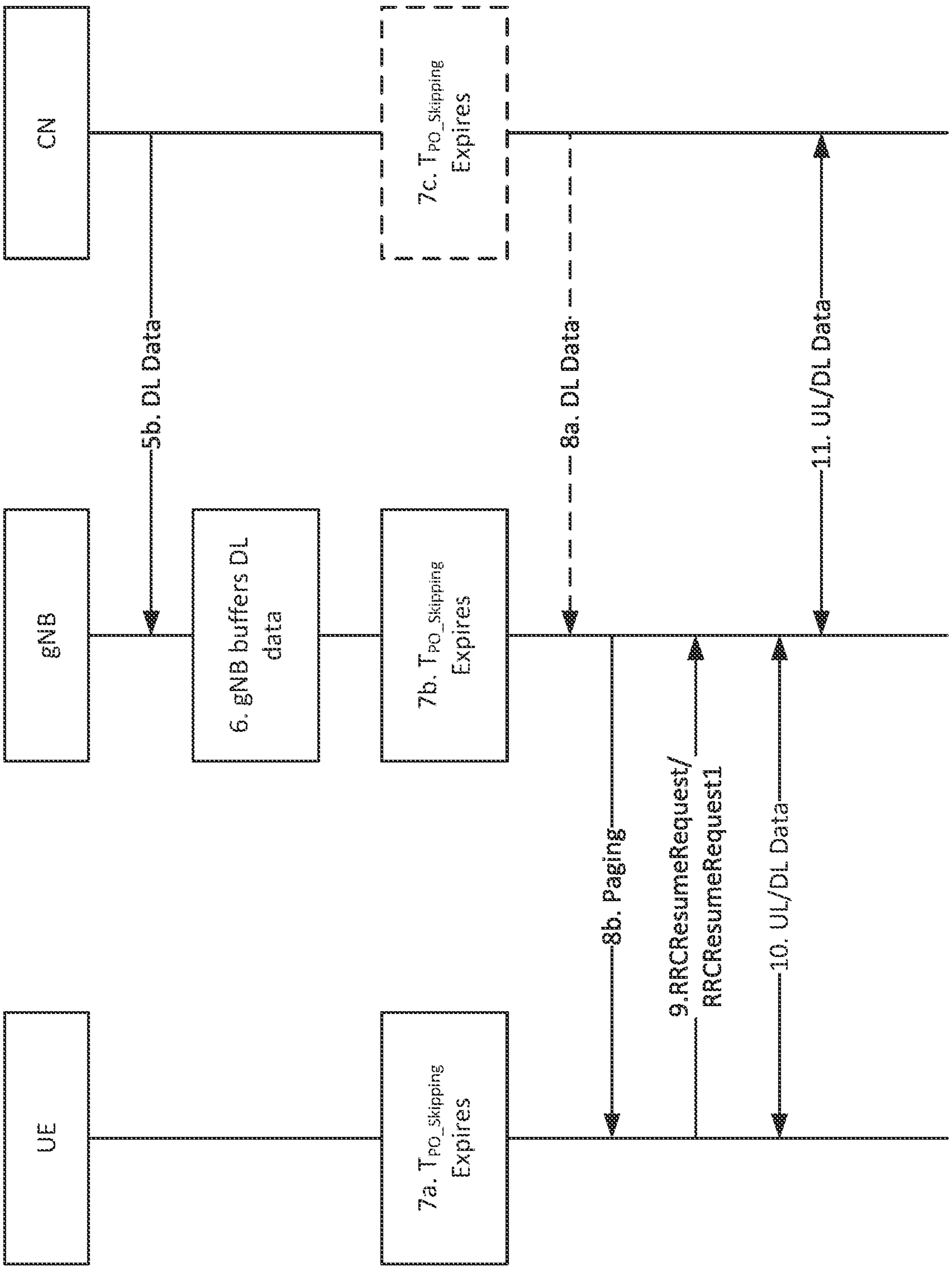

FIGS. 16A-B illustrate an example of event-based PO skipping with a fixed duration using RRC signaling.

In step 1, the UE detects an event triggering PO skipping activation.

In step 2, the UE transmits an RRCResumeRequest/RRCResumeRequest1 message with the ResumeCause set to “po-SkippingActivation” to activate PO skipping.

In step 3, the gNB transmits an RRCRelease message that includes suspendConfig. The suspendConfig may be “negotiated” prior to transmission of the RRCResumeRequest/RRCResumeRequest1 in step 2, in which case it does not need to be included in the RRCRelease message.

In step 4, PO skipping is activated. In step 4A, The UE receives the RRCRelease message, transitions to RRC_INACTIVE and starts $T_{PO\_Skipping}$ to activate PO skipping. In step 4B, the gNB starts $T_{PO\_Skipping}$ to activate PO skipping. In step 4C, the gNB may notify the CN that PO skipping is activated. The notification may provide a time value to indicate how long the CN buffers the DL data for and at the expiration, to send the buffered DL data to the UE. Note that this notification may be sent any time after step 2.

In step 5, DL data is available for the UE and if the gNB had informed the CN that PO skipping was activated in step 4C, the CN buffers the DL data in step 5A.

The call flow of FIG. 16A continues in FIG. 16B. In step 5B, at the expiration of a timer associated with the PO skipping, the CN transmits DL data to the gNB that is intended for the UE. The timer may be associated with the value provided in step 4 or it may be provided via network configuration or policies.

In step 6, the gNB buffers the DL data intended for the UE if it received the DL data from the CN.

In step 7, the PO skipping period expires. In step 7A, $T_{PO\_Skipping}$ expires triggering the deactivation of PO skipping at the UE. In step 7B, $T_{PO\_Skipping}$ expires triggering the deactivation of PO skipping at the gNB In step 7 $T_{PO\_Skipping}$ expires triggering the deactivation of PO skipping at the CN In step 8, if the CN had buffered any DL data while PO skipping was activated, the data is sent to the gNB as shown in step 8a. Alternatively, the CN may page the UE if the UE context maintained within the CN indicates the UE is in CM_IDLE. The gNB pages the UE in step 8b.

In step 9, the UE transmits an RRCResumeRequest/RRCResumeRequest1 message with the ResumeCause set as described in section 5.3.2.3 of TS 38.331 Release 15.

In step 10, the UE commences with UL/DL transmission and reception, which may include reception of DL packets that were buffered by the gNB or CN while PO skipping was activated.

In step 11, UL/DL data is transmitted to/from the CN.

In another alternative, the UE may transmit an RRCResumeRequest/RRCResumeRequest1 to the network to resume the RRC connection prior to $T_{PO\_Skipping}$ expiring; and then commence with UL DL transmission as in steps 9-11 in the above procedure. If the UE is unable to resume the connection before $T_{PO\_Skipping}$ expiring; e.g. due to activity on another USIM, then the suspended RRC connection is implicitly released by the UE and network and the UE transitions to RRC_IDLE.

In another embodiment of the solution, NAS signaling (e.g. MICO mode) is used to perform event-based PO skipping for Core Network (CN) initiated paging as shown in FIG. 15.

Figure 17:
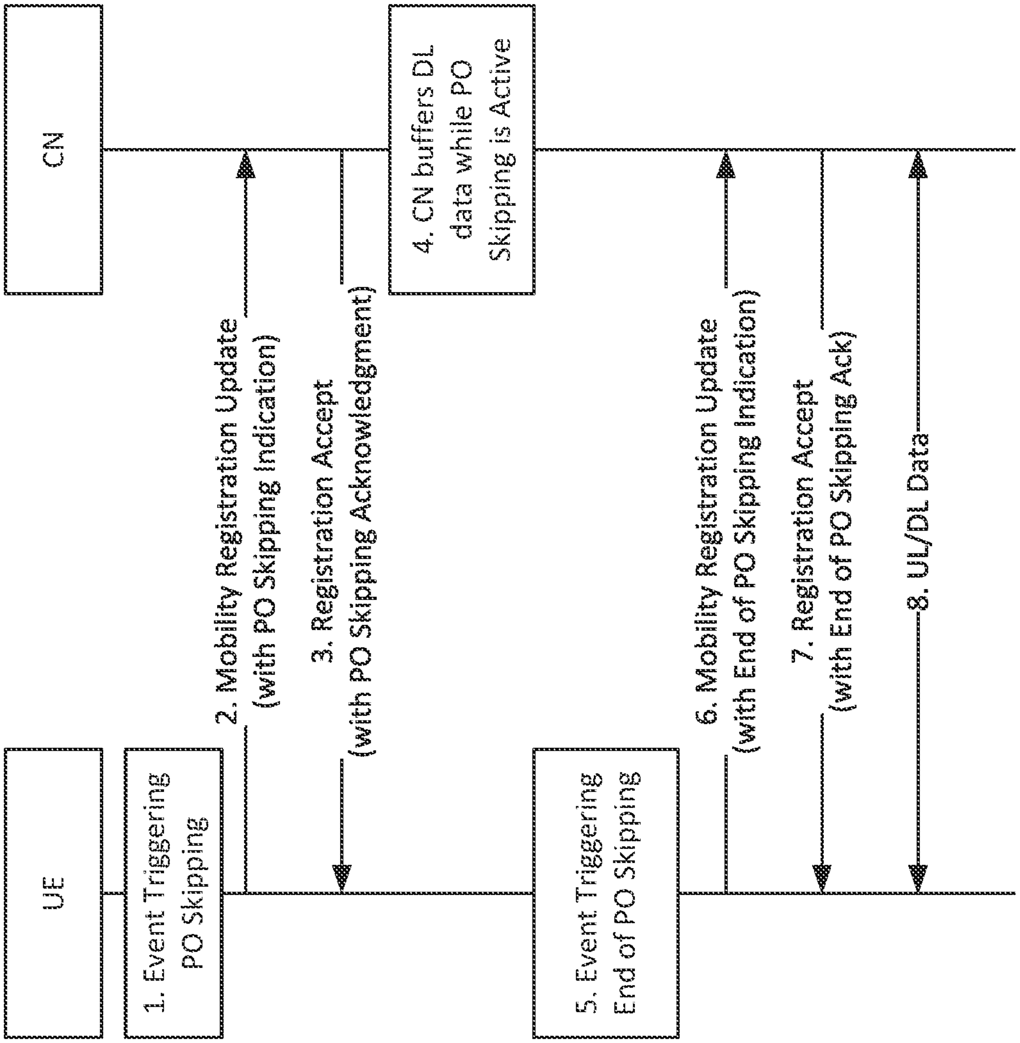
FIG. 17 is a call flow illustrating an example of event-based PO skipping with a variable and fixed duration using NAS signaling.

FIG. 17 is a call flow illustrating an example of event-based PO skipping with a variable and fixed duration using NAS signaling. In step 1 of FIG. 17, the UE detects an event triggering PO skipping activation.

In step 2, the UE performs a Mobility Registration update and includes a PO skipping indication. A time duration may also be provided if the PO skipping is for a fixed duration. Note the PO skipping indication may also be included in a Periodic Registration Update or a Service Request procedure as well. Alternatively, the PO skipping function may be requested by the UE by specifying its preference for enabling MICO mode and a multi-USIM indicator.

In step 3, the CN returns a Registration Accept response and acknowledges that PO skipping is activated at the CN. The CN may also include a time duration that the CN will buffer DL data for the UE associated with the PO skipping period. This time duration may be the value the UE provided, or it may be a value provided by the CN.

In step 4, when PO skipping is active, the CN buffers any DL data received for the UE.

In step 5, an event is detected by the UE that signifies the end of the PO skipping. If the PO skipping was configured for a fixed duration, the event may be the expiration of a timer associated with the PO skipping period.

In step 6, the UE sends a Mobility Registration update to the CN to deactivate PO skipping.

In step 7, the CN returns a Registration Accept message and acknowledges that PO skipping is deactivated in the CN.

In step 8, any DL data that was buffered in the CN during PO skipping is sent to the UE and the UE can resume UL/DL data transmission with the CN.

SFN-Based PO Skipping

SFN-based PO skipping may be used to partition the SFN space into regions where POs are monitored or skipped. For example, start and stop SFNs for PO monitoring may be defined such that if the PF falls within this range, the PO is monitored; and if the PF falls outside this range, the PO is skipped.

SFN-based PO skipping may be used to avoid paging collisions between multiple USIMs by defining non-overlapping PO monitoring regions for each USIM. The UE would determine the region where the POs should be skipped/monitored such that paging collisions would not occur, and signal this info to the network. Alternatively, the UE may provide paging configuration info to the network and the network may determine regions where the POs should be skipped/monitored. In the general case, SFN synchronization cannot be assumed between networks, therefore the SFN offset should be considered when determining the appropriate start/stop SFNs for a given network.

Figure 18:
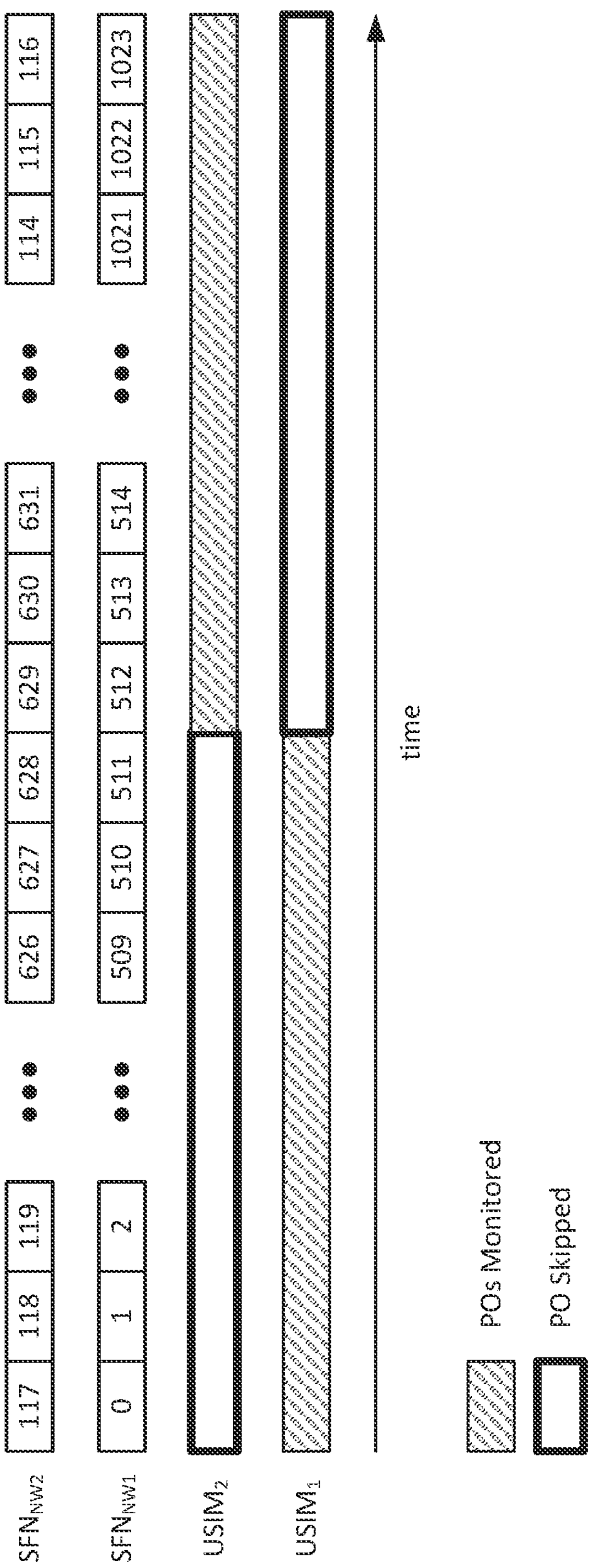
FIG. 18 is a timing diagram of an example of SFN-based paging PO skipping.

For example, we can consider the scenario where a multi-USIM UE has two USIMs, the SFN space is partitioned in two and the SFN offset between $NW_1$ and $NW_2$ is 117, as shown in FIG. 18. If we use the SFN numbering for $NW_1$ as the reference, the start and stop SFNs for PO monitoring for $NW_1$ may be defined as 0 and 511 respectively; and the start and stop SFNs for PO monitoring for $NW_2$ may be defined as 512 and 1023 respectively. The UE would signal the values 0 and 511 to $NW_1$ to indicate the SFN range when PO monitoring would be performed. The UE would also signal SFN start/stop values to $NW_2$ to indicate the SFN range when PO monitoring would be performed. However, rather than signaling the values 512 and 1023 directly, the UE would add the SFN offset and perform a modulo 1024 operation on the result to translate the start/stop SFNs to the SFN numbering for $NW_2$, which in this case would result in signaling the values (512÷117) mod 1024=629 and (1023+117) mod 1024=116 to $NW_2$ to indicate the SFN range when PO monitoring would be performed.

Figure 19:
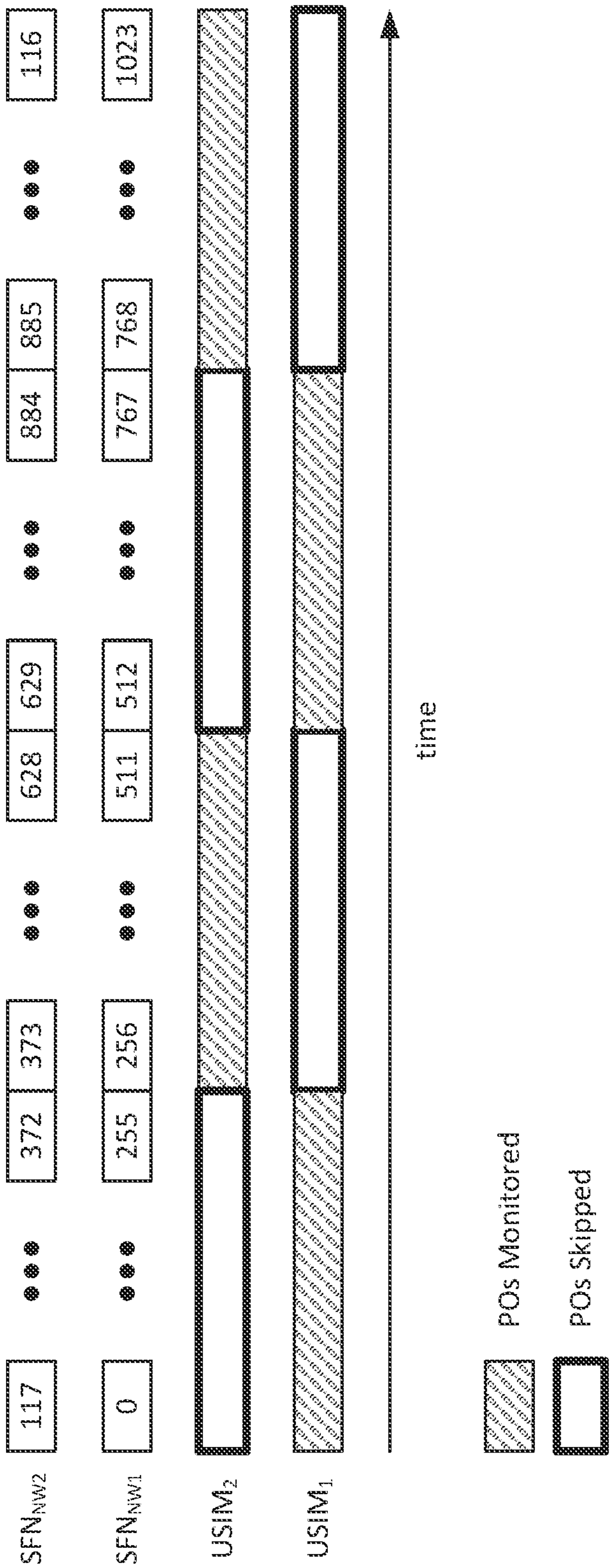
FIG. 19 is a timing diagram of an example of SFN-based PO skipping with multiple PO monitoring regions.

In another embodiment of the solution, the SFN space may be partitioned such that there are multiple regions where the PO is monitored for a given USIM. FIG. 19 is an illustration of a scenario where a multi-USIM UE has two USIMs and the SFN offset between $NW_1$ and $NW_2$ is 117, and there are 2 PO monitoring regions defined for each USIM.

In the above examples, SFN-based PO skipping is used to avoid paging collisions between multiple USIMs. However, SFN-based PO skipping may also be used to avoid collisions for other AS procedures that may be performed for another USIM. For example, while POs are being skipped for a first USIM, SI acquisition, idle mode measurements, etc. may be performed for another USIM without the risk of colliding with the monitored POs for the first USIM.

The SFN-based PO skipping may be triggered by a UE making a request to either the gNB or the CN that includes an SFN PO Skipping indication and also the number of SFN regions to divide the POs. This mechanism can be used for NW1 of FIG. 18, which provides the SFN reference timing. The UE may then make another request to NW2 of FIG. 18 with the SFN PO Skipping indication and the same number of SFN regions to divide the POs as was used for NW1. The UE can then apply the SFN offset between NW1 and NW2 in determining the SFN regions to monitor or skip the POs.

The SFN-based PO Skipping concept may be viewed in another perspective. Instead of focusing on PO skipping, the concept may be envisioned as SFN-based PO region selection. The CN or RAN node may define PO regions within SFNs and assign different regions to each of the USIMs in a UE. This mechanism allows a UE to request different SFN PO regions for each of the USIMs installed to avoid paging collisions. If the USIMs belong to the same MNO, then a single SFN timing reference may be used. However, if the USIMs belong to different MNOs, then the SFN offset needs to be applied by the UE.

H-SFN-Based PO Skipping

H-SFN-based PO skipping may be used to define hyper frames where POs are skipped. An H-SFN is broadcast by the cell and increments by one when the SFN wraps around. In addition to calculating the PO and PF, a UE may calculate a Paging Hyperframe (PH), that refers to the H-SFN in which the UE monitors for paging. The PH may be determined based on a formula that is known by the UE and network as a function of the DRX cycle, which may correspond to an extended DRX cycle that is greater than 1024, and the UE identity. SFN-based regions as well as H-SFN-based regions may be separately defined and indicated to the UE.

PO Extension

Figure 20:
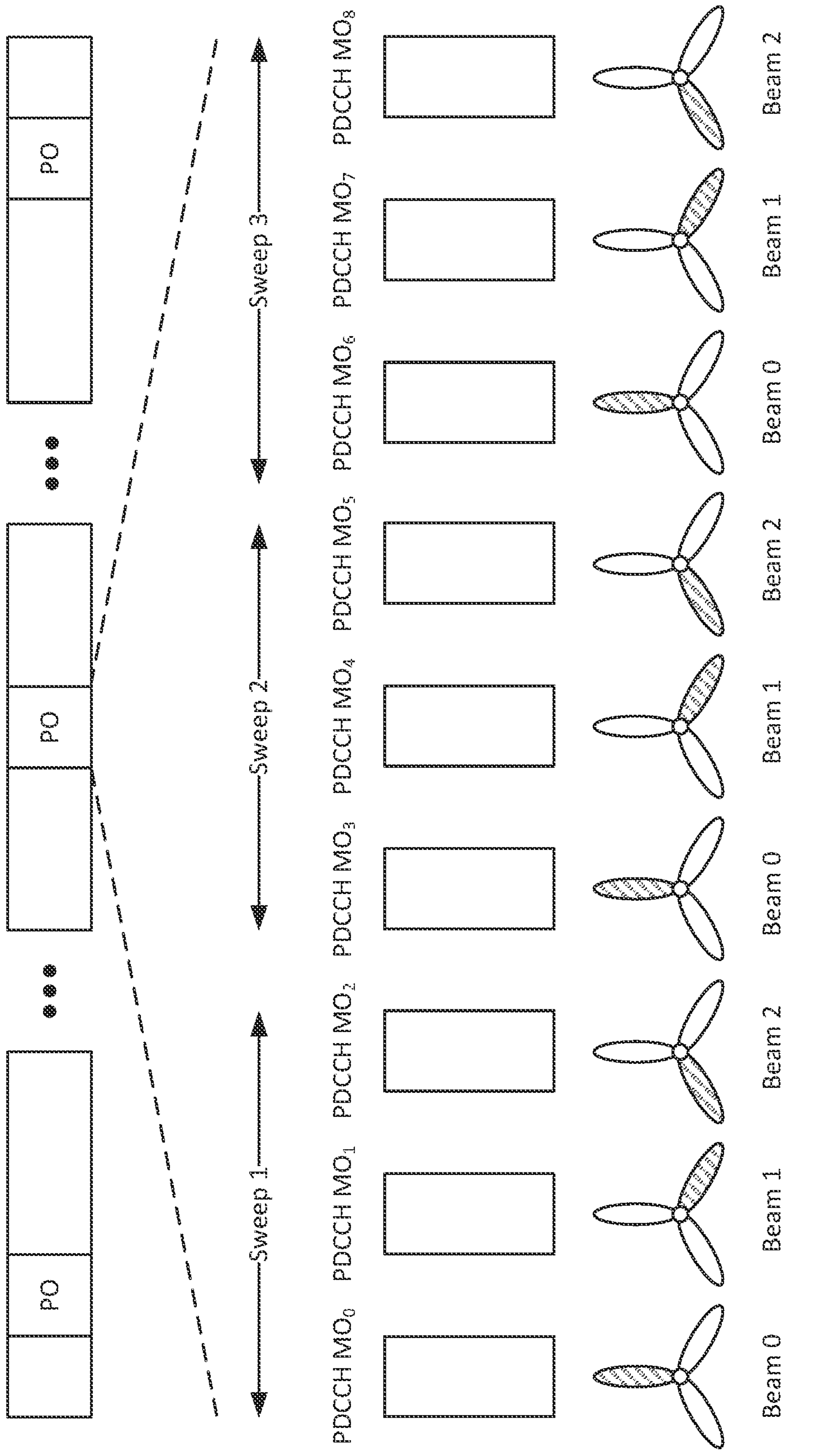
FIG. 20 illustrates an example of a PO extended with additional PDCCH monitoring occasions.

To reduce the likelihood that a UE is unable to receive the DL during its configured PO due to collisions, the PO may be extended with additional PDCCH monitoring occasions for paging. An extended PO may be defined as a set of S*X consecutive PDCCH monitoring occasions, where S is the number of actual transmitted SSBs determined according to ssb-PositionsInBurst in SIB1 and X is the additionalMonitoringOccasionOfPO if configured or is equal to 1 otherwise. This parameter may also be referred to as may be referred to as nrofPDCCH-MonitoringOccasionPerSSB-InPO. The $[X*S+K]^{th}$ PDCCH monitoring occasion for paging in the PO corresponds to the $K^{th}$ transmitted SSB, where x=0, 1, . . . , X−1; and K=1, 2, . . . , S. FIG. 20 is an illustration of an extended PO where S=3 and X=3.

The network repeats the same paging message and Short Message on all PDCCH monitoring occasions that comprise the extended PO, therefore the UE may monitor any of PDCCH monitoring occasions during the extended PO. If a collision occurs for the selected PDCCH monitoring, the UE may select a PDCCH monitoring occasions for the same beam in another sweep. For example, we can consider the extended PO shown in FIG. 20. If the UE selects Beam 1 as the best beam, then PDCCH monitoring occasions 1, 4 or 7 could be used to receive the Paging DCI.

Figure 21:
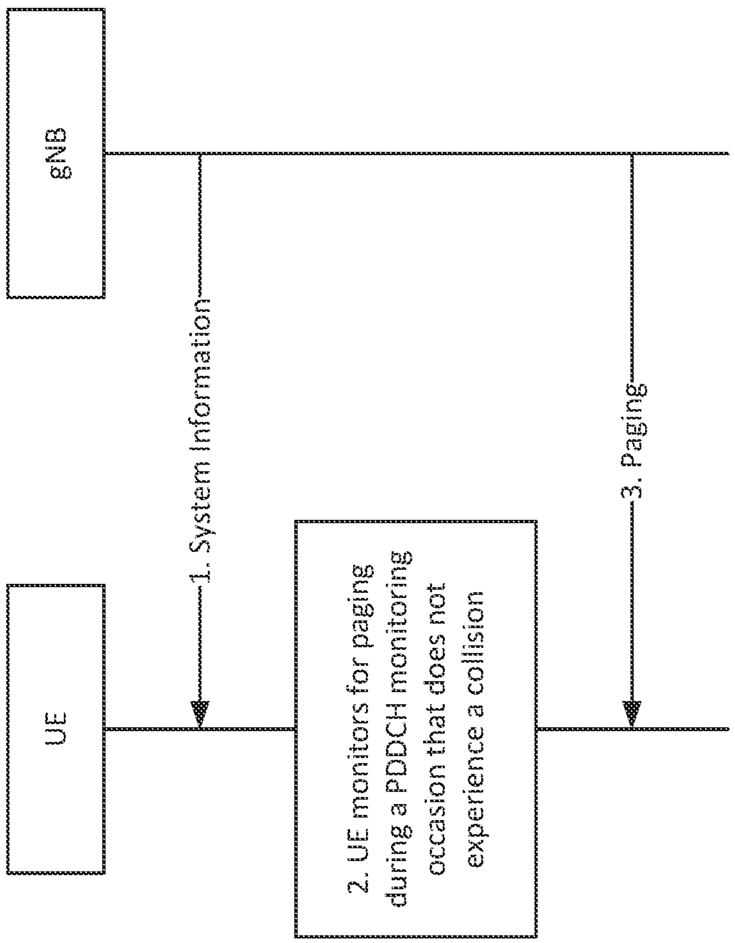
FIG. 21 is a call flow illustrating an example cell-specific PO extension solution.

FIG. 21 illustrates an example cell-specific PO extension solution. In step 1 of FIG. 21, the UE receives system information that configures an extended PO. The extended PO may be indicated using a field in the PCCH-Config information; e.g. nrofPDCCH-MonitoringOccasionPerSSB-InPO.

In step 2, the UE monitors for paging during a PDCCH monitoring occasion that does not experience a collision.

In step 3, the UE receives a page during the monitored PDCCH monitoring occasion.

Cell-specific PO extension may be used, whereby the broadcast signaling could be used to signal the extended PO configuration. The extended PDCCH monitoring occasions would be available for use by any UE in the cell.

Alternatively, UE specific PO extension may be used. In which case dedicated signaling may be used to signal the extended PO configuration. The extended PDCCH monitoring occasions in this case would only be available for UEs that had been explicitly configured with the extended PO by the network. Configuration of an extended PO for a UE may be triggered upon an implicit or explicit request from a UE. For example, a UE may provide an indication to the network that it is configured with multiple USIMs, which may trigger to the network to configure the UE with an extended PO.

Figure 22:
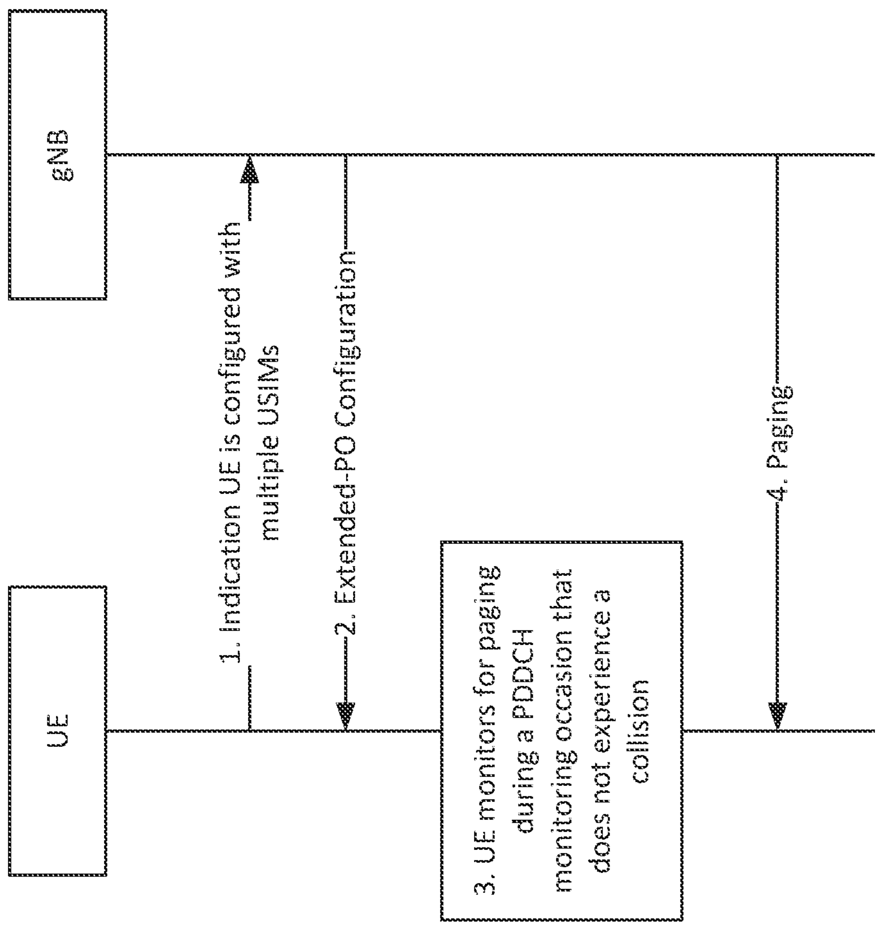
FIG. 22 is a call flow illustrating an example UE-specific PO extension solution.

FIG. 22 is an illustration of a UE-specific PO extension solution.

In step 1 of FIG. 22, the UE signals multi-USIM assistance information to the network to indicate it is configured with multiple USIMs. The multi-USIM assistance information may be signaled using a new RRC message; e.g. multi-USIMAssistainceInformation. Alternatively, the signaling of the multi-USIM assistance information may be implemented using the UE Assistance Information procedure, where the signaling of the multi-USIM assistance information corresponds to transmission of the UEAssistanceInformation message. And in another alternative, the signaling of the multi-USIM assistance information may be implemented using the UE capability transfer procedure, where the signaling of the multi-USIM assistance information corresponds to transmission of the UECapabilityInformation message.

In step 2, the gNB configures the UE with an extended PO. The extended PO may be indicated using the PCCH-Config information where the parameter nrofPDCCH-MonitoringOccasionPerSSB-InPO is greater than 1.

In step 3, the UE monitors for paging during a PDCCH monitoring occasion that does not experience a collision.

In step 4, the UE receives a page during the monitored PDCCH monitoring occasion.

In another example, the UE may make an explicit request to be configured with an extended PO, where the triggering of the request may be based on a determination by the UE that paging collisions will or are likely to occur. The request may include information to assist the network in determining the configuration of the extended PO; e.g. which PDCCH monitoring occasions in the pagingSearchSpace should configured for the extended PO.

In other embodiments, a PO may be extended to include PDCCH monitoring occasions from another PO defined for the PF. Such a configuration has the advantage of not requiring additional PDCCH monitoring occasions to be defined beyond those that are needed for paging legacy UEs.

Paging Modification

To avoid paging collisions, the UE's paging configuration for one or more networks may be modified. In the following subsections, we consider two classes of solutions. In the first class of solutions, the UE determines how the paging configuration(s) should be modified and provides an indication to the network to request modification of the paging configuration. In a second class of solutions, the network determines how the paging configuration should be modified based on assistance information signaled from the UE.

UE Determined Paging Modification

To avoid paging collisions, a UE may provide an indication to the network to request modification of the paging configuration. The indication may include information corresponding to the preferred values to use for one or more parameters of the paging configuration. Whether or not a network supports paging modification requests may be signaled to the UE using broadcast or dedicated signaling.

Figure 23:
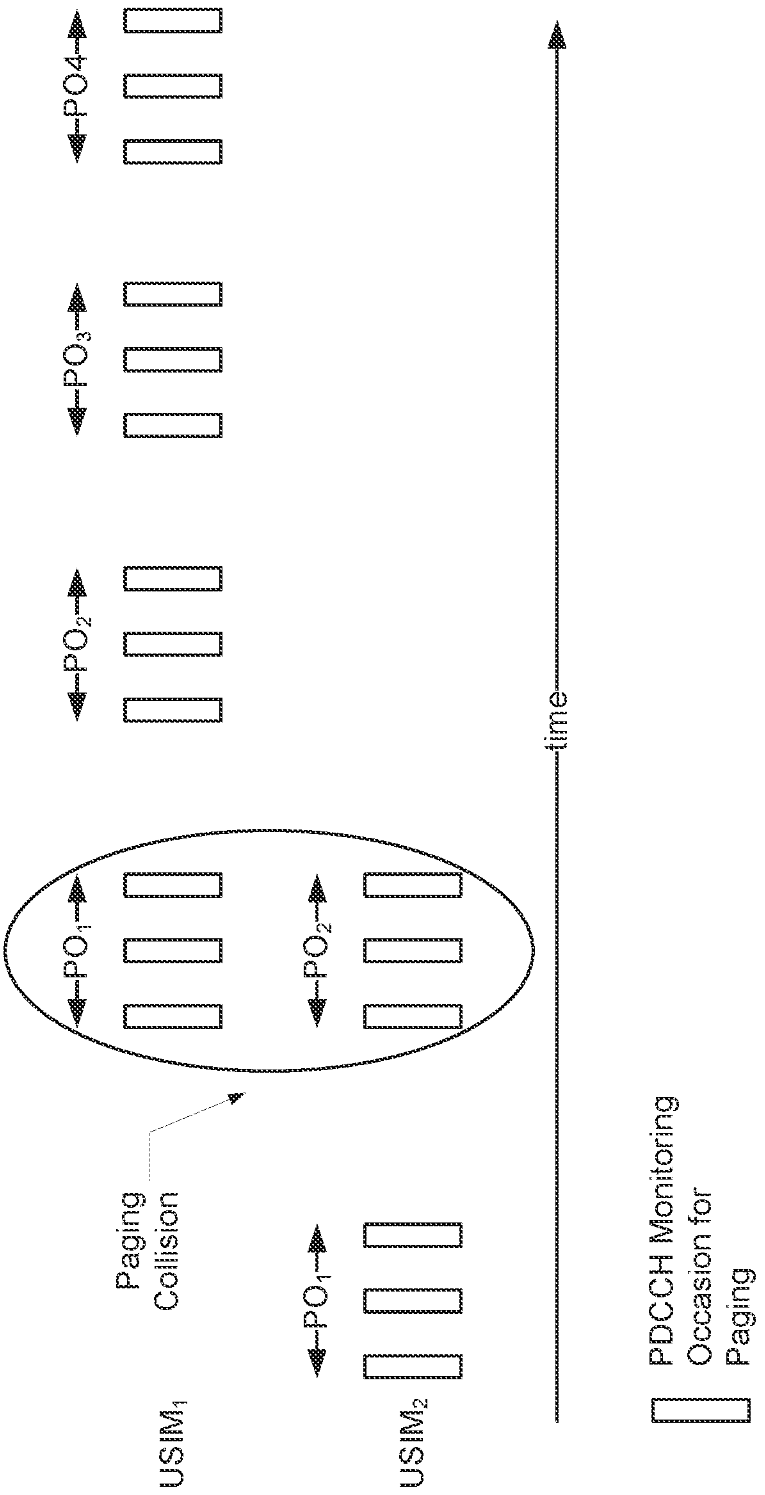
FIG. 23 is a timing diagram of an example paging collision scenario for multi-USIM UE where NS>1.

For scenarios where the number of POs in a PF is greater than 1; e.g., Ns>1, the UE may request to monitor a different PO in the PF. FIG. 23 is an illustration of a scenario where a multi-USIM UE is configured to monitor POs for two networks. The paging configurations are such that the UE monitors for paging during $PO_1$ for $USIM_1$ and $PO_2$ for $USIM_2$; and a collision occurs during the monitored POs. To avoid paging collisions, the UE may request to monitor $PO_2$, $PO_3$ or $PO_4$ for $NW_1$ or $PO_1$ for $NW_2$.

Note: This example shows a full collision between $PO_1$ and $PO_2$ for $NW_1$ and $NW_2$ respectively. A partial collision may also trigger the UE to perform a paging modification request.

The UE may signal the index of the requested PO to the network to indicate the desired PO. If assuming a zero-based index, then for the example illustrated in FIG. 23, the UE would signal the value 1, 2 or 3 to request $PO_2$, $PO_3$ or $PO_4$ respectively for $NW_1$; or a value of 0 to request $PO_1$ for $NW_2$.

Alternatively, the UE may signal the starting PDCCH monitoring occasions number of the requested PO e.g., the (requested i_s+1)$^{th}$ value of the firstPDCCH-MonitoringOccasionOfPO parameter signaled in the PCCH-Config. If we assume the PDDCH monitoring occasions for paging are numbered from zero, then for the example illustrated in FIG. 23, the UE would signal the value 3, 6 or 9 to request $PO_2$, $PO_3$ or $PO_4$ respectively for $NW_1$; or a value of 0 to request $PO_1$ for $NW_2$.

The UE may also request to monitor the PO in a different PF. The (UE_ID mod N) term in the PF calculation distributes the UEs to the PFs based on the UE_ID. The UE may signal an offset to the network that is used in the calculation of this term to select a different PF as follows:

$$(SFN+PF\_\text{offset}) \bmod T=(T \operatorname{div} N)*((UE\_ID+\text{offset}) \bmod N)$$

An alternative to signaling an offset is to request that an alternate UE_ID is used. This alternate UE_ID could be considered as an alias that would be used in determining the PF and PO. And in yet another alternative, the UE may request that a different 5G-S-TMSI is used.

The UE may also request modification of the DRX cycle. Since the POs are periodic, requesting a change to a DRX cycle on its own may not avoid all paging collisions. But changing the DRX cycle may allow some of the POs to occur without a collision. Requesting a longer DRX cycle may also be used to provide the UE with more options for selecting a different PF to monitor; e.g., choosing a value for the offset parameter used in the equation above.

Using the methods described herein, the UE may request modification to one or more of the paging configuration parameters. Which parameter(s) the UE is requesting to modify may be indicated to the network using explicit signaling; e.g. RRC signaling. The value of a parameter in the current paging configuration may be assumed for parameters that aren't explicitly included in the paging modification request. The paging modification request may be signaled in a separate message; e.g. PagingModificationRequest. Alternatively, the paging modification request may be signaled as part of another message; e.g. as an optional IE in the RRCSetupRequest, RRCResumeRequest, or RRCResumeRequest1 messages.

The network may respond to a paging modification request with an acknowledgement. The acknowledgment may include a field to indicate whether or not the paging request has been accepted. The acknowledgement may also include fields to modify the paging configuration with values different than what requested by the UE. The acknowledgement may be signaled in a separate message; e.g. a PagingModificationAcknowledgment message. Alternatively, the acknowledgement may be signaled as part of another message; e.g. as an optional IE in the RRCRelease message.

An example PagingModification TE that may be used for a paging modification request or a paging modification acknowledgement is in Code Example 3A of the Appendix. PagingModification field descriptions are shown in Code Example 3B.

In another alternative, the PF/PO space is divided into multiple regions e.g. 8 regions (1024/8=128). Then when either UE or NW detects potential paging collision, either may request the PF/PO be moved to another region to avoid collisions. In the same MNO case, either NW or UE is capable of performing this. In different MNO case, the UE would be performing this as it has timing info for both USIMs. Then it can just request a region it determines does not cause paging collisions.

Figure 24:
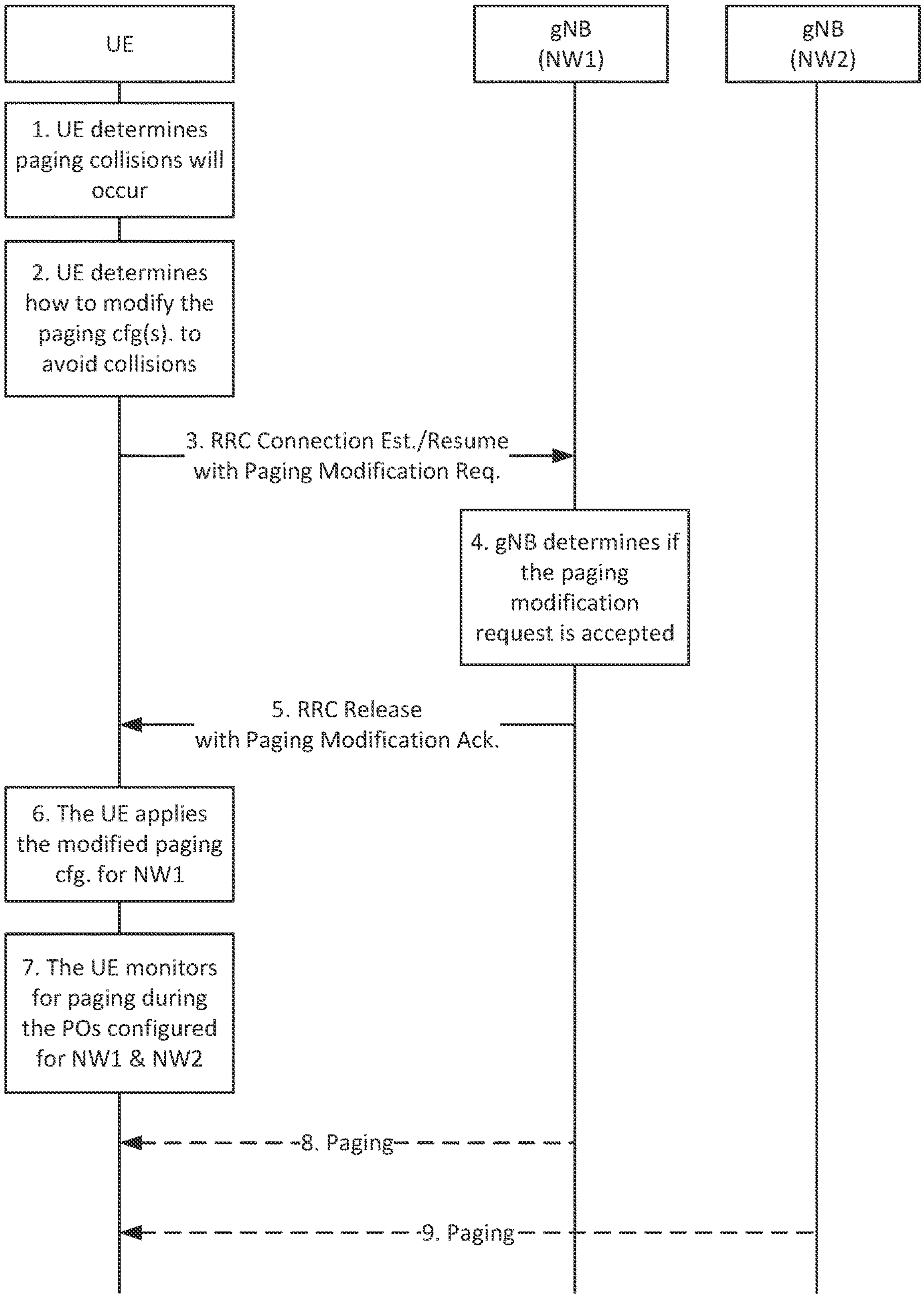
FIG. 24 is a signaling diagram that illustrates an example paging modification request for a multi-USIM UE attached to two network works, NW1 and NW2.

FIG. 24 is a signaling diagram that illustrates an example paging modification request for a multi-USIM UE attached to two network works, NW1 and NW2. In step 1 of FIG. 24, the UE determines collisions will occur for the POs configured for NW1 and NW2.

In step 2, the UE determines how to modify the paging configuration for NW1 and/or NW2 to avoid paging collisions. The UE may attempt to modify the paging configuration for one or both networks depending on which network supports paging modification requests and how flexible the paging configuration is for a given network. For example, a network is configured to support multiple POs per PF and/or multiple PFs per DRX cycle is more flexible and provides more options for reconfiguring a UE to avoid paging collisions than a network that is not configured to support multiple POs per PF and/or multiple PFs per DRX cycle. For illustrative purposes, we assume the UE determines the paging configuration for NW1 should be modified to avoid paging collisions.

In step 3, the UE establishes or resumes an RRC connection with NW1 to request modification of the paging configuration. The UE may provide an indication to NW1 to request modification of the paging configuration using any of the methods described herein. In this example, the indication is provided in the message that is used to establish/resume the RRC connection; e.g. RRCSetupRequest, RRCResumeRequest, or RRCResumeRequest1. Alternatively, the paging modification request may be implemented using the UE Assistance Information procedure, where the signaling of the paging modification request corresponds to transmission of the UEAssistanceInformation message. The UEAssistanceInformation message may include preferred values for one or more paging configuration parameters; e.g. a preferred PagingCycle, a preferred UE_ID to use in the PO/PF calculations, an index i_s corresponding to the preferred PO to monitor in the PF, an offset to be used in the calculation of the PF. Example PagingPreference information that may be included in the UEAssistanceInformation message is shown in Code Example 6A and Code Example 6B of the Appendix.

In step 4, NW1 determines if the paging modification requested by the UE is accepted. For illustrative purposes, we assume NW1 accepts the paging modification requests.

In step 5, NW1 responds to the paging modification request with an acknowledgement. NW1 may provide the acknowledgment using any of the methods described herein. In this example, the acknowledgment is provided in the RRCRelease message. Alternatively, an RRCReconfiguration message may be used to signal a new paging configuration.

In step 6, the UE applies the modified paging configuration for NW1.

In step 7, the UE monitors for paging during the POs configured for NW1 and NW2.

In step 8, if triggered, NW1 pages the UE during its PO configured for NW1.

In step 9, if triggered, NW2 pages the UE during its PO configured for NW2.

Network Determined Paging Modification

To avoid paging collisions, the UE may report network assistance information that is used by the network to determine how to modify the paging configuration. The assistance information may include one or more parameters corresponding to fields of the PCCH-Config used to configure paging for the other network(s). The assistance information may also include a parameter corresponding to the timing offset between the two networks; e.g. the SFTD between the PCells of a Multi-USIM UE as described herein. In one aspect of the invention, the network may reconfigure the UE to monitor a different PO during the PF. Alternatively, the network may reconfigure the UE to monitor the PO in a different PF, where an offset signaled by the network is used by the UE to determine the PF. The network may reconfigure other paging parameters; e.g. the DRX cycle, to avoid or reduce the occurrence of paging collisions.

The CN may inform the RAN node a UE is a MUSIN device and provide the RAN node with a UE_ID for a plurality of USIMS in the UE. The RAN node may then determine which paging avoidance approach to use and configure the UE for the determined approach via RRC signaling. Information related to the paging avoidance approach being used may be shared between RAN nodes via the X2 interface. This sharing may be triggered by events such as handover, cell re-selection, RNAU, TAU, registration, etc.

RRC Release/Suspend Request

For scenarios where one of the USIMs is in RRC_CONNECTED mode, the UE may request the release or suspension of the RRC connection to prevent (or reduce the likelihood of) collisions with the monitoring occasions and transmission opportunities associated with the AS procedures performed for another USIM.

The RRC message used to request the release or suspension of the RRC connection may include an indication of PO skipping, similar to the Event-Based PO Skipping solutions proposed herein; or parameters to assist the network in determining the paging configuration that should be used to avoid collisions with the monitoring occasions and transmission opportunities associated with the another USIM, similar to the Paging Modification Request solutions proposed herein. The RRC message may also include an estimate of the time the UE expects to be away from the network; e.g. a pauseDuration; thereby allowing the network to adapt its behavior while the UE is away from the network; e.g. suspend paging.

Figure 25:
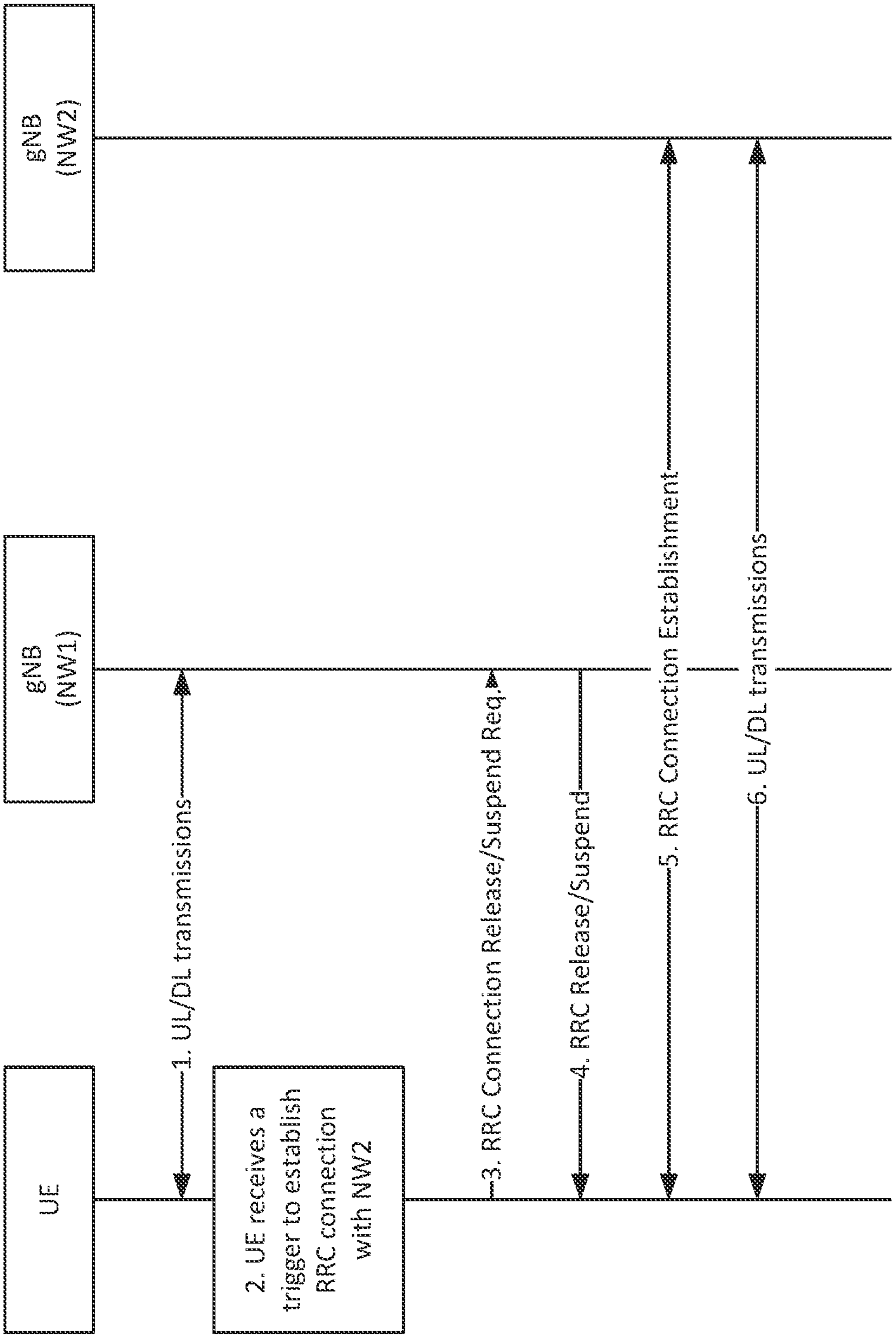
FIG. 25 is a call flow diagram of an example RRC release/suspend request.

FIG. 25 is an illustration of a scenario where a Multi-USIM UE in RRC_CONNECTED mode for NW1, receives a trigger to establish an RRC connection with NW2, that requires the UE to release/suspend the RRC connection with NW1. In step 1 of FIG. 25, the UE is in RRC_CONNECTED with NW1 and performing UL/DL transmission and reception.

In step 2, the UE receives a trigger to establish a connection with NW2. The UE optionally determines how to modify the paging configuration for NW1 to avoid paging collisions. The UE may attempt to modify the paging configuration for one or both networks depending on which network supports paging modification requests and how flexible the paging configuration is for a given network. For example, a network configured to support multiple POs per PF and/or multiple PFs per DRX cycle is more flexible and provides more options for reconfiguring a UE to avoid paging collisions than a network that is not configured to support multiple POs per PF and/or multiple PFs per DRX cycle. For illustrative purposes, we assume the UE determines the paging configuration for NW1 should be modified to avoid paging collisions.

In step 3, the UE requests to Release/Suspend the connection with NW1. The UE may provide an indication to NW1 to request PO skipping or modification of the paging configuration using any of the methods described herein. Alternatively, the RRC connection release/suspend request may be implemented using the UE Assistance Information procedure, where the request to release/suspend the connection corresponds to transmission of the UEAssistanceInformation message. The UEAssistanceInformation message may include releasePreference information that is used to indicate the UE's preferred state. The UEAssistanceInformation message may also include an estimate of the time that the UE expects to be away from the network; e.g. a pauseDuration; thereby allowing the network to adapt its behavior while the UE is away from the network; e.g. suspend paging. Example ReleasePreference information that may be included in the UEAssistanceInformation message is shown in Code Example 7A and Code Example 7B of the Appendix. The UEAssistanceInformation message may also include preferred values for one or more paging configuration parameters; e.g. a preferred PagingCycle, a preferred UE_ID to use in the PO/PF calculations, an index i_s corresponding to the preferred PO to monitor in the PF, an offset to be used in the calculation of the PF. Example PagingPreference information that may be included in the UEAssistanceInformation message is shown in Code Example 6A and Code Example 6B of the Appendix.

In step 4, NW1 determines if the paging modification requested by the UE is accepted. For illustrative purposes, we assume NW1 accepts the paging modification request. NW1 responds to the paging modification request with an acknowledgement. NW1 may provide the acknowledgment using any of the methods described herein. In this example, the acknowledgment is provided in the RRCRelease message.

In step 5, the UE applies the modified paging configuration for NW1 and proceeds to establish an RRC connection with NW2.

In step 6, the UE performs UL/DL transmissions with NW2.

Autonomous RRC Release/Suspend

For scenarios where one of the USIMs is in RRC_CONNECTED mode, the UE may perform an autonomous release or suspension of the RRC connection to prevent (or reduce the likelihood of) collisions with the monitoring occasions and transmission opportunities associated with the AS procedures performed for another USIM. The UE informs the network of its intention to release/suspend the RRC connection and then autonomously transitions to the desired state. The UE may also provide the network with an estimate of the time it expects to be away from the network; e.g. a pauseDuration; thereby allowing the network to adapt its behavior while the UE is away from the network; e.g. suspend paging.

A "negotiated" configuration may be applied when the UE performs the state transition. The "negotiated" configuration may be based on Release Assistance Information (RAI) signaled to the network prior to the UE performing the autonomous release or suspension of the RRC connection. The RAI may include preferred values for one or more paging configuration parameters; e.g. a preferred Paging- Cycle, a preferred UE_ID to use in the PO/PF calculations, an index i_s corresponding to the preferred PO to monitor in the PF, an offset to be used in the calculation of the PF.

The reception of preference information may be treated by the network as a command, in which case the network applies the values of the preferred parameters when it receives the RRC connection release/suspend indication. Alternatively, reception of preference information may be treated by the network as a request, in which case the network may accept, reject or override the request and provide the UE with a response indicating its decision. And in another alternative, the network may respond by providing the UE with a "negotiated" configuration that is applied when the UE autonomously releases/suspends the RRC connection.

For a UE transitioning to RRC_INACTIVE, the "negotiated" configuration may be based on the SuspendConfig. See Code Example 4 of the Appendix shows an example "negotiated" SuspendConfig that has been extended to optionally include a preferred PagingCycle, a preferred UE_ID to use in the PO/PF calculations, an index i_s corresponding to the preferred PO to monitor in the PF, an offset to be used in the calculation of the PF.

For a UE transitioning to RRC_IDLE, the full set of parameters in the Negotiated SuspendConfig are not applicable. The UE may therefore ignore those parameters which are not applicable; e.g.full-RATI, shortI-RNTI, ran-PagingCycle, ran-NotficationAreaInfo, t380 and nextHopChainingCount. Alternatively, a "negotiated" ReleaseConfig that only includes parameters applicable for a UE transitioning to RRC_IDLE may be defined. Code Example 5 shows an example "negotiated" ReleaseConfig.

In some scenarios, the UE may be unable to perform AS procedures such as paging monitoring, RAN-based Notification Area Update (RNAU), etc. after transitioning to RRC_INACTIVE due to activity on the other USIM. This can result in the network erroneously assuming a failure has occurred, which can lead to the network taking corrective actions unnecessarily and a distortion of the call statistics maintained by the network. To prevent this from happening, we propose that the RRC_INACTIVE configuration is released if the UE does not resume the connection within a configured time duration. In one example, this time duration corresponds to the value of the timer t380. If the UE is does not resume the connection before t380 expires, the UE releases the RRC_INACTIVE configuration and transitions to RRC_IDLE. The UE state machine maintained by the network also transitions to RRC_IDLE. In another example, a separate timer, inactivityTimer, may be defined for this purpose and signaled to the UE as part of the "negotiated" SuspendConfig.

Figure 26:
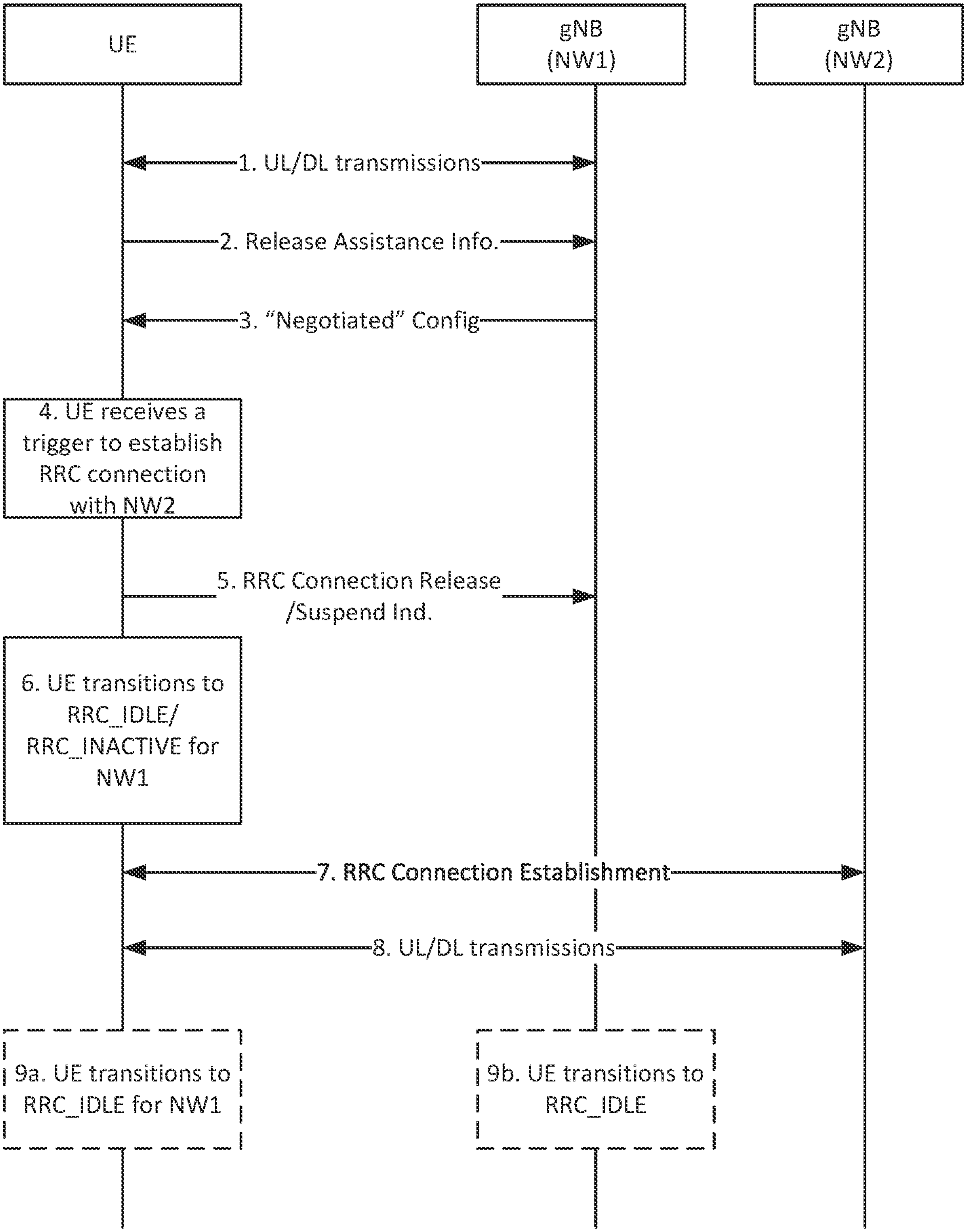
FIG. 26 is a call flow of an example of autonomous release/suspend of a network RRC connection.

FIG. 26 is an illustration of a scenario where a multi-USIM UE in RRC_CONNECTED mode for NW1, receives a trigger to establish an RRC connection with NW2, that requires the UE to autonomously release/suspend the RRC connection with NW1.

In step 1 of FIG. 26, the UE is in RRC_CONNECTED with NW1 and is performing UL/DL transmission and reception.

In step 2, the UE signals RAI to NW1 to indicate its preference for one or more parameters to be applied when it performs an autonomous RRC release/suspend. The RAI information may be signaled using a new RRC message e.g. RRCReleaseAssistainceInformation. Alternatively, the signaling of the RAI may be implemented using the UE Assistance Information procedure, where the signaling of the RAI corresponds to transmission of the UEAssistanceInformation message. The UEAssistanceInformation message may include preferred values for one or more paging configuration parameters; e.g. a preferred PagingCycle, a preferred UE_ID to use in the PO/PF calculations, an index i_s corresponding to the preferred PO to monitor in the PF, an offset to be used in the calculation of the PF. Example PagingPreference information that may be included in the UEAssistanceInformation message is shown in Code Example 6A and Code Example 6B of the Appendix.

In step 3, the UE receives a response from NW1 that indicates the "negotiated" configuration to apply when it performs an autonomous RRC release/suspend.

In step 4, the UE receives a trigger to establish a connection with NW2.

In step 5, the UE signals NW1 to indicate it will be performing an autonomous RRC connection release/suspend. The RRC connection release/suspend indication may be implemented as an RRCRelease message transmitted from the UE to the network. Alternatively, a new RRC message; e.g. RRCReleaseIndication, may be used. And in yet another alternative, the RRC connection release/suspend indication may be implemented using the UE Assistance Information procedure, where the RRC connection release/suspend indication corresponds to transmission of the UEAssistanceInformation message. The UEAssistanceInformation message may include releasePreference information that is used to indicate the UE's preferred state. The UEAssistanceInformation message may also include an estimate of the time the UE expects to be away from the network; e.g. a pauseDuration; thereby allowing the network to adapt its behavior while the UE is away from the network; e.g. suspend paging. Example ReleasePreference information that may be included in the UEAssistanceInformation message is shown in Code Example 7A and Code Example 7B of the Appendix.

In step 6, the UE transitions to RRC_IDLE/RRC_INACTIVE and applies the "negotiated" configuration. If the UE is in RRC_INACTIVE and the SuspendConfig included a non-zero inactivityTimer value, the UE starts the inactivity Timer.

In step 7, the UE establishes an RRC connection with NW2.

In step 8, the UE performs UL/DL transmissions with NW2.

In step 9, if the UE is in RRC_INACTIVE for NW1, but is unable to perform AS procedures due to activity for NW2, the UE transitions to RRC_IDLE for NW1 when the inactivityTimer expires.

C-DRX Modification Request

For scenarios where one of the USIMs is in RRC_CONNECTED mode, the UE may request modification of the C-DRX configuration to prevent (or reduce the likelihood of) collisions with the monitoring occasions and transmission opportunities associated with the AS procedures performed by another USIM.

Dynamic Capabilities Signaling

For some RAT concurrency cases and device capabilities; e.g. EN-DC+NR SA case with a Dual RX/Dual TX device, one transceiver may be used for the MCG for a first USIM, while the other transceiver may be used for the NR SCG for the first USIM or the NR SA cell for another USIM. When the second transceiver is being used for the NR SA cell for another USIM, it may not be possible to also use it for the NR SCG for the first USIM with causing collisions. To avoid collisions for such scenarios, the UE may provide an indication to the network to inform it of changes in its DC capabilities that result when the UE is using the shared transceiver to maintain a connection with another network.

UE Assistance Information Signaling

When configured to do so, the UE can signal the network through UEAssistanceInformation as described in TS 38.300 Release 16. We propose that this procedure may be extended to include UE assistance information for multi-USIM UEs. The multi-USIM assistance information may include the number of USIMs supported by the UE, the preferred DRX/Paging configuration to be supported in RRC_IDLE/RRC_INACTIVE mode, lists of paging causes/paging rules used to enable paging filtering, etc. Example Multi-USIM Assistance information is shown in Code Example 6A and Code Example 6B of the Appendix.

A UE capable of providing multi-USIM assistance information in RRC_CONNECTED mode may initiate the procedure in several cases, including when performing initial access, when determining collisions of paging for the monitoring occasions and transmission opportunities will occur based on the UE configuration for the multiple USIMs, when detecting one or more collisions, when commencing an AS procedure for another USIM, when transitioning to RRC_CONNECTED state for another USIM, when configuring DC for another USIM, etc.

An example procedure to provide multi-USIM assistance information may be defined as follows.

Upon initiating the procedure, the UE shall:

1> if configured to provide multi-USIM assistance information:

2> if the UE did not transmit a UEAssistanceInformation message with multiUSIM-Assistance since it was configured to provide multi-USIM assistance information; or 2> if the current preference for 3> initiate transmission of the UEAssistanceInformation message to provide the multi-USIM assistance information.

The UE shall set the contents of the UEAssistanceInformation message as follows:

1> if transmission of the UEAssistanceInformation message is initiated to provide multi-USIM assistance information:

2> include multiUSIMAssistanceInformation in the UEAssistanceInformation message;

2> set numUSIMs to the number of USIMs in use by the UE;

2> set pagingCycle to the desired paging cycle;

2> set UE_ID to the desired value of UE_ID to be used in the PO and PF calculations;

2> set i_s to a value corresponding to the index of the desired PO;

2> set offset to a value corresponding to a desired offset to use in the PF calculation.

The UE shall submit the UEAssistanceInformation message to lower layers for transmission. See Code Example 6A and Code Example 6B of the Appendix.

We propose the UE Assistance Information procedure may also be extended to allow a multi-USIM to transition out of RRC_CONNECTED to avoid collisions with the monitoring occasions and transmission opportunities associated with another USIM. The ReleasePreference information may include an estimate of the time the UE expects to be away from the network; e.g. a pauseDuration. Example ReleasePreference information is shown in Code Example 7A and Code Example 7B of the Appendix. Alternatively, the ReleasePreference information may be implemented as fields in the Multi-USIM Assistance Information.

UE Requests Network to Stop Paging UE

During some scenarios, the UE may be busy using the services associated with a first USIM and receives a page associated with a second USIM. In this solution, the UE may request the network associated with the second USIM to stop paging the UE to avoid wasting paging resources. For example, a multi-USIM UE is currently receiving a voice call using the services of USIM1 and then receives a page associated with USIM2. Instead of ignoring the page associated with USIM2 and wasting network resources, the UE may send an RRC message, e.g., RRCSetupRequest, RRCResumeRequest, or RRCResumneRequest1, to the RAN node of the network of USIM2 and inform the network to stop paging the UE.

In the message, the UE may include an indication that informs the network to not page the UE until the UE disables the feature by sending the network another RRC message. Alternatively, the UE may provide a time duration with which the network stops paging the UE and upon the expiration of the time duration, the network may resume paging the UE. In turn, the RAN node may need to communicate the UE's preference to the CN, so the CN is also aware to stop paging the UE.

Figure 27:
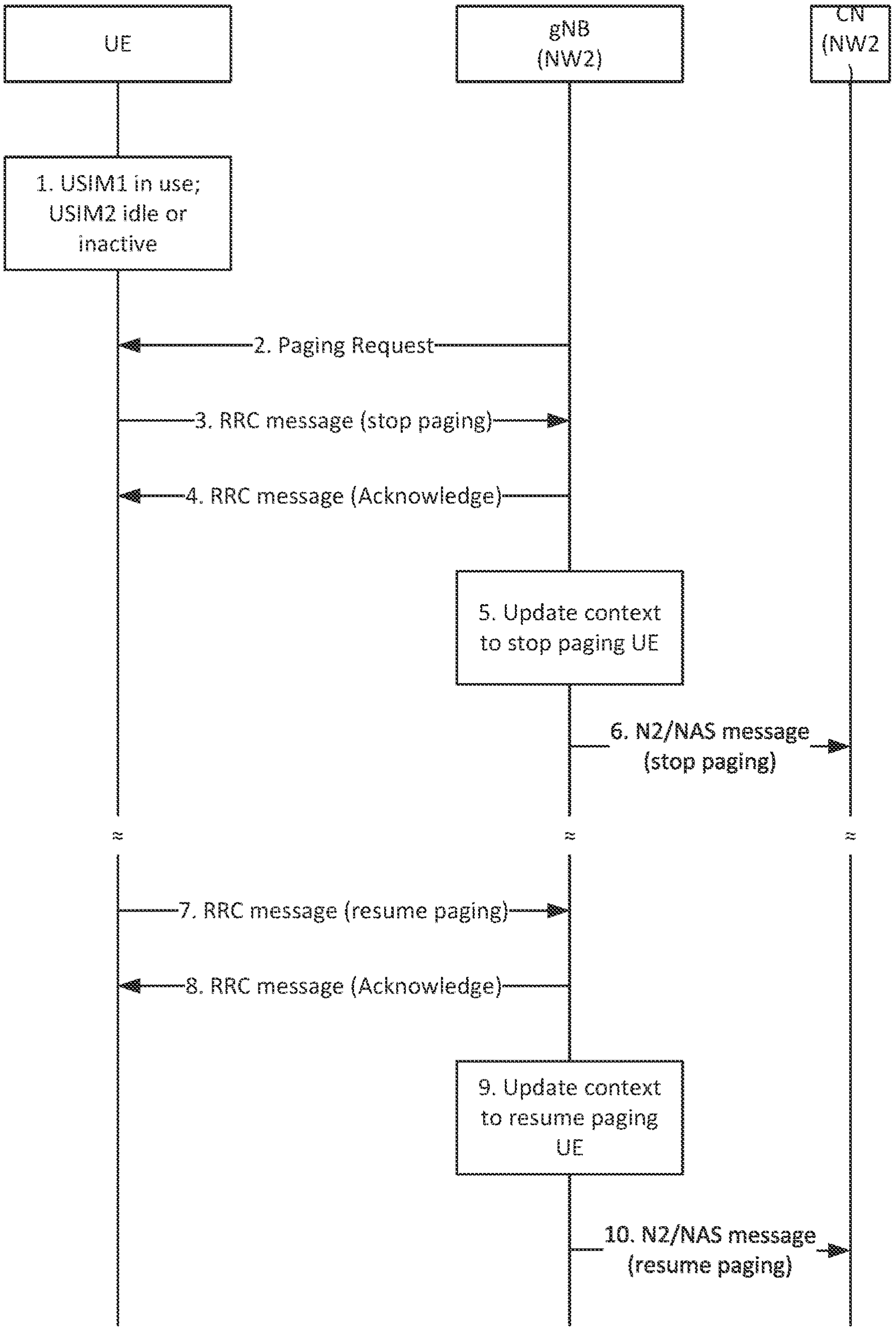
FIG. 27 is a call flow of an example UE request to stop paging.

FIG. 27 is a call flow of an example UE request to stop paging. In step 1 of FIG. 27, the UE is in use, e.g., in RRC_CONNECTED with NW1 (USIM1), and in RRC_IDLE or RRC_INACTIVE with NW2 (USIM2).

In step 2, data is available for USIM2 and NW2 pages the UE. The Paging Message may include a Paging Cause.

In step 3, based on the Paging Cause, the UE wants to continue using the services of NW1 and sends an RRC message to NW2 with an indication to temporarily stop paging the UE. The UE may also include a time duration that NW2 should stop paging the UE. After the expiration of the time duration, NW2 may resume paging the UE. Alternatively, the paging may be stopped indefinitely; i.e. until the UE sends a request to re-enable Paging.

In step 4, NW2 acknowledges receiving the stop page indication from the UE. NW2 may provide a new value for the time duration and return the value to the UE.

In step 5, the gNB of NW2 saves the indication and the time duration in the UE context the gNB stores for the UE.

In step 6, if the UE is in RRC_IDLE or RRC_INACTIVE, the gNB may send an N2/NAS message to the CN of NW2 and include the stop page indication and the time duration.

In step 7, the UE determines it wants to receive paging from NW2 and sends an RRC message to NW2 with an indication to resume paging the UE.

In step 8, NW2 acknowledges receiving the resume paging indication from the UE.

In step 9, the gNB updates the UE context to resume paging.

In step 10, f the UE is in RRC_IDLE or RRC_INACTIVE, the gNB may send an N2/NAS message to the CN of NW2 and include the resume paging indication.

In another alternative, the UE may send an RRC message comprising a busy indication to the RAN node of the network of USIM2 to inform the network that the UE will not respond to the page. The message may correspond to an RRCSetupRequest, RRCResumeRequest, or an RRCResumeRequest1 message with a resume cause set to a value indicating the UE is busy, e.g., "busy indication."

Network Page Filtering

The network may also assist in enhancing the paging procedure by allowing UEs to provide information that may be used by the network to filter paging requests based on established paging cause. In this procedure, the UE sends the network assistance information providing paging filters the network uses to determine whether to page a UE. The UE may provide the assistance information as part of RRC signaling and if necessary, the RAN node informs the CN.

The paging filters may be a list of paging causes that the UE would like to either receive or not receive paging for. The extent of the paging filters depends on the granularity of the paging causes. Alternatively, the paging filters may be a set of rules that informs the network whether to page the UE.

Figure 28:
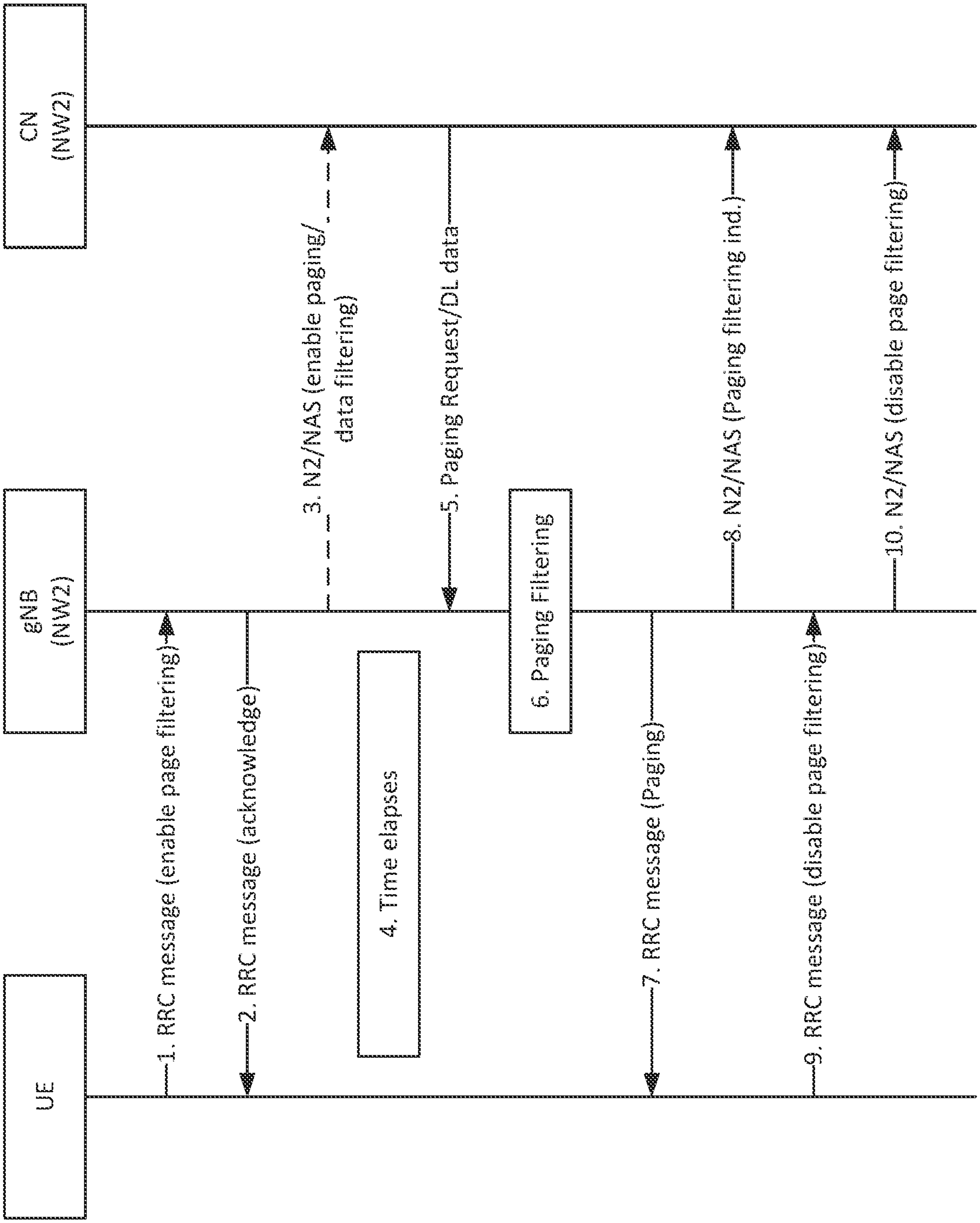
FIG. 28 is a call of flow of an example UE request to enable paging filtering.

FIG. 28 is a call of flow of an example UE Request to Enable Paging Filtering. In step 1 of FIG. 28, The UE wants to enable paging filtering in NW2 and sends an RRC message to the gNB of NW2. In the request, the UE may provide a list of paging causes that the UE may want to be paged for. Alternatively, the UE may indicate which paging causes it does not want to be paged for. And in another alternative, the UE may include a list of paging rules which indicates what types of DL data the UE wants to receive pages for. The indication and paging-cause list may be part of assistance information the UE provides to NW2 for enhancing multi-USIM operations. The assistance information may be provided to the gNB using the UE Assistance Information procedure, where the signaling of the assistance information corresponds to transmission of the UEAssistanceInformation message that includes the paging causes for which the UE should be paged.

In step 2, the gNB acknowledges receiving the assistance information from the UE. The acknowledgment may be provided using RRC signaling. Alternatively, acknowledgment provided by lower layers of successful reception of the PDU carrying the request may be used.

In step 3, the gNB may send an N2/NAS message to the CN of NW2 to enable paging/data filtering in the CN for the UE. If the UE is in RRC_IDLE, the message is used to enable paging filtering in the CN for the UE. If the UE is in RRC_INACTVE, the message is used to enable data filtering in the RAN for the UE.

In step 4, some time elapses.

In step 5, downlink data is available for the UE in NW2. If CN paging/data filtering is not enabled for the UE, the CN pages the UE by sending a paging request to the gNB if the UE is in RRC_IDLE or sends downlink data to the gNB if the UE is in RRC_INACTIVE.

In step 6, the gNB examines the paging request/downlink data and determines if the UE should be paged.

In step 7, if in step 6 the gNB determines the UE should be paged, the gNB transmits a Paging message to the UE. The paging message may include a paging cause and other information about the page.

In step 8, if in step 6 the gNB determines the UE should not be paged, the gNB may transmit an N2/NAS message to the CN to indicate the paging request/downlink data was filtered out and that the UE is busy. This message may also be used to enable paging/data filtering in the CN for the UE if the CN was not previously informed of the UE's desire to filter certain paging requests or downlink data in step 3.

In step 9, sometime later, the UE sends an RRC message to disable the paging filtering. Alternatively, expiration of a timer may be used to disable the paging filter. The value used for the timer may be signaled to the network by the UE. For example, the RRC message transmitted in step 1 of this procedure may optionally include a value for this timer. If the timer value is not included, the network assumes paging filtering is enabled until the UE sends an RRC message to disable the paging filtering. When the timer is configured, the UE may send an RRC message to disable the paging filtering before the timer expires.

In step 10, the gNB may send an N2/NAS message to disable the paging filtering if it was previously enabled.

Collision Resolution Solutions

In this section, we define a class of solutions that may be used for collision resolution. The solutions are applicable for scenarios where the UE determines that a collision has occurred (or is about to occur). A UE may determine when a collision has occurred or is about to occur based on the UE configuration for the multiple USIM e.g. Paging configuration, SMTC configuration, SI-SchedulingInfo configuration, C-DRX configuration, etc., and/or feedback from lower layers that access the common radio and baseband components. The proposed solutions include descriptions of the behavior the UE take to resolve the collision; e.g., determine which AS procedure to execute, as well as descriptions of the subsequent UE actions that may be taken to gracefully recover from the collision. The collision resolution solutions described in this section may be used on their own or in combination with the collision avoidance solutions described herein.

Rule-Based Collision Resolution

For scenarios where a collision has occurred or is about to occur, a rule-based collision resolution method may be used. When a collision occurs, the UE uses a set of rules to determine which AS procedure to perform. The rules may be defined per the standards, user preference and/or network configuration.

For example, a priority may be assigned to the different AS procedure types. When a collision occurs, the UE performs the AS procedure with the higher priority. Table 6 of the Appendix—Prioritization Based on AS Procedure, is an example that shows how the AS procedures for a UE in RRC_IDLE/RRC_INACTIVE could be prioritized. In this example, the measurements and reading of the MIB/SIB1 that is performed as part of the Cell (Re-)Selection and PLMN Selection procedures is determined based on the priority of the corresponding procedure.

Alternatively, priority could be based on the action that the UE is performing regardless of the procedure for which it is being performed. For the example shown in Table 7 of the Appendix—Prioritization Based on UE Action, reading of the MIB/SIB1 that is part of the Cell (Re-)Selection procedure is given the same priority as when performing SI acquisition for the serving cell; and all measurements are performed with the same priority, regardless of the procedure for which they are being performed.

Priority may also be based on the USIM for which the procedure was triggered. A USIM's priority may be determined based on user preference; e.g. assigned by the user via a UE application, or based on the physical slot the USIM is inserted into. USIM based priority may be used on its own or in combination with the other prioritization solutions described herein.

Figure 29:
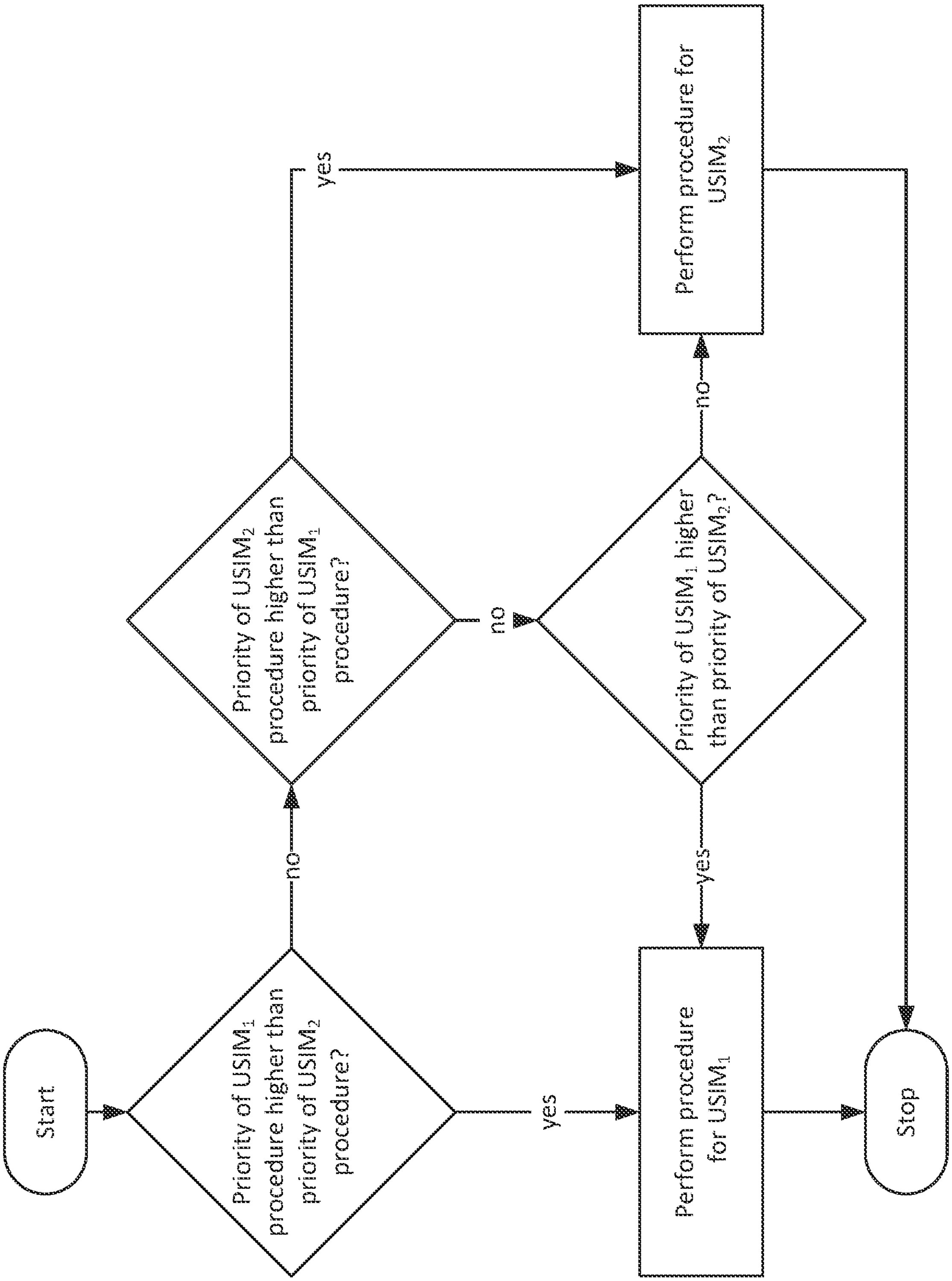
FIG. 29 is a flow chart of an example algorithm to perform collision resolution.

For example, an iterative approach may be performed where procedure-based prioritization is first to be performed. And in the event procedures with the same priority are being performed for multiple USIMs simultaneously, USIM-based prioritization may be used to break the tie as illustrated in FIG. 29

Prioritization may be based on the RRC state of the USIM for which the AS procedure was executed. For example, an AS procedure performed for a USIM in RRC_CONNECTED state may be given priority over AS procedures performed for a USIM in RRC_IDLE/RRC_INACTIVE state. Different priorities may also be assigned for the RRC_IDLE and RRC_INACTIVE states, thereby allowing AS procedures performed for a USIM in RRC_INACTIVE mode to be prioritized over a AS procedure performed for a USIM in RRC_IDLE mode, or vice versa.

And in yet another aspect of the solution, AS procedures requiring a transition to RRC_CONNECTED mode; e.g. RRC Connection Establishment/Resume, may be given priority over the Idle Mode procedures; e.g. Paging, SI Acquisition, PLMN Selection, Cell (Re-)Selection. If the other USIM is already in RRC_CONNECTED mode, the priority of service for which an RRC connection is being established or resumed may be considered when determining which USIM/AS procedure to give priority to. For example, an RRC Connection Establishment procedure with an EstablishmentCause equal to "emergency" or "highPriorityAccess" may be prioritized over an AS procedure for a USIM in RRC_CONNECTED.

The RAT for which the AS procedure is being performed may also be considered. For example, an NR procedure may be given priority over LTE, WCDMA, GSM, etc. as shown in Table 8 of the Appendix—Prioritization Based on RAT.

Following a collision, the UE may take actions to recover from the collision. For example, if an SI acquisition procedure is not performed due to a collision, the UE may perform the RACH-Based SI Acquisition procedure described herein. For scenarios where a PO is missed due to a collision, the UE may perform the Short Message Acquisition procedure described herein to ensure the UE does not miss PWS notification and/or ST change indications. An On-Demand Paging procedure may also be performed to ensure the UE does not miss a MT call and/or data.

RACH-Based SI Acquisition

If a UE is unable to monitor the DL during an SI window due to a collision, a RACH-Based SI Acquisition procedure may be used where the requested SIB(s) are provided in the RACH response; e.g. Msg4, Msg2 or MsgB. The UE may trigger the RACH-Based SI Acquisition Procedure when the AS procedure of the other USIM completes. The UE configuration for the multiple USIMs; e.g. Paging configuration, SMTC configuration, SI-SchedulingInfo configuration, C-DRX configuration, etc., may be used to determine when the RACH-Based SI Acquisition should be performed to avoid colliding with the monitoring occasions and transmission opportunities associated with the AS procedures performed for another USIM.

In one example, the 4-step RACH procedure is used, where Msg3 includes an indication of the requested SIB(s). The indication may be included in an RRC message that is transmitted as part of Msg3. The Msg4 response provided by the network then includes the requested the requested SIB (s).

In another example, the 4-step RACH procedure is used, however only steps 1 and 2 are used. A mapping between SIB(s) and preambles and/or RACH occasions allows Msg1 to be used to provide an implicit indication of the requested SIB(s), which are provided by the network in the Msg2 response. Alternatively, the mapping may be between SI Messages and preambles and/or RACH occasions. In which case the Msg2 response includes the SIB(s) configured for the requested SI Message(s).

And in yet another example, the 2-step RACH procedure is used, where MsgA includes an indication of the requested SIB(s), which are provided by the network in the MsgB response.

Short Message Acquisition

Figure 30:
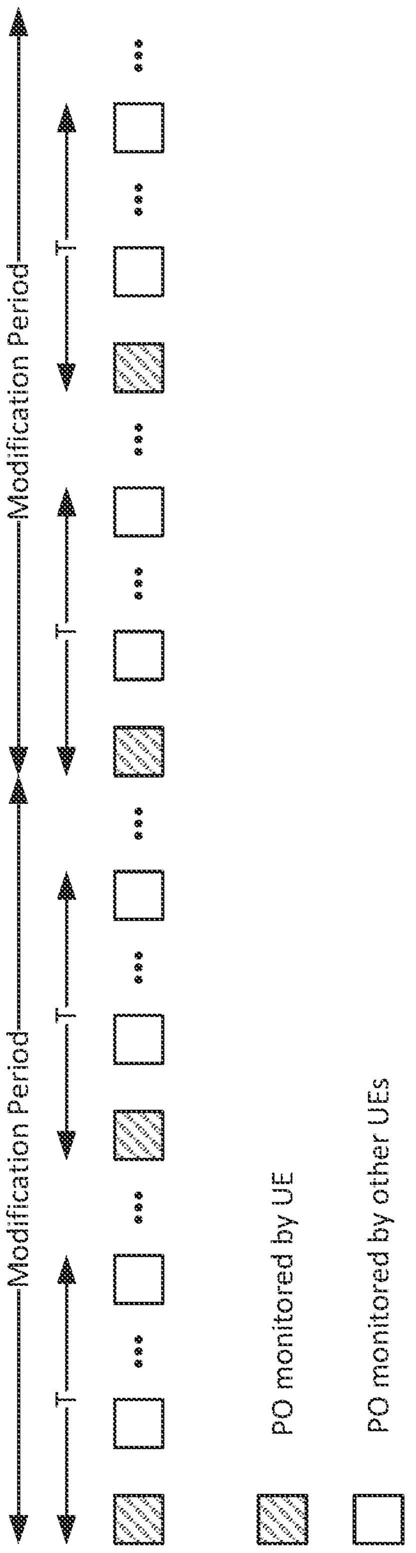
FIG. 30 is a timing diagram of an example modification period.

The Short Message is used to provide a UE with an indication about SI modifications that will occur in the next modification period. A UE may miss this indication if it is unable to monitor the Paging DCI during its PO due to a collision. Depending on the UE and network configuration, a modification period may be comprised of multiple DRX cycles, where the UE monitors one PO per DRX cycle as shown in FIG. 30.

From the network perspective, additional POs may be configured and monitored by other UEs. If the UE is unable to monitor the Paging DCI during its configured PO due to a collision, it may monitor a PO configured for another UE to receive the Short Message.

Repetitions of an SI change indication may occur within a preceding modification period. If the network is configured such that an SI change indication is repeated in all POs during the preceding modification period, the UE will be able to receive the SI change indication provided it can monitor at least one of its configured POs during the modification period to receive the Short Message.

To prevent the UE from monitoring additional POs unnecessarily, the UE may only monitor an additional PO if it is unable to monitor all of its POs that occur during a modification cycle. In this scenario, the UE may choose to monitor any PO that occurs after its last configured PO in the modification period. If the UE is unable to monitor any of the POs during a modification period to receive the Short Message, then the UE shall acquire SIB1 to obtain the valueTags for the SIBs being broadcast in the Serving Cell to ensure the SI it has is still valid; e.g., the valueTag for the SIBs broadcast by the Serving Cell and the valueTags for the SIBs being used by the UE match. If the valueTag for a given SIB does not match, then the UE shall acquire the modified SIB from the network.

If the network is configured such that an SI change indication may not be repeated in all POs during the preceding modification period, then if the UE misses any PO during the modification period it may miss an SI change indication. In this scenario, the UE may choose to monitor any PO that occurs after a missed PO. And if the UE is unable to monitor any PO that occurs during a DRX cycle, the UE shall acquire SIB1 to obtain the valueTags for the SIBs being broadcast in the Serving Cell to ensure the SI it has is still valid, and subsequently acquire any modified SIB from the network.

The Short Message is also used to provide a UE with PWS notifications. ETWS or CMAS capable UEs in RRC_IDLE or in RRC_INACTIVE are required to monitor for indications about PWS notification in its own paging occasion every DRX cycle. If a PO is missed due to a collision, the UE may monitor for a PWS notification in any PO that occurs after a missed PO in its DRX cycle.

On-Demand Paging

To ensure a UE does not miss a MT call and/or data, the UE may perform an on-demand paging procedure, where the UE (re-)establishes an AS connection with the network for a USIM when a configured number of POs are missed due to a paging collision. The network may configure on-demand paging for a UE based on an indication that the UE is configured with multiple USIMs or an explicit request from the UE. The number of missed POs that is used to control when an on-demand paging procedure is performed may be cell-specific and broadcast as part of the SI or UE-specific and signaled using dedicated signaling.

When (re-)establishing an AS connection for on-demand paging, a new EstablishmentCause/ResumeCause e.g. onDemandPaging could be used indicate this to the network. Upon (re-)establishing the connection, the network would commence with UL/DL transmission if there is MT data pending for the UE. If not, the network may release or suspend the RRC connection.

User Interface

Figure 31:
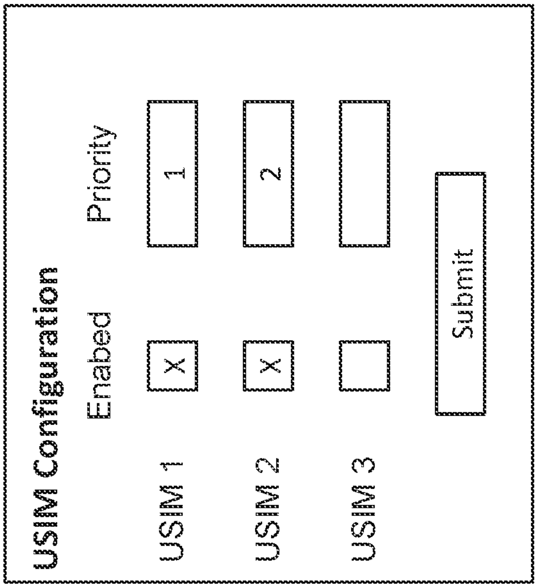
FIG. 31 is an example user interface that may be used to configure the UE for MUSIM operation.

A user interface is proposed in FIG. 31, which can be used by a user to configure the UE for MUSIM operation. For example, the user interface may be used to enable/disable a given USIM. In one example, a check box is used to indicate the enabled/disabled status of a given USIM. The user interface may also be used to assign a priority to a USIM, wherein the assigned priority may be used to determine when to ignore a page for a given network or to perform rule-based collision resolution as described herein. In one example, a text box may be used to assign the priority for a given USIM. The priority may be assigned as a numerical value, e.g. 1, 2, 3, as an enumerated value; e.g. High, Medium, Low, etc.

Figure 32:
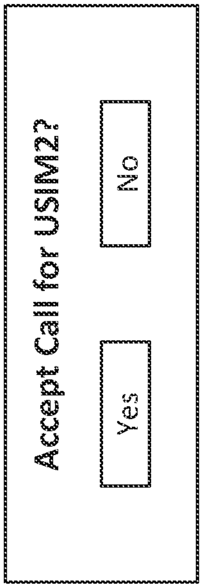
FIG. 32 is an example notification that may be used to inform the user of the need to establish a call for a given USIM.

The user interface may also be used to provide the user with a notification when an MT or a MO call needs to be resumed/established for a given USIM; and the user can provide a response to accept or reject the request to resume/establish the call. The notification may also include meta-data related to the MT/MO call; e.g. to inform the user of the associated service, the paging cause, etc. For example, if a UE communicating with network 1 via USIM1 receives a page for network 2 via USIM2, a notification informing the user of the call on USIM2 may be provided to the user as shown in FIG. 32. The user can then accept or reject the incoming call for USIM2.

In another example, if a UE is communicating with network 1 via USIM1 and an application running on the UE needs to send/receive data to network 2 via USIM2, a notification informing of the user of the need to establish/resume a connection for USIM2 may be provided to the network. A notification similar to the one shown in FIG. 32 may be used to allow the user to accept/reject the call for USIM2.

Example Environments

The 3rd Generation Partnership Project (3GPP) develops technical standards for cellular telecommunications network technologies, including radio access, the core transport network, and service capabilities—including work on codecs, security, and quality of service. Recent radio access technology (RAT) standards include WCDMA (commonly referred as 3G), LTE (commonly referred as 4G), and LTE-Advanced standards. 3GPP has begun working on the standardization of next generation cellular technology, called New Radio (NR), which is also referred to as "5G". 3GPP NR standards development is expected to include the definition of next generation radio access technology (new RAT), which is expected to include the provision of new flexible radio access below 6 GHz, and the provision of new ultra-mobile broadband radio access above 6 GHz. The flexible radio access is expected to consist of a new, non-backwards compatible radio access in new spectrum below 6 GHz, and it is expected to include different operating modes that may be multiplexed together in the same spectrum to address a broad set of 3GPP NR use cases with diverging requirements. The ultra-mobile broadband is expected to include cmWave and mmWave spectrum that will provide the opportunity for ultra-mobile broadband access for, e.g., indoor applications and hotspots. In particular, the ultra-mobile broadband is expected to share a common design framework with the flexible radio access below 6 GHz, with cmWave and mmWave specific design optimizations.

3GPP has identified a variety of use cases that NR is expected to support, resulting in a wide variety of user experience requirements for data rate, latency, and mobility. The use cases include the following general categories: enhanced mobile broadband (e.g., broadband access in dense areas, indoor ultra-high broadband access, broadband access in a crowd, 50+ Mbps everywhere, ultra-low cost broadband access, mobile broadband in vehicles), critical communications, massive machine type communications, network operation (e.g., network slicing, routing, migration and interworking, energy savings), and enhanced vehicle-to-everything (eV2X) communications, which may include any of Vehicle-to-Vehicle Communication (V2V), Vehicle-to-Infrastructure Communication (V21), Vehicle-to-Network Communication (V2N), Vehicle-to-Pedestrian Communication (V2P), and vehicle communications with other entities. Specific service and applications in these categories include, e.g., monitoring and sensor networks, device remote controlling, bi-directional remote controlling, personal cloud computing, video streaming, wireless cloud-based office, first responder connectivity, automotive ecall, disaster alerts, real-time gaming, multi-person video calls, autonomous driving, augmented reality, tactile internet, and virtual reality to name a few. All of these use cases and others are contemplated herein.

Figure 33A:
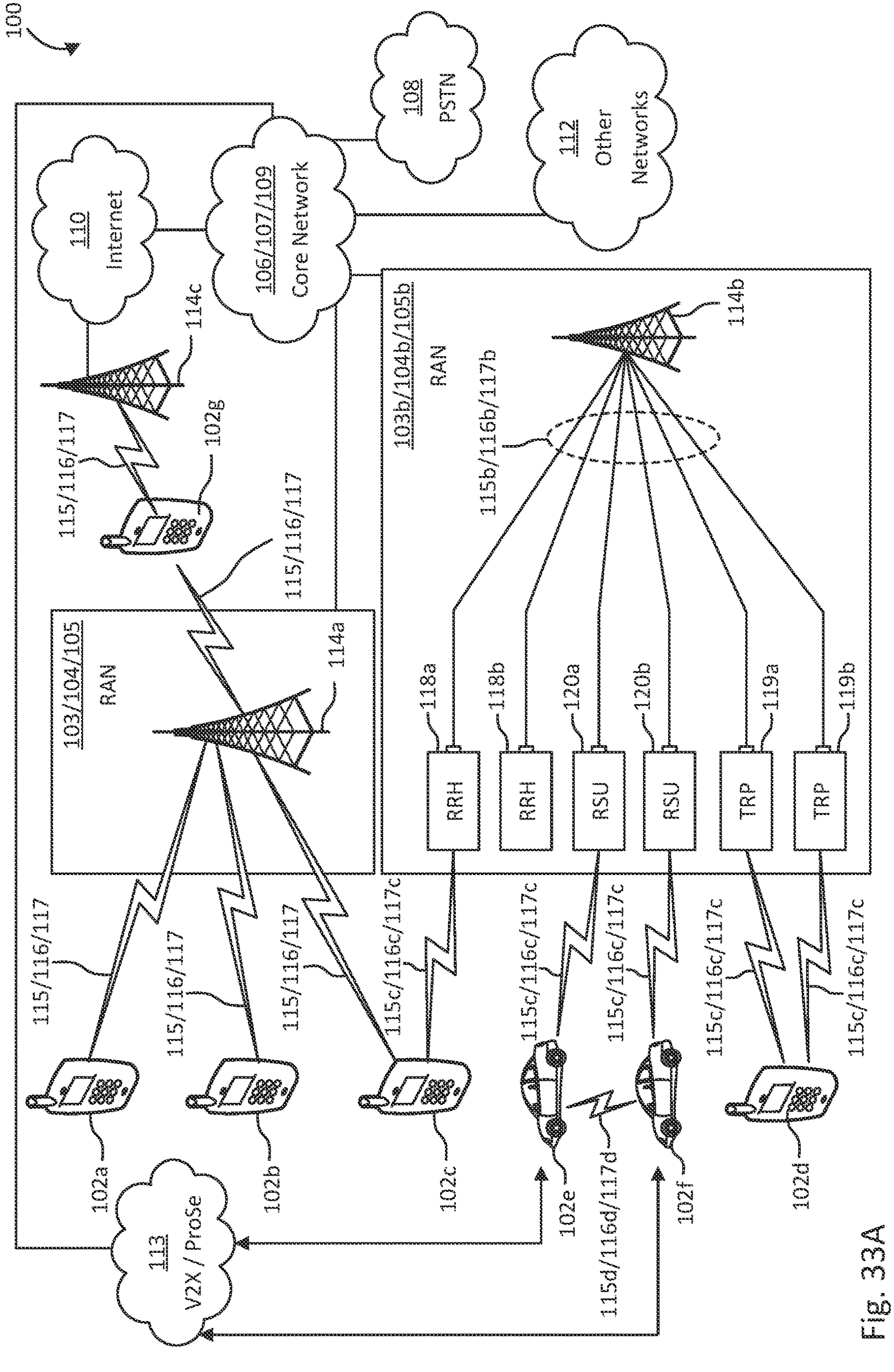
FIG. 33A illustrates an example communications system in which the methods and apparatuses described and claimed herein may be embodied.

FIG. 33A illustrates one embodiment of an example communications system 100 in which the methods and apparatuses described and claimed herein may be embodied. As shown, the example communications system 100 may include wireless transmit/receive units (WTRUs) 102*a*, 102*b*, 102*c*, 102*d*, 102*e*, 102*f*, and/or 102*g* (which generally or collectively may be referred to as WTRU 102), a radio access network (RAN) 103/104/105/103*b*/104*b*/105*b*, a core network 106/107/109, a public switched telephone network (PSTN) 108, the Internet 110, other networks 112, and V2X server (or ProSe function and server) 113, though it will be appreciated that the disclosed embodiments contemplate any number of WTRUs, base stations, networks, and/or network elements. Each of the WTRUs 102*a*, 102*b*, 102*c*, 102*d*, 102*e*, 102*f*, 102*g* may be any type of apparatus or device configured to operate and/or communicate in a wireless environment. Although each WTRU 102*a*, 102*b*, 102*c*, 102*d*, 102*e*, 102*f*, 102*g* is depicted in FIGS. 33A-E as a hand-held wireless communications apparatus, it is understood that with the wide variety of use cases contemplated for 5G wireless communications, each WTRU may comprise or be embodied in any type of apparatus or device configured to transmit and/or receive wireless signals, including, by way of example only, user equipment (UE), a mobile station, a fixed or mobile subscriber unit, a pager, a cellular telephone, a personal digital assistant (PDA), a smartphone, a laptop, a tablet, a netbook, a notebook computer, a personal computer, a wireless sensor, consumer electronics, a wearable device such as a smart watch or smart clothing, a medical or eHealth device, a robot, industrial equipment, a drone, a vehicle such as a car, truck, train, or airplane, and the like.

The communications system 100 may also include a base station 114*a* and a base station 114*b*. Base stations 114*a* may be any type of device configured to wirelessly interface with at least one of the WTRUs 102*a*, 102*b*, 102*c* to facilitate access to one or more communication networks, such as the core network 106/107/109, the Internet 110, and/or the other networks 112. Base stations 114*b* may be any type of device configured to wiredly and/or wirelessly interface with at least one of the RRHs (Remote Radio Heads) 118*a*, 118*b*, TRPs (Transmission and Reception Points) 119*a*, 119*b*, and/or RSUs (Roadside Units) 120*a* and 120*b* to facilitate access to one or more communication networks, such as the core network 106/107/109, the Internet 110, the other networks 112, and/or V2X server (or ProSe function and server)

113. RRHs 118a, 118b may be any type of device configured to wirelessly interface with at least one of the WTRU 102c, to facilitate access to one or more communication networks, such as the core network 106/107/109, the Internet 110, and/or the other networks 112. TRPs 119a, 119b may be any type of device configured to wirelessly interface with at least one of the WTRU 102d, to facilitate access to one or more communication networks, such as the core network 106/107/109, the Internet 110, and/or the other networks 112. RSUs 120a and 120b may be any type of device configured to wirelessly interface with at least one of the WTRU 102e or 102f, to facilitate access to one or more communication networks, such as the core network 106/107/109, the Internet 110, the other networks 112, and/or V2X server (or ProSe function and server) 113. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 103/104/105, which may also include other base stations and/or network elements (not shown), such as a base station controller (BSC), a radio network controller (RNC), relay nodes, etc. The base station 114b may be part of the RAN 103b/104b/105b, which may also include other base stations and/or network elements (not shown), such as a base station controller (BSC), a radio network controller (RNC), relay nodes, etc. The base station 114a may be configured to transmit and/or receive wireless signals within a particular geographic region, which may be referred to as a cell (not shown). The base station 114b may be configured to transmit and/or receive wired and/or wireless signals within a particular geographic region, which may be referred to as a cell (not shown). The cell may further be divided into cell sectors. For example, the cell associated with the base station 114a may be divided into three sectors. Thus, in an embodiment, the base station 114a may include three transceivers, e.g., one for each sector of the cell. In an embodiment, the base station 114a may employ multiple-input multiple output (MIMO) technology and, therefore, may utilize multiple transceivers for each sector of the cell.

The base stations 114a may communicate with one or more of the WTRUs 102a, 102b, 102c over an air interface 115/116/117, which may be any suitable wireless communication link (e.g., radio frequency (RF), microwave, infrared (IR), ultraviolet (UV), visible light, cmWave, mmWave, etc.). The air interface 115/116/117 may be established using any suitable radio access technology (RAT).

The base stations 114b may communicate with one or more of the RRHs 118a, 118b, TRPs 119a, 119b, and/or RSUs 120a and 120b, over a wired or air interface 115b/116b/117b, which may be any suitable wired (e.g., cable, optical fiber, etc.) or wireless communication link (e.g., radio frequency (RF), microwave, infrared (IR), ultraviolet (UV), visible light, cmWave, mmWave, etc.). The air interface 115b/116b/117b may be established using any suitable radio access technology (RAT).

The RRHs 1/8a, 118b, TRPs 119a, 119b and/or RSUs 120a, 120b, may communicate with one or more of the WTRUs 102c, 102d, 102e, 102f over an air interface 115c/116c/117c, which may be any suitable wireless communication link (e.g., radio frequency (RF), microwave, infrared (iR), ultraviolet (UV), visible light, cmWave, mmWave, etc.). The air interface 115c/116c/117c may be established using any suitable radio access technology (RAT).

The WTRUs 102a, 102b, 102c, 102d, 102e, 102f, and/or 102g may communicate with one another over an air interface 115d/116d/117d (not shown in the figures), which may be any suitable wireless communication link (e.g., radio frequency (RF), microwave, infrared (IR), ultraviolet (UV), visible light, cmWave, mmWave, etc.). The air interface 115d/116d/117d may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 103/104/105 and the WTRUs 102a, 102b, 102c, or RRHs 118a, 118b, TRPs 119a, 119b and RSUs 120a, 120b, in the RAN 103b/104b/105b and the WTRUs 102c, 102d, 102e, 102f, may implement a radio technology such as Universal Mobile Telecommunications System (UMTS) Terrestrial Radio Access (UTRA), which may establish the air interface 115/116/117 or 115c/116c/117c respectively using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In an embodiment, the base station 114a and the WTRUs 102a, 102b, 102c, or RRHs 118a, 118b, TRPs 119a, 119b, and/or RSUs 120a, 120b, in the RAN 103b/104b/105b and the WTRUs 102c, 102d, may implement a radio technology such as Evolved UMTS Terrestrial Radio Access (E-UTRA), which may establish the air interface 115/116/117 or 115c/116c/117c respectively using Long Term Evolution (LTE) and/or LTE-Advanced (LTE-A). In the future, the air interface 115/116/117 may implement 3GPP NR technology. The LTE and LTE-A technology includes LTE D2D and V2X technologies and interface (such as Sidelink communications, etc.) The 3GPP NR technology includes NR V2X technologies and interface (such as Sidelink communications, etc.)

In an embodiment, the base station 114a in the RAN 103/104/105 and the WTRUs 102a, 102b, 102c, or RRHs 118a, 118b, TRPs 119a, 119b and/or RSUs 120a, 120b, in the RAN 103b/104b/105b and the WTRUs 102c, 102d, 102e, 102f may implement radio technologies such as IEEE 802.16 (e.g., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114c in FIG. 33A may be a wireless router, Home Node B, Home eNode B, or access point, for example, and may utilize any suitable RAT for facilitating wireless connectivity in a localized area, such as a place of business, a home, a vehicle, a campus, and the like. In an embodiment, the base station 114c and the WTRUs 102e, may implement a radio technology such as IEEE 802.11 to establish a wireless local area network (WLAN). In an embodiment, the base station 114c and the WTRUs 102d, may implement a radio technology such as IEEE 802.15 to establish a wireless personal area network (WPAN). In yet another embodiment, the base station 114c and the WTRUs 102e, may utilize a cellular-based RAT (e.g., WCDMA, CDMA2000, GSM, LTE, LTE-A, etc.) to establish a picocell or femtocell. As shown in FIG. 33A, the base station 114*b* may have a direct connection to the Internet 110. Thus, the base station 114*c* may not be required to access the Internet 110 via the core network 106/107/109.

The RAN 103/104/105 and/or RAN 103*b*/104*b*/105*b* may be in communication with the core network 106/107/109, which may be any type of network configured to provide voice, data, applications, and/or voice over internet protocol (VoIP) services to one or more of the WTRUs 102*a*, 102*b*, 102*c*, 102*d*. For example, the core network 106/107/109 may provide call control, billing services, mobile location-based services, pre-paid calling, Internet connectivity, video distribution, etc., and/or perform high-level security functions, such as user authentication.

Although not shown in FIG. 33A, it will be appreciated that the RAN 103/104/105 and/or RAN 103*b*/104*b*/105*b* and/or the core network 106/107/109 may be in direct or indirect communication with other RANs that employ the same RAT as the RAN 103/104/105 and/or RAN 103*b*/104*b*/105*b* or a different RAT. For example, in addition to being connected to the RAN 103/104/105 and/or RAN 103*b*/104*b*/105*b*, which may be utilizing an E-UTRA radio technology, the core network 106/107/109 may also be in communication with another RAN (not shown) employing a GSM radio technology.

The core network 106/107/109 may also serve as a gateway for the WTRUs 102*a*, 102*b*, 102*c*, 102*d*, 102*e* to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 103/104/105 and/or RAN 103*b*/104*b*/105*b* or a different RAT.

Some or all of the WTRUs 102*a*, 102*b*, 102*c*, 102*d* in the communications system 100 may include multi-mode capabilities, e.g., the WTRUs 102*a*, 102*b*, 102*c*, 102*d*, and 102*e* may include multiple transceivers for communicating with different wireless networks over different wireless links. For example, the WTRU 102*e* shown in FIG. 33A may be configured to communicate with the base station 114*a*, which may employ a cellular-based radio technology, and with the base station 114*c*, which may employ an IEEE 802 radio technology.

Figure 33B:
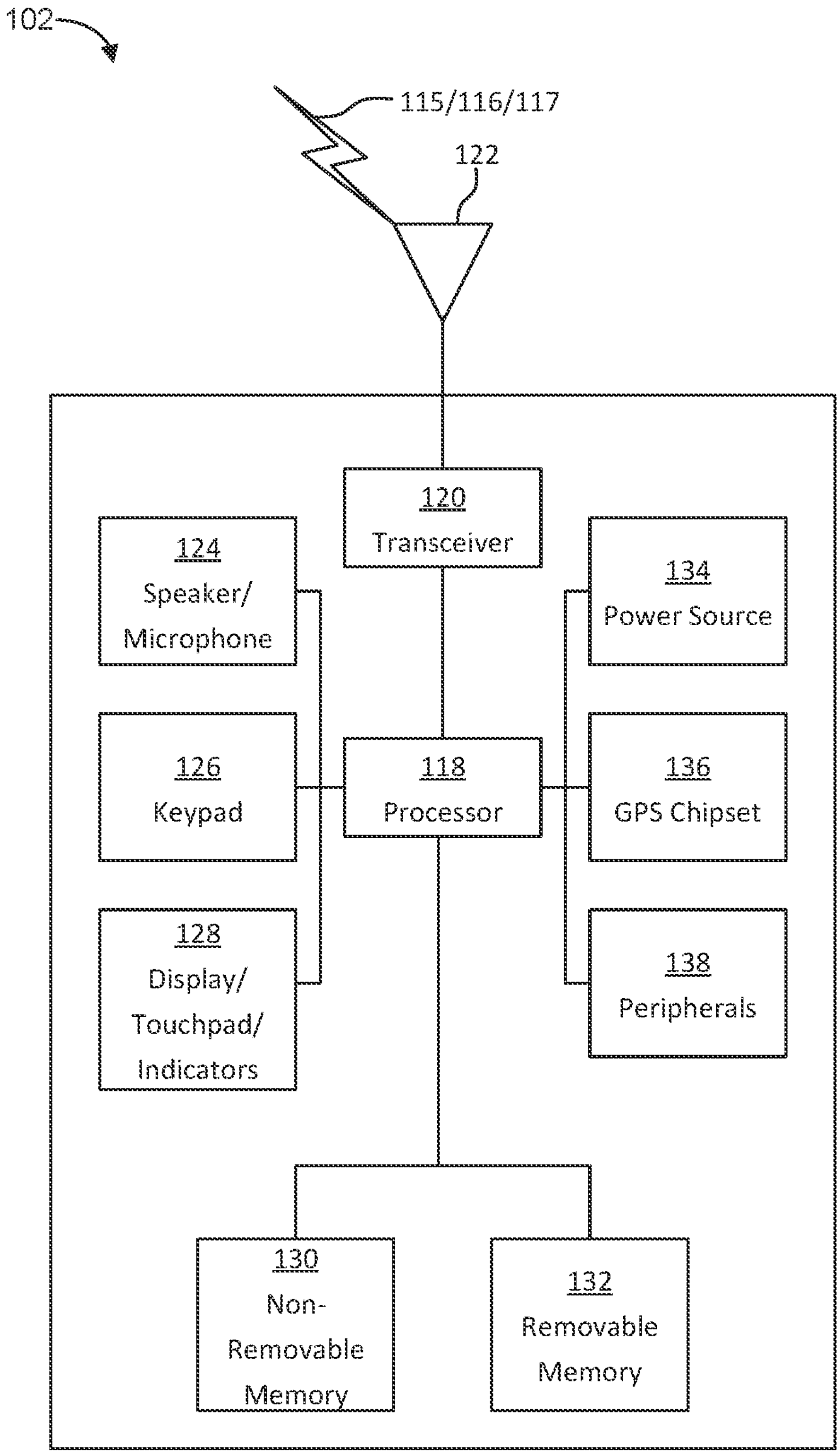
FIG. 33B is a block diagram of an example apparatus or device configured for wireless communications.

FIG. 33B is a block diagram of an example apparatus or device configured for wireless communications in accordance with the embodiments illustrated herein, such as for example, a WTRU 102. As shown in FIG. 33B, the example WTRU 102 may include a processor 118, a transceiver 120, a transmit/receive element 122, a speaker/microphone 124, a keypad 126, a display/touchpad/indicators 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment. Also, embodiments contemplate that the base stations 114*a* and 114*b*, and/or the nodes that base stations 114*a* and 114*b* may represent, such as but not limited to transceiver station (BTS), a Node-B, a site controller, an access point (AP), a home node-B, an evolved home node-B (eNodeB), a home evolved node-B (HeNB), a home evolved node-B gateway, and proxy nodes, among others, may include some or all of the elements depicted in FIG. 33B and described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 33B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114*a*) over the air interface 115/116/117. For example, in an embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet an embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 33B as a single element, the WTRU 102 may include any number of transmit/receive elements 122. More specifically, the WTRU 102 may employ MIMO technology. Thus, in an embodiment, the WTRU 102 may include two or more transmit/receive elements 122 (e.g., multiple antennas) for transmitting and receiving wireless signals over the air interface 115/116/117.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad/indicators 128 (e.g., a liquid crystal display (LCD) display unit or organic light-emitting diode (OLED) display unit). The processor 118 may also output user data to the speaker/microphone 124, the keypad 126, and/or the display/touchpad/indicators 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In an embodiment, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries, solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 115/116/117 from a base station (e.g., base stations 114*a*, 114*b*) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include various sensors such as an accelerometer, biometrics (e.g., finger print) sensors, an e-compass, a satellite transceiver, a digital camera (for photographs or video), a universal serial bus (USB) port or other interconnect interfaces, a vibration device, a television transceiver, a hands free headset, a Bluetooth® module, a frequency modulated (FM) radio unit, a digital music player, a media player, a video game player module, an Internet browser, and the like.

The WTRU 102 may be embodied in other apparatuses or devices, such as a sensor, consumer electronics, a wearable device such as a smart watch or smart clothing, a medical or eHealth device, a robot, industrial equipment, a drone, a vehicle such as a car, truck, train, or airplane. The WTRU 102 may connect to other components, modules, or systems of such apparatuses or devices via one or more interconnect interfaces, such as an interconnect interface that may comprise one of the peripherals 138.

Figure 33C:
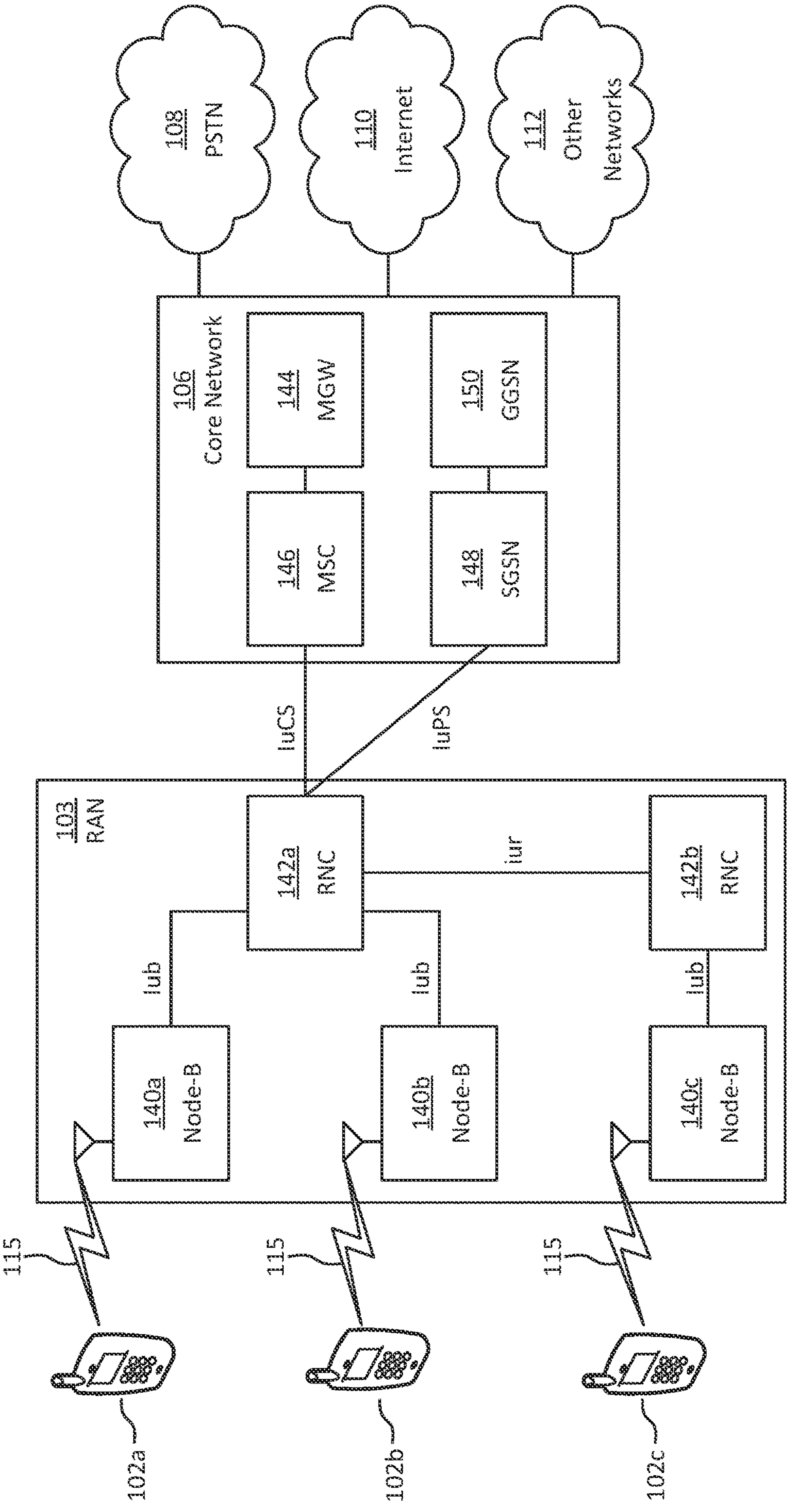
FIG. 33C is a system diagram of an example radio access network (RAN) and core network.

FIG. 33C is a system diagram of the RAN 103 and the core network 106 according to an embodiment. As noted above, the RAN 103 may employ a UTRA radio technology to communicate with the WTRUs 102*a*, 102*b*, and 102*c* over the air interface 115. The RAN 103 may also be in communication with the core network 106. As shown in FIG. 33C, the RAN 103 may include Node-Bs 140*a*, 140*b*, 140*c*, which may each include one or more transceivers for communicating with the WTRUs 102*a*, 102*b*, 102*c* over the air interface 115. The Node-Bs 140*a*, 140*b*, 140*c* may each be associated with a particular cell (not shown) within the RAN 103. The RAN 103 may also include RNCs 142*a*, 142*b*. It will be appreciated that the RAN 103 may include any number of Node-Bs and RNCs while remaining consistent with an embodiment.

As shown in FIG. 33C, the Node-Bs 140*a*, 140*b* may be in communication with the RNC 142*a*. Additionally, the Node-B 140*c* may be in communication with the RNC 142*b*. The Node-Bs 140*a*, 140*b*, 140*c* may communicate with the respective RNCs 142*a*, 142*b* via an Iub interface. The RNCs 142*a*, 142*b* may be in communication with one another via an Iur interface. Each of the RNCs 142*a*, 142*b* may be configured to control the respective Node-Bs 140*a*, 140*b*, 140*c* to which it is connected. In addition, each of the RNCs 142*a*, 142*b* may be configured to carry out or support other functionality, such as outer loop power control, load control, admission control, packet scheduling, handover control, macro-diversity, security functions, data encryption, and the like.

The core network 106 shown in FIG. 33C may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142*a* in the RAN 103 may be connected to the MSC 146 in the core network 106 via an IuCS interface. The MSC 146 may be connected to the MGW 144. The MSC 146 and the MGW 144 may provide the WTRUs 102*a*, 102*b*, 102*c* with access to circuit-switched networks, such as the PSTN 108, to facilitate communications between the WTRUs 102*a*, 102*b*, 102*c* and traditional land-line communications devices.

The RNC 142*a* in the RAN 103 may also be connected to the SGSN 148 in the core network 106 via an IuPS interface. The SGSN 148 may be connected to the GGSN 150. The SGSN 148 and the GGSN 150 may provide the WTRUs 102*a*, 102*b*, 102*c* with access to packet-switched networks, such as the Internet 110, to facilitate communications between and the WTRUs 102*a*, 102*b*, 102*c* and IP-enabled devices.

As noted above, the core network 106 may also be connected to the networks 112, which may include other wired or wireless networks that are owned and/or operated by other service providers.

Figure 33D:
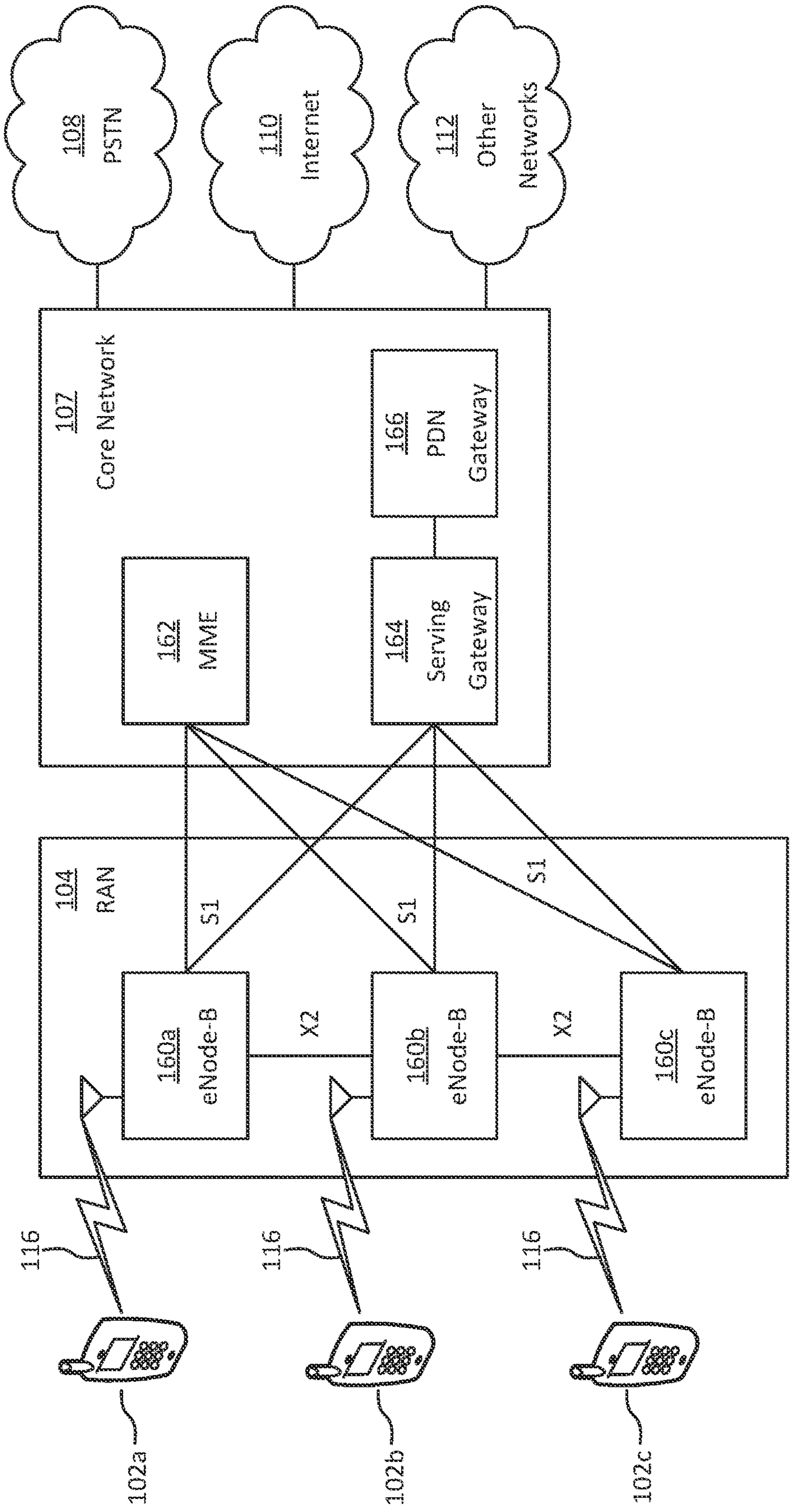
FIG. 33D is a system diagram of another example RAN and core network.

FIG. 33D is a system diagram of the RAN 104 and the core network 107 according to an embodiment. As noted above, the RAN 104 may employ an E-UTRA radio technology to communicate with the WTRUs 102*a*, 102*b*, and 102*c* over the air interface 116. The RAN 104 may also be in communication with the core network 107.

The RAN 104 may include eNode-Bs 160*a*, 160*b*, 160*c*, though it will be appreciated that the RAN 104 may include any number of eNode-Bs while remaining consistent with an embodiment. The eNode-Bs 160*a*, 160*b*, 160*c* may each include one or more transceivers for communicating with the WTRUs 102*a*, 102*b*, 102*c* over the air interface 116. In an embodiment, the eNode-Bs 160*a*, 160*b*, 160*c* may implement MIMO technology. Thus, the eNode-B 160*a*, for example, may use multiple antennas to transmit wireless signals to, and receive wireless signals from, the WTRU 102*a*.

Each of the eNode-Bs 160*a*, 160*b*, and 160*c* may be associated with a particular cell (not shown) and may be configured to handle radio resource management decisions, handover decisions, scheduling of users in the uplink and/or downlink, and the like. As shown in FIG. 33D, the eNode-Bs 160*a*, 160*b*, 160*c* may communicate with one another over an X2 interface.

The core network 107 shown in FIG. 33D may include a mobility management gateway (MME) 162, a serving gateway 164, and a packet data network (PDN) gateway 166. While each of the foregoing elements are depicted as part of the core network 107, it will be appreciated that any one of these elements may be owned and/or operated by an entity other than the core network operator.

The MME 162 may be connected to each of the eNode-Bs 160*a*, 160*b*, and 160*c* in the RAN 104 via an S1 interface and may serve as a control node. For example, the MME 162 may be responsible for authenticating users of the WTRUs 102*a*, 102*b*, 102*c*, bearer activation/deactivation, selecting a particular serving gateway during an initial attach of the WTRUs 102*a*, 102*b*, 102*c*, and the like. The MME 162 may also provide a control plane function for switching between the RAN 104 and other RANs (not shown) that employ other radio technologies, such as GSM or WCDMA.

The serving gateway 164 may be connected to each of the eNode-Bs 160*a*, 160*b*, and 160*c* in the RAN 104 via the S1 interface. The serving gateway 164 may generally route and forward user data packets to/from the WTRUs 102*a*, 102*b*, 102*c*. The serving gateway 164 may also perform other functions, such as anchoring user planes during inter-eNode B handovers, triggering paging when downlink data is available for the WTRUs 102*a*, 102*b*, 102*c*, managing and storing contexts of the WTRUs 102*a*, 102*b*, 102*c*, and the like.

The serving gateway 164 may also be connected to the PDN gateway 166, which may provide the WTRUs 102*a*, 102*b*, 102*c* with access to packet-switched networks, such as the Internet 110, to facilitate communications between the WTRUs 102*a*, 102*b*, 102*c* and IP-enabled devices.

The core network 107 may facilitate communications with other networks. For example, the core network 107 may provide the WTRUs 102*a*, 102*b*, 102*c* with access to circuit-switched networks, such as the PSTN 108, to facilitate communications between the WTRUs 102*a*, 102*b*, 102*c* and traditional land-line communications devices. For example, the core network 107 may include, or may communicate with, an IP gateway (e.g., an IP multimedia subsystem (IMS) server) that serves as an interface between the core network 107 and the PSTN 108. In addition, the core network 107 may provide the WTRUs 102*a*, 102*b*, 102*c* with access to the networks 112, which may include other wired or wireless networks that are owned and/or operated by other service providers.

Figure 33E:
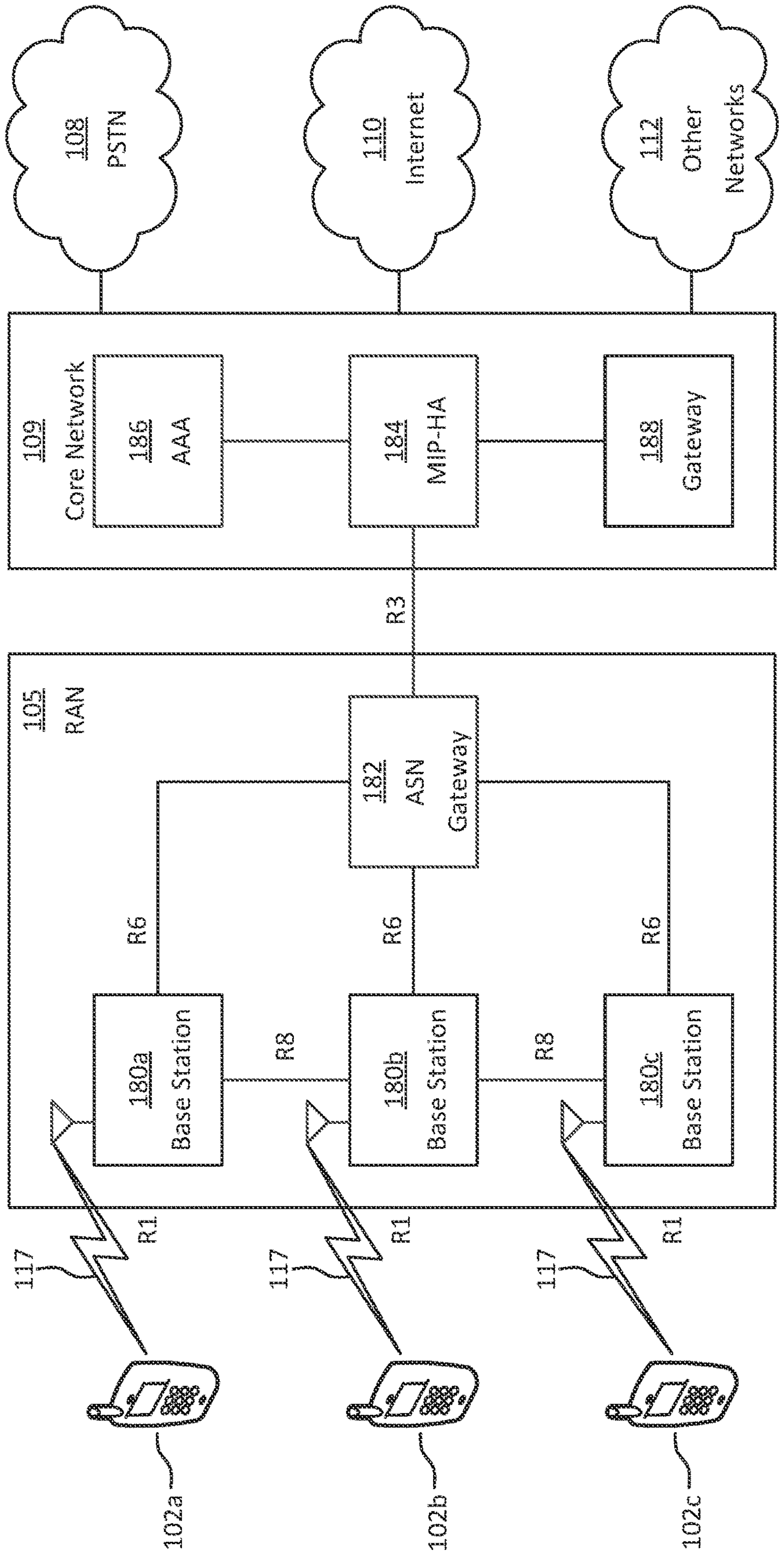
FIG. 33E is a system diagram of another example RAN and core network.

FIG. 33E is a system diagram of the RAN 105 and the core network 109 according to an embodiment. The RAN 105 may be an access service network (ASN) that employs IEEE 802.16 radio technology to communicate with the WTRUs 102*a*, 102*b*, and 102*c* over the air interface 117. As will be further discussed below, the communication links between the different functional entities of the WTRUs 102*a*, 102*b*, 102*c*, the RAN 105, and the core network 109 may be defined as reference points.

As shown in FIG. 33E, the RAN 105 may include base stations 180*a*, 180*b*, 180*c*, and an ASN gateway 182, though it will be appreciated that the RAN 105 may include any number of base stations and ASN gateways while remaining consistent with an embodiment. The base stations 180*a*, 180*b*, 180*c* may each be associated with a particular cell in the RAN 105 and may include one or more transceivers for communicating with the WTRUs 102*a*, 102*b*, 102*c* over the air interface 117. In an embodiment, the base stations 180*a*, 180*b*, 180*c* may implement MIMO technology. Thus, the base station 180*a*, for example, may use multiple antennas to transmit wireless signals to, and receive wireless signals from, the WTRU 102*a*. The base stations 180*a*, 180*b*, 180*c* may also provide mobility management functions, such as handoff triggering, tunnel establishment, radio resource management, traffic classification, quality of service (QoS) policy enforcement, and the like. The ASN gateway 182 may serve as a traffic aggregation point and may be responsible for paging, caching of subscriber profiles, routing to the core network 109, and the like.

The air interface 117 between the WTRUs 102*a*, 102*b*, 102*c* and the RAN 105 may be defined as an R1 reference point that implements the IEEE 802.16 specification. In addition, each of the WTRUs 102*a*, 102*b*, and 102*c* may establish a logical interface (not shown) with the core network 109. The logical interface between the WTRUs 102*a*, 102*b*, 102*c* and the core network 109 may be defined as an R2 reference point, which may be used for authentication, authorization, IP host configuration management, and/or mobility management.

The communication link between each of the base stations 180*a*, 180*b*, and 180*c* may be defined as an R8 reference point that includes protocols for facilitating WTRU handovers and the transfer of data between base stations. The communication link between the base stations 180*a*, 180*b*, 180*c* and the ASN gateway 182 may be defined as an R6 reference point. The R6 reference point may include protocols for facilitating mobility management based on mobility events associated with each of the WTRUs 102*a*, 102*b*, 102*c*.

As shown in FIG. 33E, the RAN 105 may be connected to the core network 109. The communication link between the RAN 105 and the core network 109 may defined as an R3 reference point that includes protocols for facilitating data transfer and mobility management capabilities, for example. The core network 109 may include a mobile IP home agent (MIP-HA) 184, an authentication, authorization, accounting (AAA) server 186, and a gateway 188. While each of the foregoing elements are depicted as part of the core network 109, it will be appreciated that any one of these elements may be owned and/or operated by an entity other than the core network operator.

The MIP-HA may be responsible for IP address management, and may enable the WTRUs 102*a*, 102*b*, and 102*c* to roam between different ASNs and/or different core networks. The MIP-HA 184 may provide the WTRUs 102*a*, 102*b*, 102*c* with access to packet-switched networks, such as the Internet 110, to facilitate communications between the WTRUs 102*a*, 102*b*, 102*c* and IP-enabled devices. The AAA server 186 may be responsible for user authentication and for supporting user services. The gateway 188 may facilitate interworking with other networks. For example, the gateway 188 may provide the WTRUs 102*a*, 102*b*, 102*c* with access to circuit-switched networks, such as the PSTN 108, to facilitate communications between the WTRUs 102*a*, 102*b*, 102*c* and traditional land-line communications devices. In addition, the gateway 188 may provide the WTRUs 102*a*, 102*b*, 102*c* with access to the networks 112, which may include other wired or wireless networks that are owned and/or operated by other service providers.

Although not shown in FIG. 33E, it will be appreciated that the RAN 105 may be connected to other ASNs and the core network 109 may be connected to other core networks. The communication link between the RAN 105 the other ASNs may be defined as an R4 reference point, which may include protocols for coordinating the mobility of the WTRUs 102*a*, 102*b*, 102*c* between the RAN 105 and the other ASNs. The communication link between the core network 109 and the other core networks may be defined as an R5 reference, which may include protocols for facilitating interworking between home core networks and visited core networks.

The core network entities described herein and illustrated in FIGS. 33A, 33C, 33D, and 33E are identified by the names given to those entities in certain existing 3GPP specifications, but it is understood that in the future those entities and functionalities may be identified by other names and certain entities or functions may be combined in future specifications published by 3GPP, including future 3GPP NR specifications. Thus, the particular network entities and functionalities described and illustrated in FIGS. TC31A-E are provided by way of example only, and it is understood that the subject matter disclosed and claimed herein may be embodied or implemented in any similar communication system, whether presently defined or defined in the future.

Figure 33F:
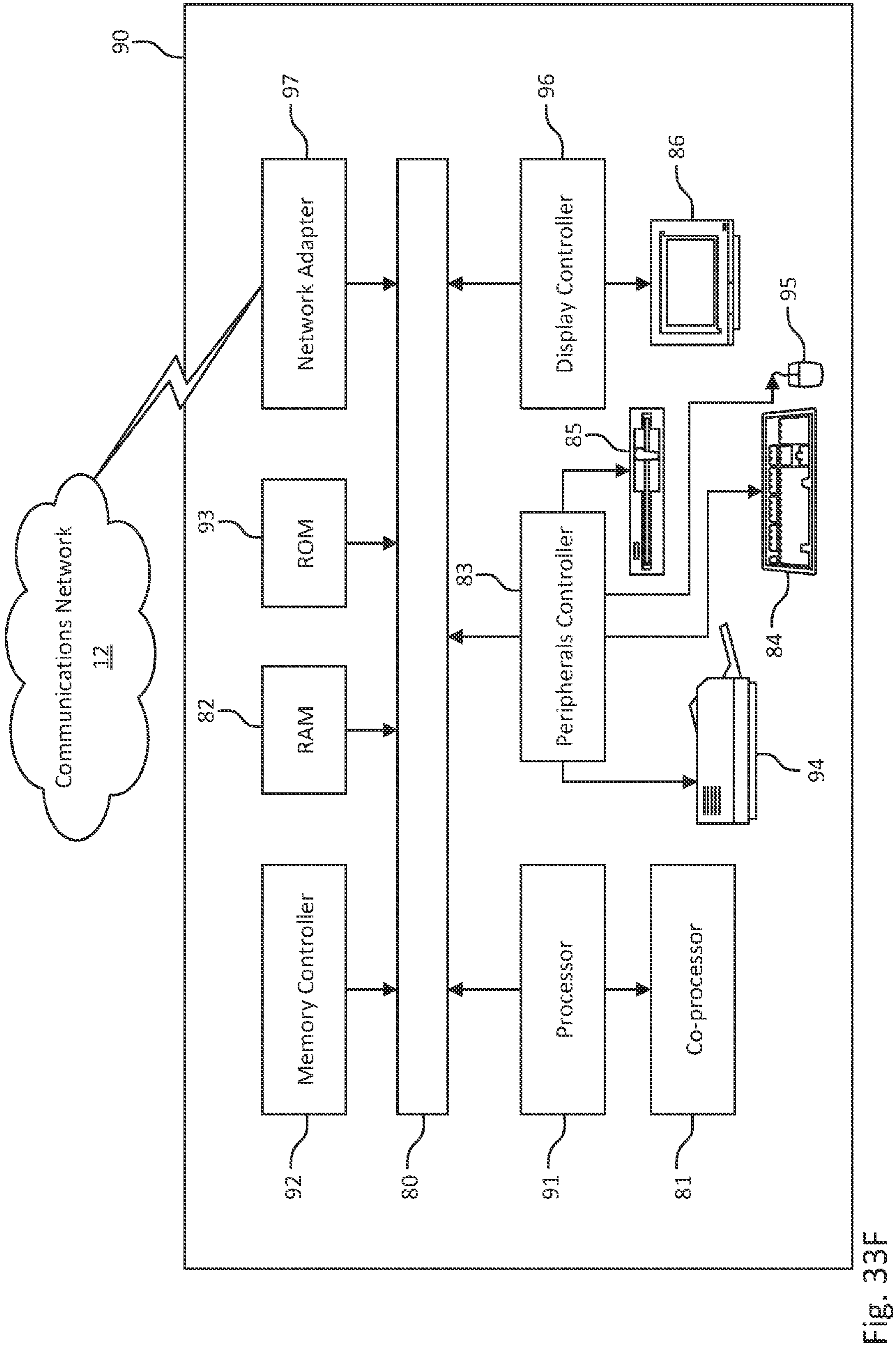
FIG. 33F is a block diagram of an example computing system.

FIG. 33F is a block diagram of an example computing system 90 in which one or more apparatuses of the communications networks illustrated in FIGS. 33A, 33C, 33D and 33E may be embodied, such as certain nodes or functional entities in the RAN 103/104/105, Core Network 106/107/109, PSTN 108, Internet 110, or Other Networks 112. Computing system 90 may comprise a computer or server and may be controlled primarily by computer readable instructions, which may be in the form of software, wherever, or by whatever means such software is stored or accessed. Such computer readable instructions may be executed within a processor 91, to cause computing system 90 to do work. The processor 91 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 91 may perform signal coding, data processing, power control, input/output processing, and/or any other functionality that enables the computing system 90 to operate in a communications network. Coprocessor 81 is an optional processor, distinct from main processor 91, that may perform additional functions or assist processor 91. Processor 91 and/or coprocessor 81 may receive, generate, and process data related to the methods and apparatuses disclosed herein.

In operation, processor 91 fetches, decodes, and executes instructions, and transfers information to and from other resources via the computing system's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memories coupled to system bus 80 include random access memory (RAM) 82 and read only memory (ROM) 93. Such memories include circuitry that allows information to be stored and retrieved. ROMs 93 generally contain stored data that cannot easily be modified. Data stored in RAM 82 may be read or changed by processor 91 or other hardware devices. Access to RAM 82 and/or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode may access only memory mapped by its own process virtual address space; it cannot access memory within another process's virtual address space unless memory sharing between the processes has been set up.

In addition, computing system 90 may contain peripherals controller 83 responsible for communicating instructions from processor 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. The visual output may be provided in the form of a graphical user interface (GUI). Display 86 may be implemented with a CRT-based video display, an LCD-based flat-panel display, gas plasma-based flat-panel display, or a touch-panel. Display controller 96 includes electronic components required to generate a video signal that is sent to display 86.

Further, computing system 90 may contain communication circuitry, such as for example a network adapter 97, that may be used to connect computing system 90 to an external communications network, such as the RAN 103/104/105, Core Network 106/107/109, PSTN 108, Internet 110, or Other Networks 112 of FIGS. 33A-E, to enable the computing system 90 to communicate with other nodes or functional entities of those networks. The communication circuitry, alone or in combination with the processor 91, may be used to perform the transmitting and receiving steps of certain apparatuses, nodes, or functional entities described herein.

Figure 33G:
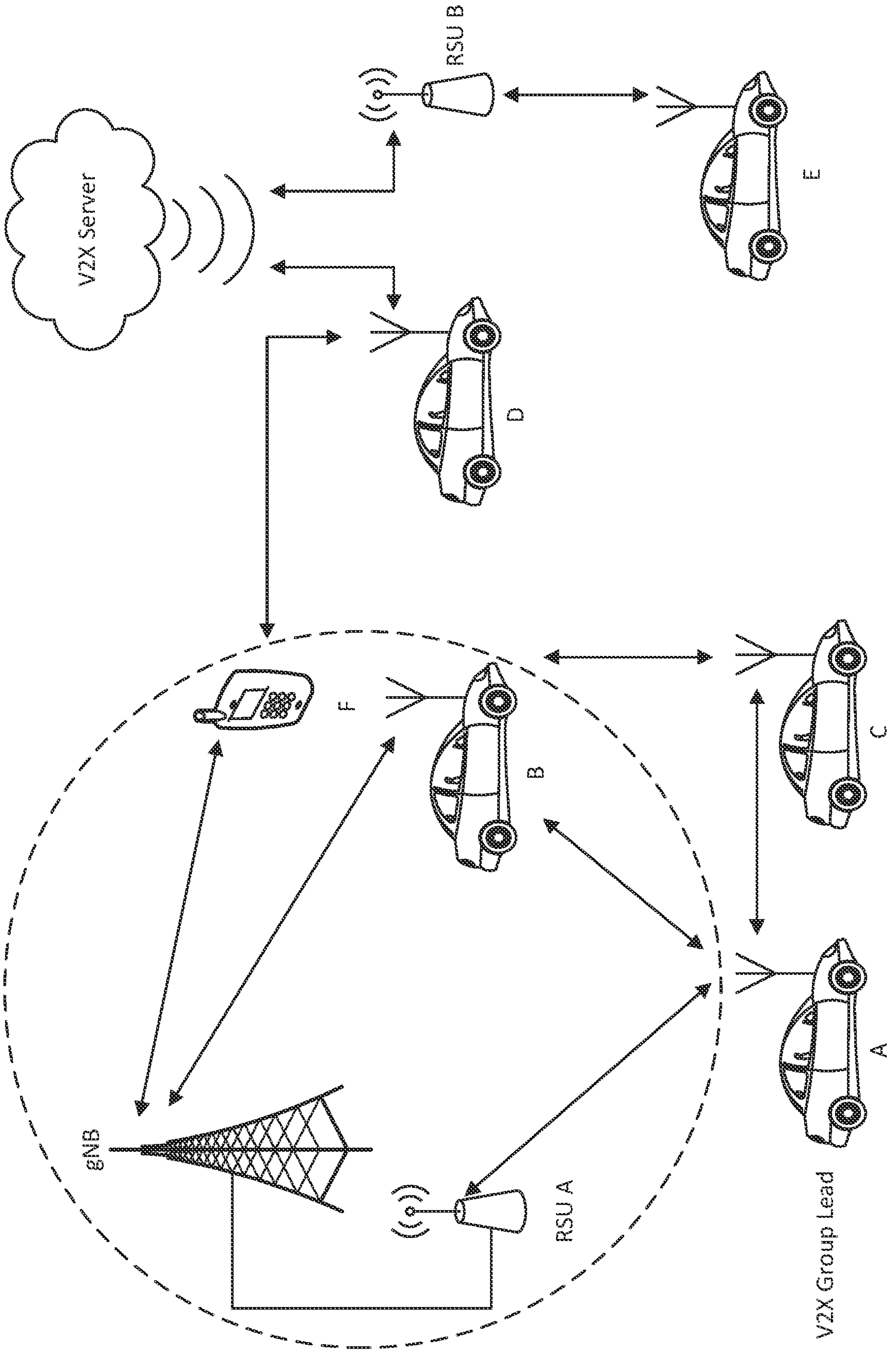
FIG. 33G is a block diagram of another example communications system.

FIG. 33G illustrates one embodiment of an example communications system 111 in which the methods and apparatuses described and claimed herein may be embodied. As shown, the example communications system 111 may include wireless transmit/receive units (WTRUs) A, B, C, D, E, F, a base station, a V2X server, and a RSUs A and B, though it will be appreciated that the disclosed embodiments contemplate any number of WTRUs, base stations, networks, and/or network elements. One or several or all WTRUs A, B, C, D, E can be out of range of the network (for example, in the figure out of the cell coverage boundary shown as the dash line). WTRUs A, B, C form a V2X group, among which WTRU A is the group lead and WTRUs B and C are group members. WTRUs A, B, C, D, E, F may communicate over Uu interface or Sidelink (PC5) interface.

It is understood that any or all of the apparatuses, systems, methods and processes described herein may be embodied in the form of computer executable instructions (e.g., program code) stored on a computer-readable storage medium which instructions, when executed by a processor, such as processors 118 or 91, cause the processor to perform and/or implement the systems, methods and processes described herein. Specifically, any of the steps, operations or functions described herein may be implemented in the form of such computer executable instructions, executing on the processor of an apparatus or computing system configured for wireless and/or wired network communications. Computer readable storage media include volatile and nonvolatile, removable and non-removable media implemented in any non-transitory (e.g., tangible or physical) method or technology for storage of information, but such computer readable storage media do not include signals. Computer readable storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible or physical medium which may be used to store the desired information and which may be accessed by a computing system.

APPENDIX

TABLE 1

Paging DCI - Release 15

| Field Name | # Bits | Comment |
| --- | --- | --- |
| Short Messages Indicator | 2 | As defined in Table 2. |
| Short Messages | 8 | If only the scheduling information for Paging is carried, this bit field is reserved. |
| Frequency domain resource assignment | $\lceil \log_2(N_{RB}^{DL,BWP}(N_{RB}^{DL,BWP}+1)/2) \rceil$ | If only the short message is carried, this bit field is reserved. |
| Time domain resource assignment | 4 | As defined in section 5.1.2.1 of 3GPP TS 38.214 Release 15, NR; Physical layer procedures for data (Release 15), V15.7.0. If only the short message is carried, this bit field is reserved. |
| VRB-to-PRB mapping | 1 | As defined in Table 7.3.1.1.2-33 of 3GPP TS 38.212 Release 15, NR; Multiplexing and channel coding (Release 15), V15.6.0. If only the short message is carried, this bit field is reserved. |
| Modulation and coding scheme | 5 | As defined in section 5.1.3 of TS 38.214 Release 15. If only the short message is carried, this bit field is reserved. |
| TB scaling | 2 | As defined in section 5.1.3.2 of TS 38.214 Release 15. If only the short message is carried, this bit field is reserved. |
| Reserved | 6 | |

TABLE 2

Short Message Indicator-Release 15

| Bit Field | Description |
| --- | --- |
| 00 | Reserved |
| 01 | Only scheduling information for Paging is present in the DCI |
| 10 | Only short message is present in the DCI |
| 11 | Both scheduling information for Paging and short message are present in the DCI |

TABLE 3

Paging DCI (Release 16)

| Field Name | # Bits | Comment |
| --- | --- | --- |
| Short Messages Indicator | 2 | As defined in Table 4. |
| Short Messages | 8 | If only the scheduling information for Paging is carried, this bit field is reserved. |
| Frequency domain resource assignment | $\lceil \log_2(N_{RB}^{DL,BWP}(N_{RB}^{DL,BWP}+1)/2) \rceil$ | If only the short message is carried, this bit field is reserved. |
| Time domain resource assignment | 4 | As defined in section 5.1.2.1 of TS 38.214 Release 16. If only the short message is carried, this bit field is reserved. |
| VRB-to-PRB mapping | | As defined in Table 7.3.1.1.2-33 of TS 38.212. If only the short message is carried, this bit field is reserved. |
| Modulation and coding scheme | 5 | As defined in section 5.1.3 of TS 38.214. If only the short message is carried, this bit field is reserved. |
| TB scaling | 2 | As defined in section 5.1.3.2 of TS 38.214 . If only the short message is carried, this bit field is reserved. |
| Reserved | 6 or 8 | 8 bits for operation in a cell with shared spectrum channel access; otherwise 6 bits |

TABLE 4

Short Message Indicator (Release 16)

| Bit Field | Description |
| --- | --- |
| 00 | Reserved |
| 01 | Only scheduling information for Paging is present in the DCI |
| 10 | Only short message is present in the DCI |

TABLE 4-continued

Short Message Indicator (Release 16)

| Bit Field | Description |
| --- | --- |
| 11 | Both scheduling information for Paging and short message are present in the DCI |

TABLE 5

| Short Messages (Release 16) | |
|---|---|
| Bit | Short Message |
| 1 | systemInfoModification<br>If set to 1: indication of a BCCH modification other than SIB6, SIB7 and SIB8. |
| 2 | etwsAndCmasIndication<br>If set to 1: indication of an ETWS primary notification and/or an ETWS secondary notification and/or a CMAS notification. |
| 3 | stopPagingMonitoring<br>If set to 1: stop monitoring PDCCH occasions(s) for paging in this PO. |
| 4-8 | Not used in this release of the specification, and shall be ignored by UE, if received. |

TABLE 6

Prioritization Based on AS Procedure

| AS Procedure | Priority |
|---|---|
| Paging | 1 |
| SI Acquisition | 2 |
| Cell (Re-) Selection | 3 |
| PLMN Selection | 4 |

Note:
A priority of 1 is assumed to be the highest priority.

TABLE 7

Prioritization Based on UE Action

| AS Procedure | Priority |
|---|---|
| Reception of Paging DCI | 1 |
| SI Acquisition | 2 |
| Measurements | 3 |

Note:
A priority of 1 is assumed to be the highest priority.

TABLE 8

Prioritization Based on RAT

| RAT | Priority |
|---|---|
| NR | 1 |
| LTE | 2 |
| WCDMA | 3 |
| GSM | 4 |

Note:
A priority of 1 is assumed to be the highest priority.

TABLE 9

Acronyms

| Abbreviation | Description |
|---|---|
| AS | Access Stratum |
| BA | Bandwidth Adaption |
| BWP | Bandwidth Part |
| C-DRX | Connected Mode DRX |
| CMAS | Commercial Mobile Alert Service |
| CN | Core Network |
| CORESET | Control Resource Set |
| CRC | Cyclic Redundancy Check |
| DC | Dual Connectivity |
| DCI | Downlink Control Information |
| DL | Downlink |

TABLE 9-continued

Acronyms

| Abbreviation | Description |
|---|---|
| DL-SCH | DL Shared Channel |
| DRX | Discontinuous Reception |
| DSDA | Dual SIM Dual Active |
| DSDS | Dual SIM Dual Standby |
| EN-DC | EUTRA-NR Dual Connectivity |
| ETWS | Earthquake and Tsunami Warning System |
| EUTRA | Evolved Universal Terrestrial Radio Access |
| gNB | NR NodeB |
| GPS | Global Positioning System |
| GSM | Global System for Mobile communications |
| H-SFN | Hyper-SFN |
| LTE | Long Term Evolution |
| MCG | Master Cell Group |
| MIB | Master Information Block |
| MICO | Mobile Initiated Connection Only |
| MNO | Mobile Network Operator |
| MT | Mobile Terminated |
| MUSIM | Multi-UMTS Subscriber Identity Module |
| NAS | Non-Access Stratum |
| NR | New Radio |
| NR SA | New Radio Stand Alone |
| NW | Network |
| OFDM | Orthogonal Frequency Division Multiplexing |
| PDCCH | Physical Downlink Control Channel |
| PF | Paging Frame |
| PH | Paging Hyperframe |
| PO | Paging Occasion |
| PRACH | Physical Random Access Channel |
| PRB | Physical Resource Block |
| P-RNTI | Paging Radio Network Temporary Identifier |
| PWS | Public Warning System |
| RACH | Random Access Channel |
| RAI | Release Assistance Information |
| RAN | Radio Access Network |
| RAT | Radio Access Technology |
| RMSI | Remaining Minimum System Information |
| RNAU | RAN-based Notification Area Update |
| RRC | Radio Resource Control |
| SCG | Secondary Cell Group |
| SCS | Sub-Carrier Spacing |
| SFN | System Frame Number |
| SFTD | SFN and Frame Timing Difference |
| SI | System Information |
| SIB | System Information Block |
| SIM | Subscriber Identity Module |
| SMTC | SS/PBCH Block Measurement Timing Configuration |
| SSB | Synchronization Signal Block |
| S-TMSI | Shortened-Temporary Mobile Subscriber Identity |
| TAU | Tracking Area Update |
| TB | Transport Block |
| TDD | Time Division Duplex |
| TDM | Time Division Multiplexing |
| UE | User Equipment |
| UL | Uplink |
| UMTS | Universal Mobile Telecommunications System |
| USIM | Universal Subscriber Identity Module |
| UTC | Coordinated Universal Time |
| VRB | Virtual Resource Block |
| WCDMA | Wideband Code Division Multiple Access |

CODE EXAMPLE 1A
PCCH-Config

```
PCCH-Config ::=                SEQUENCE {
  defaultPagingCycle                          PagingCycle,
  nAndPagingFrameOffset                       CHOICE {
    oneT                                        NULL,
    halfT                                       INTEGER (0..1),
    quarterT                                    INTEGER (0..3),
    oneEighthT                                  INTEGER (0..7),
    oneSixteenthT                               INTEGER (0..15)
  },
  ns                                          ENUMERATED {four, two, one},
  firstPDCCH-MonitoringOccasionOfPO           CHOICE {
    sCS15KHZoneT
                       SEQUENCE (SIZE (1..maxPO-perPF)) OF INTEGER (0..139),
    sCS30KHZoneT-SCS15KHZhalfT
                       SEQUENCE (SIZE (1..maxPO-perPF)) OF INTEGER (0..279),
    sCS60KHZoneT-SCS30KHZhalfT-SCS15KHZquarterT
                       SEQUENCE (SIZE (1..maxPO-perPF)) OF INTEGER (0..559),
    sCS120KHZoneT-SCS60KHZhalfT-SCS30KHZquarterT-SCS15KHZoneEighthT
                       SEQUENCE (SIZE (1..maxPO-perPF)) OF INTEGER (0..1119),
    sCS120KHZhalfT-SCS60KHZquarterT-SCS30KHZoneEighthT-SCS15KHZoneSixteenthT
                       SEQUENCE (SIZE (1..maxPO-perPF)) OF INTEGER (0..2239),
    sCS120KHZquarterT-SCS60KHZoneEighthT-SCS30KHZoneSixteenthT
                       SEQUENCE (SIZE (1..maxPO-perPF)) OF INTEGER (0..4479),
    sCS120KHZoneEighthT-SCS60KHZoneSixteenthT
                       SEQUENCE (SIZE (1..maxPO-perPF)) OF INTEGER (0..8959),
    sCS120KHZoneSixteenthT
                       SEQUENCE (SIZE (1..maxPO-perPF)) OF INTEGER (0..17919)
  } OPTIONAL,                  -- Need R
  ...
}
```

CODE EXAMPLE 1B
PCCH-Config field descriptions defaultPagingCycle-Default paging cycle, used to derive 'T' in 3GPP TS 38.304 Release 15, User Equipment (UE) procedures in Idle mode and RRC Inactive state (Release 15), V15.4.0. Value rf32 corresponds to 32 radio frames, value rf64 corresponds to 64 radio frames and so on.
firstPDCCH-MonitoringOccasionOfPO-Points out the first PDCCH monitoring occasion for paging of each PO of the PF, see TS 38.304 Release 15.
ns-Number of paging occasions per paging frame.
nAndPagingFrameOffset-Used to derive the number of total paging frames in T (corresponding to parameter N in TS 38.304 Release 15) and paging frame offset (corresponding to parameter PF_offset in TS 38.304 Release 15). A value of oneSixteenthT corresponds to T/16, a value of oneEighthT corresponds to T/8, and so on.
If pagingSearchSpace is set to zero and if SS/PBCH block and CORESET multiplexing pattern is 2 or 3 (as specified in 3GPP TS 38.213, Physical layer procedures for control (Release 15), V15.7.0):

-continued

CODE EXAMPLE 1B
PCCH-Config field descriptions for ssb-periodicityServingCell of 5 or 10 ms, N can be set to one of {oneT, halfT, quarterT, oneEighthT, oneSixteenthT}
for ssb-periodicityServingCell of 20 ms, N can be set to one of {halfT, quarterT, oneEighthT, oneSixteenthT}
for ssb-periodicityServingCell of 40 ms, N can be set to one of {quarterT, oneEighthT, oneSixteenthT}
for ssb-periodicityServingCell of 80 ms, N can be set to one of {oneEighthT, oneSixteenthT}
for ssb-periodicityServingCell of 160 ms, N can be set to oneSixteenthT
If pagingSearchSpace is set to zero and if SS/PBCH block and CORESET multiplexing pattern is 1 (as specified in TS 38.213), N can be set to one of {halfT, quarterT, oneEighthT, oneSixteenthT}
If pagingSearchSpace is not set to zero, N can be configured to one of {oneT, halfT, quarterT, oneEighthT, oneSixteenthT}

CODE EXAMPLE 2A
PCCH-Config Field (Release 16)

```
PCCH-Config ::=                SEQUENCE {
  defaultPagingCycle                          PagingCycle,
  nAndPagingFrameOffset                       CHOICE {
    oneT                                        NULL,
    halfT                                       INTEGER (0..1),
    quarterT                                    INTEGER (0..3),
    oneEighthT                                  INTEGER (0..7),
    oneSixteenthT                               INTEGER (0..15)
  },
  ns                                          ENUMERATED {four, two, one},
  firstPDCCH-MonitoringOccasionOfPO           CHOICE {
    sCS15KHZoneT
      SEQUENCE (SIZE (1..maxPO-perPF)) OF INTEGER (0..139),
    sCS30KHZoneT-SCS15KHZhalfT
      SEQUENCE (SIZE (1..maxPO-perPF)) OF INTEGER (0..279),
    sCS60KHZoneT-SCS30KHZhalfT-SCS15KHZquarterT
      SEQUENCE (SIZE (1..maxPO-perPF)) OF INTEGER (0..559),
    sCS120KHZoneT-SCS60KHZhalfT-SCS30KHZquarterT-SCS15KHZoneEighthT
```

-continued

CODE EXAMPLE 2A
PCCH-Config Field (Release 16)

```
      SEQUENCE (SIZE (1..maxPO-perPF)) OF INTEGER (0..1119),
    sCS120KHZhalfT-SCS60KHZquarterT-SCS30KHZoneEighthT-SCS15KHZoneSixteenthT
      SEQUENCE (SIZE (1..maxPO-perPF)) OF INTEGER (0..2239),
    sCS120KHZquarterT-SCS60KHZoneEighthT-SCS30KHZoneSixteenthT
      SEQUENCE (SIZE (1..maxPO-perPF)) OF INTEGER (0..4479),
    sCS120KHZoneEighthT-SCS60KHZoneSixteenthT
      SEQUENCE (SIZE (1..maxPO-perPF)) OF INTEGER (0..8959),
    sCS120KHZoneSixteenthT
      SEQUENCE (SIZE (1..maxPO-perPF)) OF INTEGER (0..17919)
  } OPTIONAL,                     -- Need R
  ...,
  [[
  nrofPDCCHMonitoringOccasionPerSSB-InPO-r16
      INTEGER (2..4)                              OPTIONAL -- Need R
  ]]
}
```

CODE EXAMPLE 2B
PCCH-Config field descriptions (Release 16)

defaultPagingCycle
Default paging cycle used to derive 'T' in TS 38.304. Value rf32 corresponds to 32 radio frames, value rf64 corresponds to 64 radio frames and so on.
firstPDCCH-MonitoringOccasionOfPO
Points out the first PDCCH monitoring occasion for paging of each PO of the PF, see TS 38.304.
nAndPagingFrameOffset
Used to derive the number of total paging frames in T (corresponding to parameter N in TS 38.304) and paging frame offset (corresponding to parameter PF_offset in TS 38.304). A value of oneSixteenthT corresponds to T/16, a value of oneEighthT corresponds to T/8, and so on.
If pagingSearchSpace is set to zero and if SS/PBCH block and CORESET multiplexing pattern is 2 or 3 (as specified in TS 38.213):
for ssb-periodicityServingCell of 5 or 10 ms, N can be set to one of {oneT, halfT, quarterT oneEighthT, oneSixteenthT}
for ssb-periodicityServingCell of 20 ms, N can be set to one of {halfT, quarterT, oneEighthT, oneSixteenthT}
for ssb-periodicityServingCell of 40 ms, N can be set to one of {quarterT, oneEighthT, oneSixteenthT}
for ssb-periodicityServingCell of 80 ms, N can be set to one of {oneEighthT, oneSixteenthT}
for ssb-periodicityServingCell of 160 ms, N can be set to oneSixteenthT
If pagingSearchSpace is set to zero and if SS/PBCH block and CORESET multiplexing pattern is 1 (as specified in TS 38.213), N can be set to one of {halfT, quarterT, oneEighthT, oneSixteenthT}
If pagingSearchSpace is not set to zero, N can be configured to one of {oneT, halfT, quarterT, oneEighthT, oneSixteenthT}
ns
Number of paging occasions per paging frame.
nrofPDCCH-MonitoringOccasionPerSSB-InPO
The number of PDCCH monitoring occasions corresponding to an SSB within a Paging Occasion, see TS 38.304, clause 7.1.

CODE EXAMPLE 3A
PagingModification Information Element

```
PagingModification ::= SEQUENCE {
  PagingModificationAccepted                      OPTIONAL,
  i_s_        INTEGER (0..3)                      OPTIONAL,
  offset      INTEGER(1..255)                     OPTIONAL,
  PagingCycle ENUMERATED (rf32, rf64, rf128, rf256}  OPTIONAL
}
```

CODE EXAMPLE 3B
PagingModification Field Descriptions

PagingModificationAccepted-Flag signaled by the network to indicate if the modified paging configuration requested by the UE was accepted. If a value of FALSE signaled, additional fields may be included to override the paging configuration requested by the UE.
Note: This field is only used for acknowledgements signaled from the network to the UE. It is not needed to request signaled from the UE to the network.
i_s-PO index to use for modified paging configuration.
offset-
Offset to use when determining the SFN for the PF for the modified paging configuration.
PagingCycle-Paging cycle to use for modified paging configuration.

CODE EXAMPLE 4
Negotiated SuspendConfig

```
SuspendConfig ::=               SEQUENCE {
  fullI-RNTI                    I-RNTI-Value,
  shortI-RNTI                   ShortI-RNTI-Value,
  ran-PagingCycle               PagingCycle,
  ran-NotificationAreaInfo   RAN-NotificationAreaInfo OPTIONAL, -- Need M
  t380                          PeriodicRNAU-TimerValue   OPTIONAL, -- Need R
  nextHopChainingCount          NextHopChainingCount,
```

-continued

CODE EXAMPLE 4
Negotiated SuspendConfig

```
UE_ID            INTEGER (0..1023)     OPTIONAL,
i_s              INTEGER (0..3)        OPTIONAL,
offset           INTEGER (0..255)      OPTIONAL,
...
}
```

CODE EXAMPLE 5
Negotiated ReleaseConfig

```
ReleaseConfig ::=    SEQUENCE {
  pagingCycle        PagingCycle,
  UE_ID              INTEGER (0..1023)     OPTIONAL,
  i_s                INTEGER (0..3)        OPTIONAL,
  offset             INTEGER (0..255)      OPTIONAL,
  ...
}
```

CODE EXAMPLE 7B
ReleasePreference Information field descriptions preferredRRC-State-r16
Indicates the UE's preferred RRC state on switching out of RRC_ CONNECTED state. The state connected is indicated if the UE prefers to remain in RRC_CONNECTED state.
pauseDuration
The time the UE expects to be away from the network. Value s5 corresponds to 5 seconds, value s10 corresponds to 10 seconds and so on.

CODE EXAMPLE 6A
Multi-USIM Assistance Information

```
multiUSIMAssistanceInformation ::=                 SEQUENCE {
  numUSIMs          INTEGER (1..4)                 OPTIONAL,
PagingPreference ::= SEQUENCE {
  pagingCycle          PagingCycle,
  UE_ID                INTEGER (0..1023)           OPTIONAL,
  i_s                  INTEGER (0..3)              OPTIONAL,
  offset               INTEGER (1..255)            OPTIONAL,
  desiredPagingCause SEQUENCE (SIZE 1..maxPagingCause) of PagingCause OPTIONAL,
  ...
}
PagingCause          ENUMERATED { mt-Signalling, mt-Data, mt-VoiceCall,
                        mt-VideoCall, mt-SMS }
```

CODE EXAMPLE 6B
Multi-USIM Assistance Information Field Descriptions numUSIMs
The number of USIMs configured for the UE. This may also correspond the number of registered USIMs in the UE.
UE_ID
The preferred UE_ID to use in the PF/PO calculations to avoid or reduce collisions.
pagingCycle
The preferred pagingCycle to use to avoid or reduce collisions.
i_s
Index of the preferred PO to monitor to avoid or reduce collisions.
offset
Offset to UE_ID to use in PF calculation to avoid or reduce collisions.

CODE EXAMPLE 7A
ReleasePreference Information

```
ReleasePreference ::=SEQUENCE {
  preferredRRC-State-r16                   ENUMERATED
{idle,inactive,connected}                OPTIONAL,
  pauseDuration       ENUMERATED {s5,s10,s30,s60,s300,infinity}   OPTIONAL
}
```

What is claimed is:

1. An apparatus, comprising:

a processor;

a memory; and communication circuitry, wherein the apparatus is configured to communicate with a first network and a second network via the communication circuitry; and computer-executable instructions stored in the memory which, when executed by the processor, cause the apparatus to:

form a first connection with the first network, the first connection being a Radio Resource Control (RRC) connection;

receive, from the first network, information indicative of a configuration comprising a time value for use by a timer upon whose expiry the first connection with the first network is to be released;

determine to switch from the first network to the second network, wherein the switch comprises forming a second connection with the second network, the second connection being an RRC connection;

send, to the first network, assistance information pertaining to releasing or suspending the first connection, wherein the assistance information comprises an indication that a preferred RRC state of the apparatus is idle or inactive; and in response to detecting expiry of the timer set to the time value and based on the determination to switch from the first network to the second network:

release the first connection with the first network; and form the second connection with the second network, wherein forming the second connection comprises establishing a new RRC connection or resuming an existing RRC connection with the second network.

2. The apparatus of claim 1, wherein the computer-executable instructions further cause the apparatus to:

receive a response to the assistance information, the response comprising an indication to release or suspend the first connection; and based on the response, release or suspend the first connection and form the second connection.

3. The apparatus of claim 1, wherein:

the assistance information comprises Release Assistance Information (RAI).

4. The apparatus of claim 3, wherein the assistance information further comprises the RAI and release preference information, the release preference information comprising an indication of whether a preferred Radio Resource Control state of the apparatus is idle or is inactive.

5. The apparatus of claim 4, wherein the assistance information further comprises paging preference information comprising a preferred apparatus identifier, an indication of one or more paging causes for which the apparatus is interested in receiving a paging message, an indication of one or more paging causes for which the apparatus is not interested in receiving a paging message, or an indication of a time during which the apparatus does not monitor paging.

6. The apparatus of claim 5, wherein the computer-executable instructions further cause the apparatus to monitor for paging from the first network, during a Paging Occasion (PO) and a Paging Frame (PF) based on a preferred User Equipment (UE) identifier.

7. The apparatus of claim 1, wherein:

the apparatus is a User Equipment (UE), and the assistance information is sent via an RRC UEAssistanceInformation message.

8. A method performed by an apparatus, the method comprising:

forming a first connection with a first network, the first connection being a Radio Resource Control (RRC) connection;

receiving, from the first network, information indicative of a configuration comprising a time value for use by a timer upon whose expiry the first connection with the first network is to be released;

determining to switch from the first network to a second network, wherein the switch comprises forming a second connection with the second network, the second connection being an RRC connection;

sending, to the first network, assistance information pertaining to releasing or suspending the first connection, wherein the assistance information comprises an indication that a preferred RRC state of the apparatus is idle or inactive; and in response to detecting expiry of the timer set to the time value and based on the determination to switch from the first network to the second network:

releasing the first connection with the first network; and forming the second connection with the second network, wherein forming the second connection comprises establishing a new RRC connection or resuming an existing RRC connection with the second network.

* * * * *